(12) United States Patent
Walavalkar et al.

(10) Patent No.: US 12,192,276 B1
(45) Date of Patent: Jan. 7, 2025

(54) DELIVERY OF LOG RECORDS TO STATELESS CLIENTS

(71) Applicant: Amazon Technologies, Inc., Seattle, WA (US)

(72) Inventors: Onkar Walavalkar, Kirkland, WA (US); Andrew Evenson, Seattle, WA (US); Krishnan A Kolazhi, Kirkland, WA (US); Xuetao Fan, Seattle, WA (US); Aman Gupta, Seattle, WA (US); Abhishek Arora, Seattle, WA (US); Christopher Chandler, Seattle, WA (US); Hari Chandana Kanchanapally, Seattle, WA (US); Cheng Shao, Long Island City, NY (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/776,289

(22) Filed: Jan. 29, 2020

(51) Int. Cl.
*H04L 67/1095* (2022.01)
*H04L 67/01* (2022.01)
*H04L 67/142* (2022.01)

(52) U.S. Cl.
CPC .......... *H04L 67/1095* (2013.01); *H04L 67/01* (2022.05); *H04L 67/142* (2013.01)

(58) Field of Classification Search
CPC ... H04L 67/1095; H04L 67/142; H04L 67/42; H04L 2209/38; H04L 67/12; H04L 9/12; H04L 41/0213; H04L 41/0631; H04L 43/08; H04L 67/02; H04L 67/025; H04L 67/04; H04L 67/104; H04L 9/0891; H04L 9/32; H04L 9/3236; H04L 9/3263; H04L 67/06; H04L 67/10; H04L 29/08072; H04L 47/70; H04L 63/0428; H04L 65/601; H04L 65/80; H04L 67/1097; H04L 67/22; H04L 67/28; H04L 67/2819; H04L 67/2852;

(Continued)

(56) References Cited

U.S. PATENT DOCUMENTS 5,924,097 A * 7/1999 Hill .................... G06F 9/505
                                                            707/703
6,148,338 A   11/2000 Lachelt et al.
(Continued)

OTHER PUBLICATIONS

U.S. Appl. No. 16/116,791, filed Aug. 29, 2018, Mustafa Ozan Ozen.

(Continued)

*Primary Examiner* — Greg C Bengzon
(74) *Attorney, Agent, or Firm* — Robert C. Kowert; Kowert, Hood, Munyon, Rankin & Goetzel, P.C.

(57) ABSTRACT

Methods, systems, and computer-readable media for delivery of log records to stateless clients are disclosed. A record delivery system receives, from a client, a first request to read from a persistent log comprising an ordered sequence of records. The first request is associated with a receiver session. The system sends a first set of records to the client and stores a data structure indicating that the first set of records was sent to the client in the receiver session. The system receives, from the client, a second request to read from the persistent log in the receiver session. Based at least in part on the data structure, the system determines a second set of one or more records in the persistent log. The system sends the second set of records to the client.

20 Claims, 31 Drawing Sheets

(58) Field of Classification Search
CPC ..... H04L 67/327; H04L 69/08; G06F 16/275;
G06F 11/2069; G06F 11/2076; G06F
16/248; G06F 16/27; G06F 16/278; G06F
11/1443; G06F 11/1451; G06F 11/1464;
G06F 11/1469; G06F 11/2025; G06F
11/2028; G06F 11/2041; G06F 11/2048;
G06F 11/2056; G06F 11/2064; G06F
11/2082; G06F 11/3006; G06F 16/178;
G06F 16/2255; G06F 16/951; G06F
11/0727; G06F 11/0766; G06F 11/1446;
G06F 11/1456; G06F 11/1458; G06F
11/202; G06F 11/2097; G06F 16/1748;
G06F 16/1752; G06F 16/1805; G06F
16/214; G06F 16/2237; G06F 16/2246;
G06F 16/2272; G06F 16/2282; G06F
16/2428; G06F 16/2455; G06F 16/24554;
G06F 16/24561; G06F 16/24568; G06F
16/24578; G06F 16/2462; G06F 16/2477;
G06F 16/256; G06F 16/273; G06F
2119/12; G06F 21/57; G06F 21/64; G06F
2201/80; G06F 2206/1012; G06F
2209/5018; G06F 30/20; G06F 30/23;
G06F 3/061; G06F 3/0635; G06F 3/0641;
G06F 3/0644; G06F 3/067; G06F 5/065;
G06F 8/65; G06F 8/70; G06F 9/466;
G06F 9/5033; G06F 9/5061; G06F
9/5077; G06F 9/542; G06F 12/0868;
G06F 12/0873; G06F 16/122; G06F
16/1844; G06F 3/0619; G06F 3/0652;
G06F 11/302; G06F 11/3024; G06F
11/3476; G06F 11/3485; G06F 12/0246;
G06F 12/0261; G06F 12/0855; G06F
12/0871; G06F 12/123; G06F 16/13;
G06F 16/134; G06F 16/152; G06F
16/162; G06F 16/172; G06F 16/1827;
G06F 16/183; G06F 16/211; G06F
16/212; G06F 16/2228; G06F 16/23;
G06F 16/2379; G06F 16/2453; G06F
16/24564; G06F 16/2471; G06F 16/252;
G06F 16/254; G06F 16/258; G06F
16/289; G06F 16/41; G06F 16/9014;
G06F 16/9024; G06F 16/90335; G06F
16/9038; G06F 16/904; G06F 16/9535;
G06F 2003/0697; G06F 21/6218; G06F
3/06; G06F 3/0604; G06F 3/0605; G06F
3/0607; G06F 3/0608; G06F 3/0614;
G06F 3/0623; G06F 3/0631; G06F
3/0638; G06F 3/064; G06F 3/0649; G06F
3/065; G06F 3/0655; G06F 3/0659; G06F
3/0661; G06F 3/0667; G06F 3/0673;
G06F 3/0683; G06F 3/0685; G06F
40/205; G06F 9/5016; G06F 9/546; G06Q
20/3827; G06Q 10/0631; G06Q 10/0633;
G06Q 20/06; G06Q 20/065; G06Q 20/36;
G06Q 20/363; G06Q 20/3674; G06Q
20/3825; G06Q 20/3829; G06Q 20/385;
G06Q 20/4014; G06Q 20/405; G06Q
2220/00; G06Q 30/02; G06Q 30/0206;
G06Q 50/188; H04W 4/38; H04W 4/70;
H04W 4/80

See application file for complete search history.

(56) References Cited

U.S. PATENT DOCUMENTS

| | | | | |
|---|---|---|---|---|
| 6,745,229 | B1 * | 6/2004 | Gobin | G06F 11/0709 709/206 |
| 6,993,246 | B1 * | 1/2006 | Pan | G11B 27/10 386/201 |
| 7,627,658 | B2 * | 12/2009 | Levett | G06F 9/46 709/248 |
| 7,779,021 | B1 * | 8/2010 | Smith | H04L 67/535 709/224 |
| 7,849,199 | B2 * | 12/2010 | Schulz | H04L 45/00 709/228 |
| 8,132,046 | B2 | 3/2012 | Varghese | |
| 8,276,154 | B2 | 9/2012 | Toub et al. | |
| 8,335,765 | B2 | 12/2012 | Sivasubramanian et al. | |
| 8,386,540 | B1 | 2/2013 | McAlister et al. | |
| 8,595,547 | B1 | 11/2013 | Sivasubramanian et al. | |
| 8,601,112 | B1 | 12/2013 | Nordstrom et al. | |
| 8,748,012 | B2 | 6/2014 | Zeng et al. | |
| 8,843,436 | B2 * | 9/2014 | Marschall | G06F 16/217 707/602 |
| 8,862,541 | B1 * | 10/2014 | Cox | G06F 11/2058 707/613 |
| 9,080,894 | B2 * | 7/2015 | Spanier | G06F 16/1847 |
| 9,286,001 | B2 | 3/2016 | Skjolsvold et al. | |
| 9,449,122 | B2 | 9/2016 | Haas et al. | |
| 9,471,585 | B1 * | 10/2016 | Theimer | G06F 3/0641 |
| 9,516,053 | B1 * | 12/2016 | Muddu | G06F 16/9024 |
| 9,607,019 | B1 | 3/2017 | Swift et al. | |
| 9,607,067 | B2 | 3/2017 | Haas et al. | |
| 9,626,374 | B2 | 4/2017 | Hirsch et al. | |
| 9,672,257 | B2 | 6/2017 | Tobin et al. | |
| 9,678,484 | B2 * | 6/2017 | Nixon | G05B 11/01 |
| 9,817,727 | B2 | 11/2017 | McAlister et al. | |
| 9,836,492 | B1 | 12/2017 | Hermanson | |
| 9,910,881 | B1 * | 3/2018 | Brooker | H04L 41/0859 |
| 9,934,107 | B1 | 4/2018 | Chikkanayakanahally et al. | |
| 9,953,058 | B1 | 4/2018 | Sadri | |
| 9,990,391 | B1 * | 6/2018 | Cole | G06F 16/2365 |
| 10,007,513 | B2 | 6/2018 | Malladi et al. | |
| 10,108,658 | B1 * | 10/2018 | Cole | G06F 16/2365 |
| 10,133,243 | B2 * | 11/2018 | Nixon | G05B 13/02 |
| 10,133,767 | B1 * | 11/2018 | Cole | G06F 16/2379 |
| 10,216,821 | B2 * | 2/2019 | Cheenath | G06F 16/955 |
| 10,235,417 | B1 | 3/2019 | Sterin et al. | |
| 10,254,996 | B1 * | 4/2019 | Jain | G06F 16/27 |
| 10,346,366 | B1 * | 7/2019 | Jacques de Kadt | H04L 51/34 |
| 10,360,216 | B2 | 7/2019 | Vandenberg | |
| 10,397,218 | B2 * | 8/2019 | Bogrett | H04L 67/02 |
| 10,497,393 | B1 * | 12/2019 | Flowers | G06F 21/6218 |
| 10,657,154 | B1 | 5/2020 | Dugar | G06F 9/52 |
| 10,666,569 | B1 * | 5/2020 | Jacques de Kadt | H04L 67/10 |
| 10,768,849 | B2 * | 9/2020 | Lazier | G06F 3/0613 |
| 10,805,238 | B1 * | 10/2020 | Jacques de Kadt | H04L 47/823 |
| 10,909,107 | B2 * | 2/2021 | Venkataramanappa | G06F 16/27 |
| 11,038,960 | B1 * | 6/2021 | Ruiz | H04L 67/1095 |
| 11,126,505 | B1 * | 9/2021 | Vig | G06F 11/1471 |
| 11,562,023 | B1 * | 1/2023 | Batsakis | G06F 16/24568 |
| 2002/0103816 | A1 * | 8/2002 | Ganesh | G06F 11/1474 |
| 2005/0033777 | A1 * | 2/2005 | Moraes | G06F 16/27 |
| 2005/0049924 | A1 * | 3/2005 | DeBettencourt | H04L 43/028 705/21 |
| 2005/0138081 | A1 * | 6/2005 | Alshab | G06Q 10/06 |
| 2006/0036617 | A1 * | 2/2006 | Bastawala | G06F 16/284 |

(56) References Cited

U.S. PATENT DOCUMENTS

| | | | |
|---|---|---|---|
| 2006/0059176 A1* | 3/2006 | Bastawala | G06F 16/2438 |
| 2006/0123212 A1* | 6/2006 | Yagawa | G06F 11/2058 |
| | | | 711/162 |
| 2006/0136686 A1* | 6/2006 | Cherkauer | G06F 11/2097 |
| | | | 711/162 |
| 2007/0156907 A1* | 7/2007 | Galchev | H04L 67/141 |
| | | | 709/227 |
| 2007/0198700 A1* | 8/2007 | Vivian | G06F 11/2023 |
| | | | 709/224 |
| 2007/0294500 A1* | 12/2007 | Falco | H04N 5/76 |
| | | | 386/E5.052 |
| 2008/0126853 A1* | 5/2008 | Callaway | G06F 11/1695 |
| | | | 714/13 |
| 2008/0275971 A1* | 11/2008 | Pretlove | H04L 67/01 |
| | | | 709/222 |
| 2008/0313242 A1* | 12/2008 | Doerr | G06F 11/2097 |
| 2009/0083342 A1* | 3/2009 | Tomic | G06F 16/1844 |
| 2009/0100075 A1* | 4/2009 | Karlsson | G06F 16/27 |
| 2009/0328044 A1* | 12/2009 | Bergheaud | G06F 11/2097 |
| | | | 718/101 |
| 2010/0332401 A1* | 12/2010 | Prahlad | H04L 63/0428 |
| | | | 705/80 |
| 2011/0238655 A1* | 9/2011 | Colrain | G06F 16/24552 |
| | | | 707/718 |
| 2011/0246434 A1* | 10/2011 | Cheenath | G06F 16/2386 |
| | | | 707/703 |
| 2012/0084260 A1* | 4/2012 | Cherkauer | G06F 16/2308 |
| | | | 707/648 |
| 2012/0131025 A1* | 5/2012 | Cheung | G06F 16/1752 |
| | | | 707/755 |
| 2013/0066837 A1* | 3/2013 | Colrain | G06F 16/2365 |
| | | | 707/674 |
| 2013/0066955 A1* | 3/2013 | Neel | H04L 67/42 |
| | | | 709/203 |
| 2014/0033201 A1* | 1/2014 | Dawkins | G06F 11/2069 |
| | | | 718/1 |
| 2014/0280197 A1* | 9/2014 | Gatto | G06F 16/245 |
| | | | 707/769 |
| 2014/0337491 A1* | 11/2014 | Barreto | G06F 16/182 |
| | | | 709/221 |
| 2014/0358972 A1* | 12/2014 | Guarrieri | G06F 16/21 |
| | | | 707/781 |
| 2015/0012424 A1* | 1/2015 | Hotti | G06Q 20/10 |
| | | | 705/40 |
| 2015/0254114 A1* | 9/2015 | Chavez | G06F 11/1469 |
| | | | 719/318 |
| 2016/0026987 A1* | 1/2016 | Modi | G06Q 20/027 |
| | | | 705/21 |
| 2016/0062853 A1* | 3/2016 | Sugabrahmam | G06F 3/0647 |
| | | | 714/4.11 |
| 2016/0253104 A1* | 9/2016 | Romanovskiy | G06F 12/0873 |
| | | | 711/156 |
| 2016/0292672 A1 | 10/2016 | Fay et al. | |
| 2016/0342989 A1 | 11/2016 | Davis | |
| 2017/0031676 A1 | 2/2017 | Cecchetti et al. | |
| 2017/0083414 A1* | 3/2017 | Chainani | G06F 11/1466 |
| 2017/0147669 A1* | 5/2017 | Lo | G06F 16/27 |
| 2017/0295232 A1 | 10/2017 | Curtis | |
| 2017/0331896 A1 | 11/2017 | Holloway et al. | |
| 2018/0011852 A1* | 1/2018 | Bennett | G06F 16/2272 |
| 2018/0060838 A1* | 3/2018 | Agrawal | G06Q 20/20 |
| 2018/0096068 A1* | 4/2018 | Venkataramanappa | G06F 11/1469 |
| 2018/0183901 A1* | 6/2018 | Lariviere | H04L 69/08 |
| 2018/0218046 A1* | 8/2018 | Woo | G06F 16/248 |
| 2018/0284987 A1* | 10/2018 | Lazier | G06F 3/0613 |
| 2019/0075171 A1* | 3/2019 | Childress | H04L 67/141 |
| 2019/0097909 A1* | 3/2019 | Puri | H04L 43/16 |
| 2019/0102401 A1* | 4/2019 | Neel | G06F 11/1474 |
| 2019/0116142 A1* | 4/2019 | Chalakudi | H04L 67/1097 |
| 2019/0132407 A1* | 5/2019 | Taniguchi | H04L 65/4061 |
| 2019/0155705 A1* | 5/2019 | Chavan | G06F 16/2308 |
| 2019/0163796 A1* | 5/2019 | Hodge | G06F 16/258 |
| 2019/0205050 A1* | 7/2019 | Koorapati | G06F 16/16 |
| 2019/0230151 A1* | 7/2019 | Falcao | G06F 16/13 |
| 2019/0317812 A1* | 10/2019 | Gebara | H04L 67/10 |
| 2019/0361780 A1* | 11/2019 | Tiwari | H04L 67/2842 |
| 2019/0370088 A1* | 12/2019 | Chen | G06F 9/542 |
| 2019/0373521 A1* | 12/2019 | Crawford | H04L 67/10 |
| 2019/0392047 A1* | 12/2019 | Sorenson, III | G06F 16/2255 |
| 2020/0034186 A1* | 1/2020 | Sanghi | G06F 9/544 |
| 2020/0097556 A1* | 3/2020 | Chen | G06F 9/5077 |
| 2020/0097592 A1* | 3/2020 | Chen | G06F 11/2028 |
| 2020/0097593 A1* | 3/2020 | Chen | G06F 11/302 |
| 2020/0125548 A1* | 4/2020 | Shergill | G06F 16/2379 |
| 2020/0134206 A1* | 4/2020 | Thekadath | H04L 9/3297 |
| 2020/0379651 A1* | 12/2020 | Lazier | G06F 3/0647 |

OTHER PUBLICATIONS

U.S. Appl. No. 16/176,629, filed Oct. 31, 2018, Dumanshu Goyal.
U.S. Appl. No. 16/216,580, filed Dec. 11, 2018, Dumanshu Goyal.
U.S. Appl. No. 16/199,078, filed Nov. 23, 2018, Timothy A. Rath.
U.S. Appl. No. 16/199,102, filed Nov. 23, 2018, Lonnie J. Princehouse.
U.S. Appl. No. 16/199,103, filed Nov. 23, 2018, Timothy A. Rath.
U.S. Appl. No. 16/219,686, filed Dec. 13, 2018, Dumanshu Goyal.
U.S. Appl. No. 16/267,330, filed Feb. 4, 2019, Dumanshu Goyal.
U.S. Appl. No. 16/287,822, filed Feb. 27, 2019, Dumanshu Goyal.
U.S. Appl. No. 16/453,914, filed Jun. 26, 2019, Gaurav Saxena.
Gwen Shapira, et al., "Apache Kafka for Beginners", Retrieved from URL: http://blog.cloudera.com/blog/2014/09/apache-kafka-for-beginners/, Sep. 2014, pp. 1-16.
Amazon Web Services, "Amazon Kinesis Streams Developer Guide", Updated Apr. 19, 2016, pp. 1-136.
Jef Barr, "Sneak Preview—DynamoDB Streams", Retrieved from URL: https://aws.amazon.com/blogs/aws/dynamodb-streams-preview/, Nov. 2014, pp. 1-4.
U.S. Appl. No. 16/455,591, filed Jun. 27, 2019, Gaurav Saxena.
U.S. Appl. No. 15/192,776, filed Jun. 24, 2016, Andrew Ross Evenson.

* cited by examiner

DELIVERY OF LOG RECORDS TO STATELESS CLIENTS

BACKGROUND

Many companies and other organizations operate distributed systems that interconnect numerous computing systems and other computing resources to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization and public data centers that are operated by entities as businesses to provide computing resources to customers. As the scale and scope of typical distributed systems has increased, the tasks of provisioning, administering, and managing the computing resources have become increasingly complicated.

Such a distributed system may encompass numerous subsystems that work in concert. For example, a distributed system operated by an online store may include an ordering system that processes the generation and modification of customer orders of goods and/or services. The same distributed system operated by the online store may also include a logging system that stores log entries related to orders. When a modification to an order is desired, a log entry may be generated using the logging system to create a persistent record of the order modification. If the logging system is offline, aspects of the ordering system may be unavailable or broken due to the dependency between the ordering system and the logging system. Such downtime may cause the online store to lose sales and/or create an undesirable experience for customers.

Figure 1:
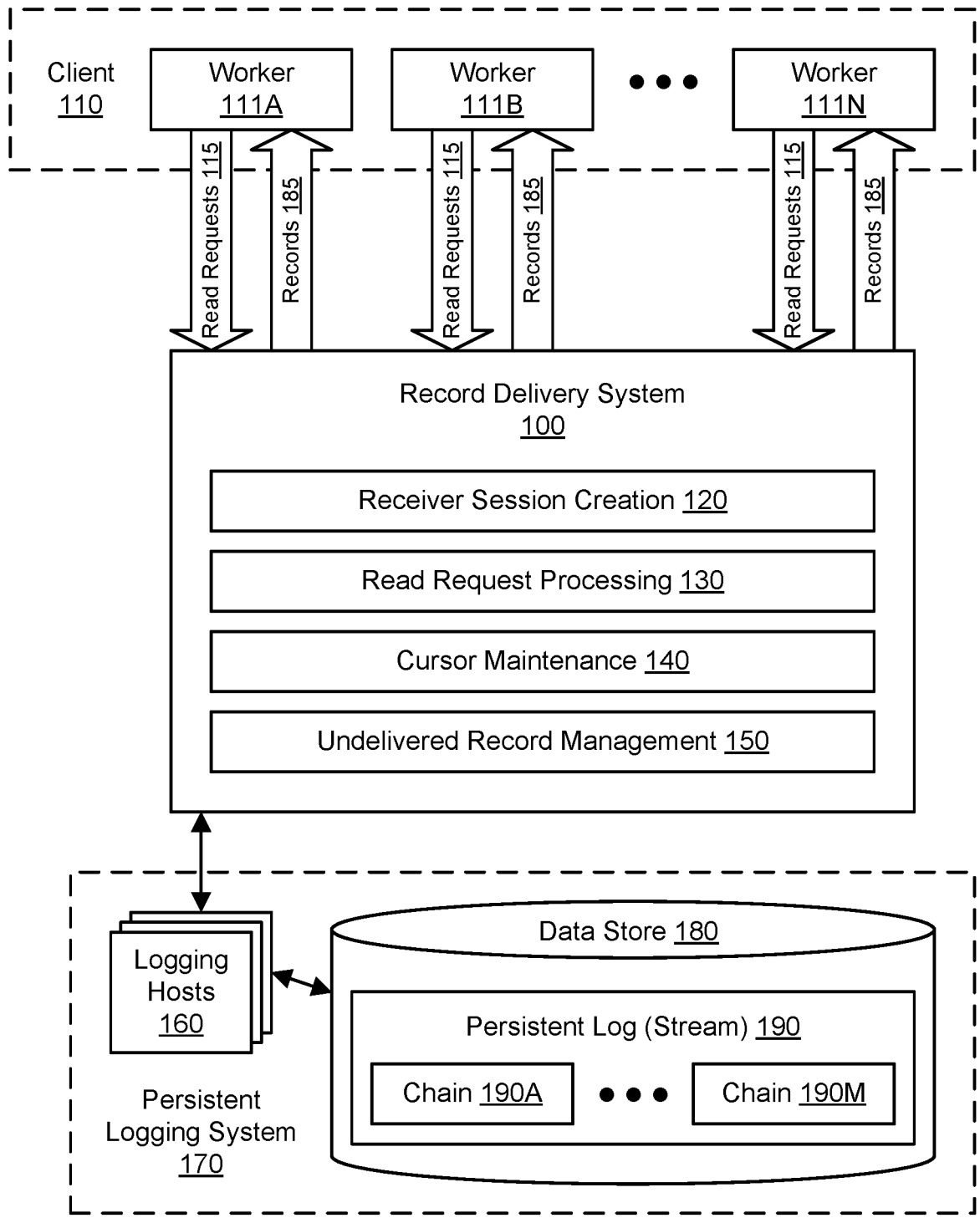
FIG. 1 illustrates an example system environment for delivery of log records to stateless clients, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for delivery of log records to stateless clients are described. A data store may store records using a set of event chains. A chain may represent a highly available, low latency, and durable log for a sequence of records (e.g., representing events or transactions) produced by one or more event producers. The chain may be appended to at the head, iterated in either direction, and truncated at the tail. A single stream (also referred to as a log) may include several such chains, and chains may also be referred to as shards of a stream.

Events may be logged across different chains of a stream so that the global ordering of the events can be derived, even for events in different chains. Using the techniques described herein, a record delivery system may permit stateless clients to receive records from streams using a queue-like interface. A record delivery system may initiate a receiver session for a particular client so that one or more workers (e.g., hosts or threads) of the client may receive records from a particular stream as the system iterates through an ordered sequence of records. During the session, workers may submit read requests to the record delivery system, and the record delivery system may respond to each request with one or more records from the stream. Records may be sent to the client according to an ordered sequence of the records in one or more chains of the stream. Clients may choose for the system to iterate through the records forwards or backwards from a specified point in time. Clients may be substantially stateless, and read requests may specify the session corresponding to a stream but not identifiers of individual records. To select one or more records to send in response to a particular request, the record delivery system may maintain a cursor for a particular session and particular chain. The cursor for a particular session and chain may include various information such as a pointer or reference to the next record in the chain to be sent, an indication (e.g., a range) of sent but unacknowledged records, an indication (e.g., a range) of records to be redelivered, and so on. Clients may acknowledge successful receipt of records to the record delivery system, e.g., using subsequent read requests.

Unlike traditional queues, records may be retained in the persistent log after being delivered to clients by the record delivery system. A record whose delivery is acknowledged may not be redelivered during the same session; such records may be invisible in the log to the client during that session. However, a record delivered in one session may be delivered (to the same client or a different client) in another session that reads the same stream. In some embodiments, two or more sessions may concurrently read from the same stream, and the sessions may be independent of one another. For records whose receipt is not acknowledged, the record delivery system may attempt to redeliver up to a particular number of times (e.g., two) according to a redelivery policy. To store undeliverable records, the record delivery system may use an additional stream referred to as an undelivered record log that can be accessed by the client using a different session. Clients may also request that particular records be added to the undelivered record log, e.g., for later processing of records that are especially large or complex. By permitting clients to receive records from a persistent log in a stateless manner, the record delivery system may facilitate the rapid development of client services and client applications by developers.

As one skilled in the art will appreciate in light of this disclosure, embodiments may be capable of achieving certain technical advantages, including some or all of the following: (1) reducing the computational and memory resources required for operation of clients of a log by permitting clients to receive records from the log in a substantially stateless manner; (2) reducing the use of network resources by permitting stateless clients to send requests for records that identify a session associated with a particular stream but not specific records in that stream; (3) reducing the time and computational resources required by developers to build client services and client applications by not requiring clients to maintain the state of a sequence of records from a log; (4) improving the availability and throughput of event logging using a fleet of hosts by dynamically expanding the number of chains (shards) of a stream representing a sequence of events; (5) decreasing idle or underutilized computational and storage resources by dynamically shrinking the number of chains (shards) of a stream representing a sequence of events and concentrating a workload on a smaller number of hosts; (6) improving the latency of event searching by dynamically shrinking the number of chains (shards) of a stream representing a sequence of events; (7) improving the usability of event data by logging events across multiple chains with data indicative of the global ordering of the events; (8) improving the accessibility of data by maintaining an event stream indefinitely; and so on.

Delivery of Log Records to Stateless Clients

FIG. 1 illustrates an example system environment for delivery of log records to stateless clients, according to some embodiments. A persistent logging system 170 may capture data indicative of events in various chains 190A-190M of a stream 190 maintained in a data store 180. The stream 190 may represent a persistent log. Although one stream 190 is shown for purposes of illustration and example, the data store 180 may include a plurality of such streams, with different streams typically representing different topics or data types. The data indicative of events may also be referred to simply as events, and a log entry representing an event may be referred to as a record or as an element of the chain. Events may represent transactions, status changes, status reports, and/or other updates with respect to one or more systems, data sets, data stores, and/or any other suitable items. For example, the events may relate to financial transactions, orders in an online store, accounting transactions, updates to gift card balances, and so on. Individual events may often represent relatively small amounts of data, e.g., as supplied in byte arrays. In one embodiment, events may be logged using versioned data for efficient use of the data store 180. Using a plurality of logging hosts 160, a chain of events may be appended to at the head, iterated in either direction, and truncated at the tail, with records in the chain generally deemed immutable. The logging system 170 may be idempotent such that any given event will be represented once and only once in the stream. In one embodiment, a stream can be searched forward or backward from a point in time or a particular event. The logging system 170 may be implemented using aspects of the globally ordered logging system 1000 as described below with respect to FIG. 7.

A record delivery system 100 may permit clients to access the stream 190 such that clients need not maintain the state of a sequence of records in the stream. For at least this reason, clients of the system 100 may be termed stateless. A client 110 may represent a service, application, or other software product that seeks to receive records from the stream 190. As shown in the example of FIG. 1, a client 110 may include one or more workers such as worker 111A and 111B through 111N. The workers 111A-111N may represent worker hosts, worker threads, or other components that can receive and process records from the stream 190 in a substantially distributed manner. For example, if the stream 190 stores records indicative of transactions (e.g., orders or changes to orders) in an online store, then the client 110 may represent a service that reviews such transactions at a later time. The client 110 (via workers 111A-111N or other associated components) may interact with the system 100 using one or more suitable interfaces, such as one or more application programming interfaces (APIs), e.g., to request records. The client 110 may represent different processes, systems, and/or computing devices. The components of the client 110 may be distributed on multiple computing devices throughout one or more networks, including private networks and/or public networks such as the Internet. The client 110 may also be coupled to the system 100 through one or more networks, including private networks and/or public networks such as the Internet.

The record delivery system 100 may include various components or functionalities such as a component 120 for receiver session creation, a component 130 for read request processing, a component for cursor maintenance 140, and a component 150 for undelivered record management. Using the component 120 for receiver session creation, the record delivery system 100 may initiate a receiver session for a particular client 110 so that one or more workers 111A-111N (e.g., hosts or threads) of the client may receive records from a particular stream 190. During the session, workers may submit read requests 115 to the record delivery system 100, and using the component 130 for read request processing, the record delivery system may respond to each request with one or more records 185 from the stream. Records 185 may be sent to the client 110 according to an ordered sequence of the records in one or more chains 190A-190M of the stream 190. The system may iterate through the ordered sequence forwards or backwards from some point in time.

The client 110 may be substantially stateless, and read requests 115 may specify the session and/or stream but not identifiers of individual records. To select one or more records to send in response to a particular request, the record delivery system may use the component for cursor maintenance 140 to maintain a cursor for a particular session and particular chain. The cursor for a particular session and chain may include various information such as a pointer or reference to the next record in the chain to be sent, an indication (e.g., a range) of sent but unacknowledged records), an indication (e.g., a range) of records to be redelivered, and so on. The cursor may be updated at various times, e.g., to move the pointer to the next record forward (if records are being read from oldest to newest) or backward (if records are being read from newest to oldest) upon sending a record to the client. Clients may acknowledge successful receipt of records to the record delivery system, e.g., using subsequent read requests. The cursor may be updated when an acknowledgement of receipt of a record is received from the client. Unlike traditional queues, records may be retained in the persistent log 190 after being delivered to clients by the record delivery system 100. A record whose delivery is acknowledged may not be redelivered during the same session; such records may be invisible in the log to the client during that session. However, a record delivered in one session may be delivered (to the same client or a different client) in another session that reads the same stream. In some embodiments, two or more sessions may concurrently read from the same stream, and the sessions may be independent of one another.

Using the component 150 for undelivered record management, the system 100 may attempt redelivery of records whose receipt was not acknowledged by the client 110 in a timely manner. Redelivery may be attempted according to a redelivery policy that may specify the number of times to attempt redelivery, the duration between redelivery attempts, and so on. Using the component 150 for undelivered record management, the record delivery system may use an additional stream referred to as an undelivered record log to store undelivered or undeliverable records. The undeliverable record log may be accessed by the client using a different session. Clients may also request that particular records be added to the undelivered record log, e.g., for later processing of records that are especially large or complex. The cursor may be updated when redelivery is attempted to update a redelivery count, when a record is deemed undeliverable according to the redelivery policy, and so on.

The record delivery system 100 and client 110 may implement a variety of use cases for reading and processing records from the stream 190. For example, the records in the stream 190 may represent transactions in a first data store, e.g., order transactions in an online store. The records may be added to the stream 190 manually or automatically, e.g., as automatically triggered by the creation or modification of the corresponding transactions. Using a receiver session, the client 110 may first read the records to determine whether individual records are eligible for migration to a second data store. The first data store may represent a "hot" data store that offers lower latency but higher cost, and the second data store may represent a "cold" data store that offers higher latency and lower cost. In one embodiment, for example, a record may be deemed eligible for migration if its timestamp is older than some threshold point in time and if any other criteria are met. Records representing eligible transactions may be added to a second stream. Using one or more additional receiver sessions, the same client 110 or a different client may read from the second stream, add the underlying transactions to the cold data store, verify the successful writes to the cold data store, and then remove the original transactions from the hot data store. By permitting such client applications to be developed quickly and easily without the need for clients to request specific records, the record delivery system 100 may facilitate a variety of such use cases.

The data store 180 may store multiple streams, each having its own set of one or more chains. When a stream is created (e.g., by an event producer or other client invoking a particular API), the stream may be assigned a stream identifier. The stream identifier may include an alphanumeric identifier. The stream identifier may also indicate the number of chains (shards) in the stream. For example, the identifier for a stream named ABC may be ABC: 3 if the stream initially includes three chains. The number of chains in the stream may be determined based on input to the API that creates the stream or based on a default or pre-configured value. In one embodiment, a stream may not have fewer than a predetermined minimum number of chains (e.g., 2), even as the number of chains dynamically grows and shrinks over time. In one embodiment, the name or identifier of a chain of a stream may be derived from the stream identifier. For example, given a stream identifier ABC: 3, the individual chains may be identified as ABC: 3:0, ABC: 3:1, and ABC: 3:2. The initially created chains for a stream may be referred to as root chains, and child chains may be added to the stream from parent chains such as root chains. Individual chains are discussed in greater detail below, e.g., with respect to FIG. 11A through FIG. 16.

The logging system 170 may include various components or functionalities. In one embodiment, the logging system 170 may include one or more load balancers. The load balancer(s) may accept requests to log events from event producers and may route those requests to appropriate logging hosts of a fleet of logging hosts 160. The load balancer(s) may route requests based (at least in part) on the availability or latency of various hosts 160, e.g., to balance the load across the fleet. In one embodiment, particular hosts may be said to "own" particular chains, but the load balancer (s) may route requests to hosts without regard to such ownership claims. Individual hosts may instead determine chain ownership using disk discovery and/or peer discovery and may route requests to other hosts accordingly. In one embodiment, the fleet of hosts 160 may be scaled up or down as needed, e.g., by provisioning additional hosts from a pool of available compute instances to meet additional logging traffic and/or returning hosts to the pool of available compute instances when logging traffic decreases. The fleet of hosts 160 may be implemented using computational resources of a multi-tenant provider network.

In one embodiment, when a logging host receives an inbound request, the host may randomly select one of the chains in the stream for logging the event. The identifier of the selected chain may be derived from the stream identifier, where the stream identifier indicates the number of chains as discussed above. In one embodiment, a logging host may log an event from an inbound request to a selected chain if the host examines the contents (if any) of the chain in the data store 180 and determines that no other host "owns" the chain. In one embodiment, a logging host may process an inbound request by forwarding the request to another host as a peer request, e.g., if the host determines that the other host owns or last modified the particular chain. In one embodiment, a logging host that receives such a peer request may log the event in the request to the selected chain. Using disk discovery, a logging host may examine the contents (if any) of a chain in the data store 180 to discover the existence of other hosts, the ownership status (if any) of the chain with respect to another host, and so on. Using peer discovery, logging hosts may exchange information regarding the existence of other hosts, the existence of chains in the stream, the ownership status (if any) of chains with respect to other hosts, the health or availability of other hosts, the clock times at other hosts, and so on. The information discovered from disk and/or peer exchange may be used for routing of inbound requests to other logging hosts (e.g., hosts that "own" or last modified particular chains or hosts that can handle more throughput). The information discovered from disk and/or peer exchange may also be used for generation of approximate timestamps that can be logged to disk with events and potentially used to determine the global ordering of events in different chains of the stream 190.

In one embodiment, the logging system 170 may order events using both wall clock time and chain time. Wall clock time may represent the traditional system time taken from the clock of a computing system such as a logging host. Chain time may represent the sequence number of an event within a chain. Events in a particular chain may be internally ordered by definition. The logging system 170 may weave multiple chains of a stream into a global ordering using cross-pollination of wall clock times from different hosts as well as chain times and other metadata (e.g., "happens before" and/or "happens after" references to other events) to determine approximate timestamps for events. The cross-pollination of time data may permit the logging system 170 to determine the global order of events and also construct stable wall clock approximations that do not suffer from clock skew at individual hosts.

The logging system 170 may distribute events across a set of chains to avoid high throughput (in transactions per second or TPS) against an individual chain. The logging hosts that flush to each chain may bundle any number of events into a single flush to the underlying data store 180. However, the more events that are bundled, the larger the flush, and the more write units are used. Thus, to distribute heat, multiple chains may be employed in a stream. The volume of events may grow to a large enough number that additional chains may be spawned to maintain high availability and low latency. Excessively high or low volume to a chain may be detected by generally restricting chain updates to be performed by a single host. To spawn a new chain, an entry into the parent chain may be logged with the chain ID of the child chain. The child may continue to exist until its death is recorded in the child itself. During its life, the parent may include the child reference continuously in all updates. Thus the logging system 170 may deterministically know the identities of all chains in a stream at any given point in time.

In one embodiment, the logging system 170 may implement high read fan-out. The logging system 170 may permit hundreds or thousands of consumers to read from the same stream in a substantially concurrent manner. To enable the high read fan-out, the logging system 170 may enable caching such that most reads of the stream are served from caches of the log (not head) content. To enable the high read fan-out, the logging system 170 may also enable read/write separation. While a single logging host may perform most or all writes to a given chain in the stream, any host may perform the read from the chain. In one embodiment, each logging host may also have a limited cache of history nodes so that very high TPS streams get some edge-caching benefit.

It is contemplated that the record delivery system 100 may include additional components not shown, fewer components than shown, or different combinations, configurations, or quantities of the components shown. The system 100 may comprise one or more computing devices, any of which may be implemented by the example computing device 3000 illustrated in FIG. 17. In various embodiments, portions of the system 100 may be provided by the same computing device or by any suitable number of different computing devices. If any of the components of the system 100 are implemented using different computing devices, then the components and their respective computing devices may be communicatively coupled, e.g., via a network. Each of the illustrated components may represent any combination of software and hardware usable to perform their respective functions.

In one embodiment, the functionality of the record delivery system 100 may be provided to client (such as client 110) as a web-accessible service. The functionality of the system 100 may be presented to clients using a provider network. A network set up by an entity such as a company or a public sector organization to provide one or more services (such as various types of cloud-based computing or storage) accessible via the Internet and/or other networks to a distributed set of clients may be termed a provider network. A provider network may include numerous data centers (e.g., hosted in "the cloud") hosting various resource pools, such as collections of physical and/or virtualized computer servers, storage devices, networking equipment and the like, that are used to implement and distribute the infrastructure and services offered by the provider. The resources may, in some embodiments, be offered to clients in units called "instances," such as virtual or physical compute instances or storage instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices, and the like.

The provider network may offer multi-tenancy and may be referred to as a multi-tenant provider network and/or cloud-based provider network.

Figure 2:
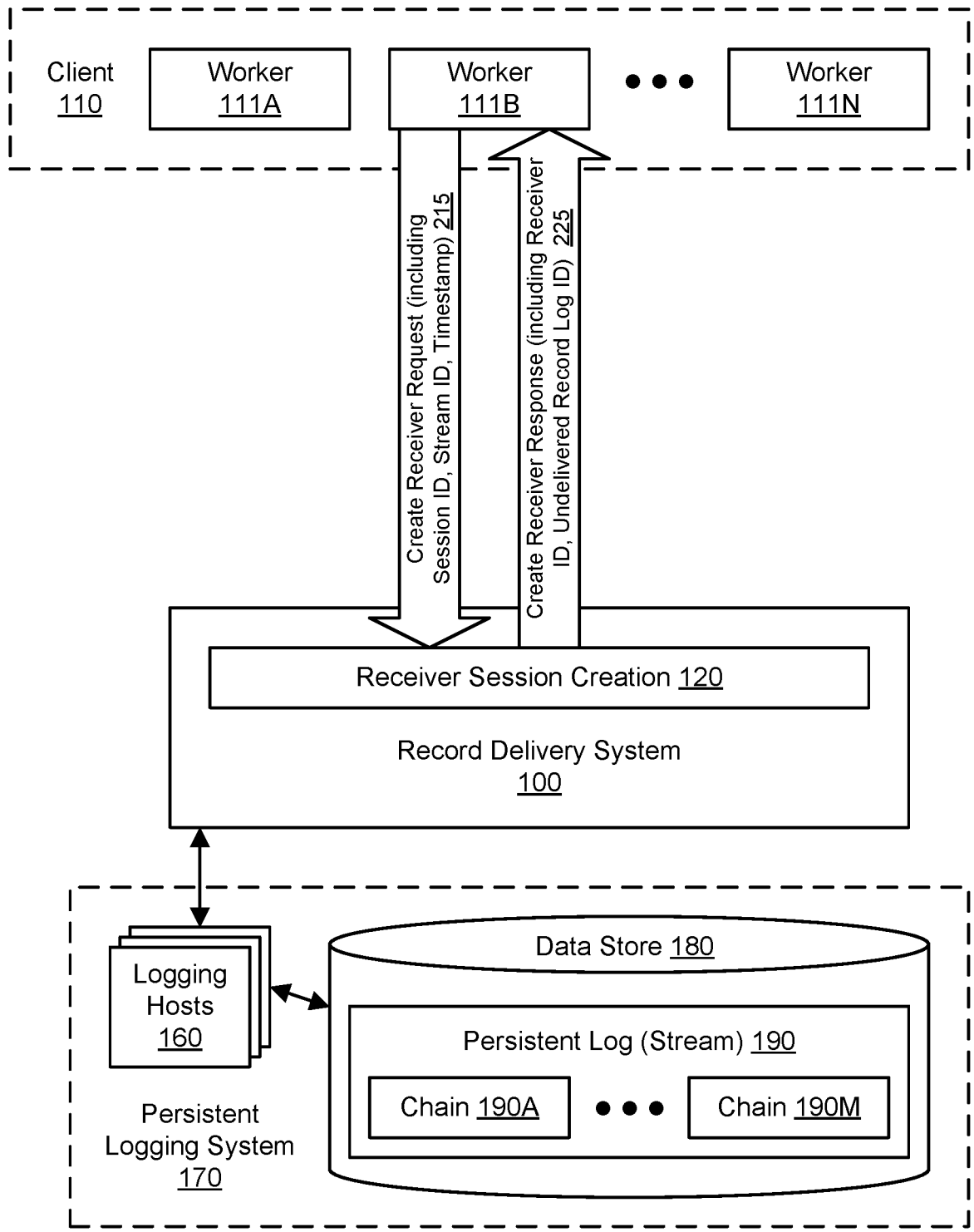
FIG. 2 illustrates further aspects of the example system environment for delivery of log records to stateless clients, including creation of a receiver session for a client, according to some embodiments.

FIG. 2 illustrates further aspects of the example system environment for delivery of log records to stateless clients, including creation of a receiver session for a client, according to some embodiments. Using the component 120 for receiver session creation, the record delivery system 100 may initiate a receiver session for a particular client 110 so that one or more workers 111A-111N of the client may receive records from a particular stream 190. To request that a receiver session be created, the client 110 (e.g., one of the workers 111A-111N) may send a create receiver request 215 to the record delivery system 100. The create receiver request 215 may be sent by invoking an API offered by the system 100. The create receiver request 215 may specify a session ID for the receiver session to be created. The create receiver request 215 may specify a stream ID of the persistent log (stream) from which records will be read, e.g., an identifier of the stream 190. The create receiver request 215 may specify a timestamp from which the records should be read in the stream. Optionally, the create receiver request 215 may specify whether records should be read forwards (from oldest to newest after the specified timestamp) or backwards (from newest to oldest before the specified timestamp). In some embodiments, if forward or backward iteration is not specified by the request 215, then a default choice of forward iteration may be applied. Based on the create receiver request 215, the system 100 may initiate a receiver session for the particular client 110 and the specified stream 190. The system 100 may send a response 225 to the create receiver request 215 to the client. The create receiver response 225 may specify the receiver ID of the created receiver session. The create receiver response 225 may also specify an identifier of an undelivered record log associated with the session. The undelivered record log is discussed in greater detail with respect to FIG. 5.

FIG. 3A through 3E illustrate further aspects of the example system environment for delivery of log records to stateless clients, including selection of records for a client using a cursor, according to some embodiments. The session created according to the create receiver request 215 may be referred to as the first session (or session 1) for the given client 110 and specified stream 190. During this session, workers may submit read requests to the record delivery system 100, and using the component 130 for read request processing, the record delivery system may respond to each request with one or more records 185 from the stream 190. Records 185 may be sent to the client 110 according to an ordered sequence of the records in one or more chains 190A-190M of the stream 190.

Figure 3A:
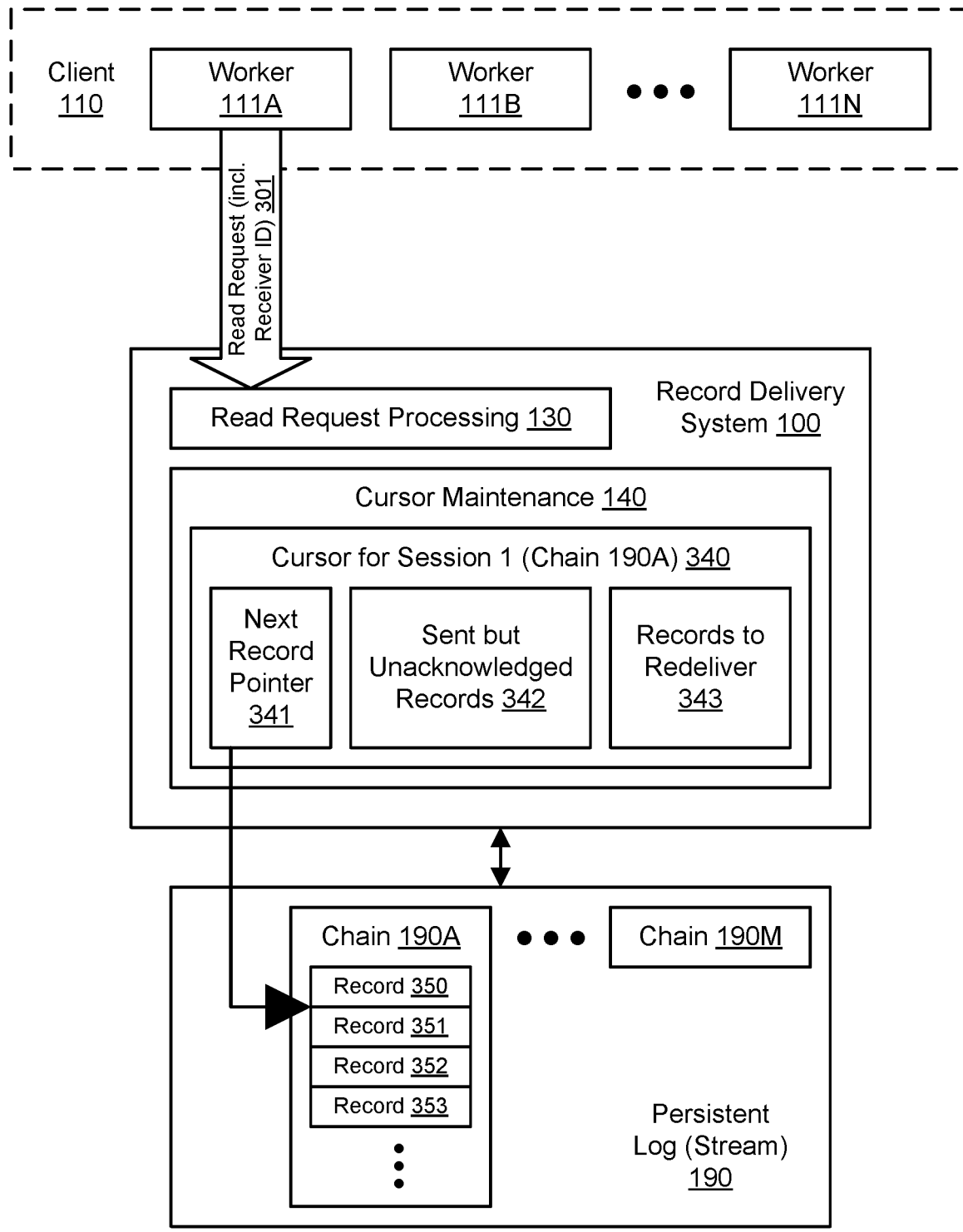
FIG. 3A through 3E illustrate further aspects of the example system environment for delivery of log records to stateless clients, including selection of records for a client using a cursor, according to some embodiments.

As shown in the example of FIG. 3A, a worker 111A may submit a read request 301. The read request 301 may be sent by invoking an API offered by the system 100. The read request 301 may merely specify the receiver ID supplied to the client using the response 225 to the create receiver request 215. In some embodiments, to enable stateless clients to receive records from the stream 190, the read request 301 need not specify particular records to be returned. Accordingly, in some embodiments, the client 110 need not keep track of which records have been received, the next record to be received, or the position of particular records in the sequence of the stream 190.

To select one or more records to send in response to the request 301, the record delivery system 100 may use the component for cursor maintenance 140 to maintain one or more cursors for session 1. In some embodiments, each chain 190A-190M of the stream 190 may be associated with a chain-specific cursor, such as cursor 340 for chain 190A. The cursor 340 for session 1 and chain 190A may include various information such as a pointer 341 or reference to the next record in the chain to be sent, an indication (e.g., a range) 342 of sent but unacknowledged records, an indication (e.g., a range) 343 of records to be redelivered, a number of redeliveries attempted for particular undelivered records, and so on. The cursor 340 may be updated at various times, e.g., to move the pointer to the next record forward or backward (if records are being read from back to front) upon sending a record to the client 110.

As shown in the example of FIG. 3A, at the time at which the read request 301 is received, the next record pointer 341 may point to a time or position after record 350 and before record 351. In some embodiments, this time or position may reflect the starting point of the session as specified in the create receiver request 215. Using the next record pointer 341 of the cursor 340, the system 100 may identify record 351 as the next record to be sent to the client 110 for this particular session. In some embodiments, the system 100 may select the chain 190A for the read request 301 using techniques discussed below with respect to FIG. 7 through FIG. 16, e.g., if the cursor 340 points to an earlier record in the chain 190A than in the other chains of the stream 190, or using load-balancing techniques to spread request traffic across the chains 190A-190M. In some embodiments, the throughput of the logging system 170 may be bounded by the number of chains 190A-190M, and different chains 190A-190M may be selected for responding to read requests in order to maximize the throughput.

Figure 3B:
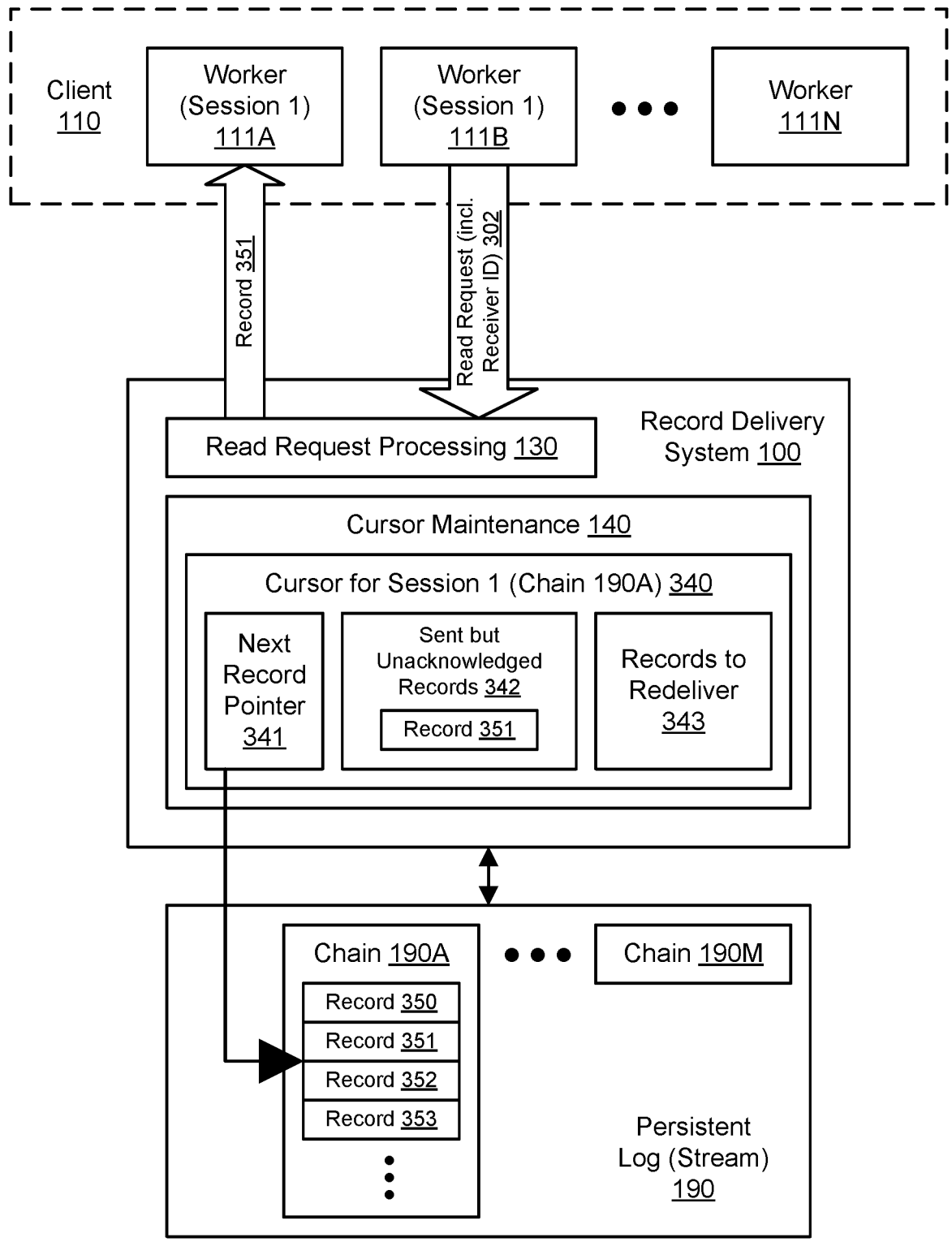

FIG. 3B represents a continuation of the example shown in FIG. 3A. As shown in FIG. 3B, the system 100 may send the record 351 to the worker 111A that requested the next record(s) in the stream 190. The system 100 may also advance the next record pointer 341 such that it points to a time or position after record 351 and before record 352. Additionally, the system 100 may update the list or range of sent but unacknowledged records 342 such that it includes a reference to record 351.

As also shown in the example of FIG. 3B, another worker 111B may submit a read request 302. The read request 302 may be sent by invoking an API offered by the system 100. The read request 302 may again specify the receiver ID and not any particular records to be returned. At the time at which the read request 302 is received, the next record pointer 341 may point to a time or position after record 351 and before record 352. Using the next record pointer 341 of the cursor 340, the system 100 may identify record 352 as the next record to be sent to the client 110 for this particular session.

Figure 3C:
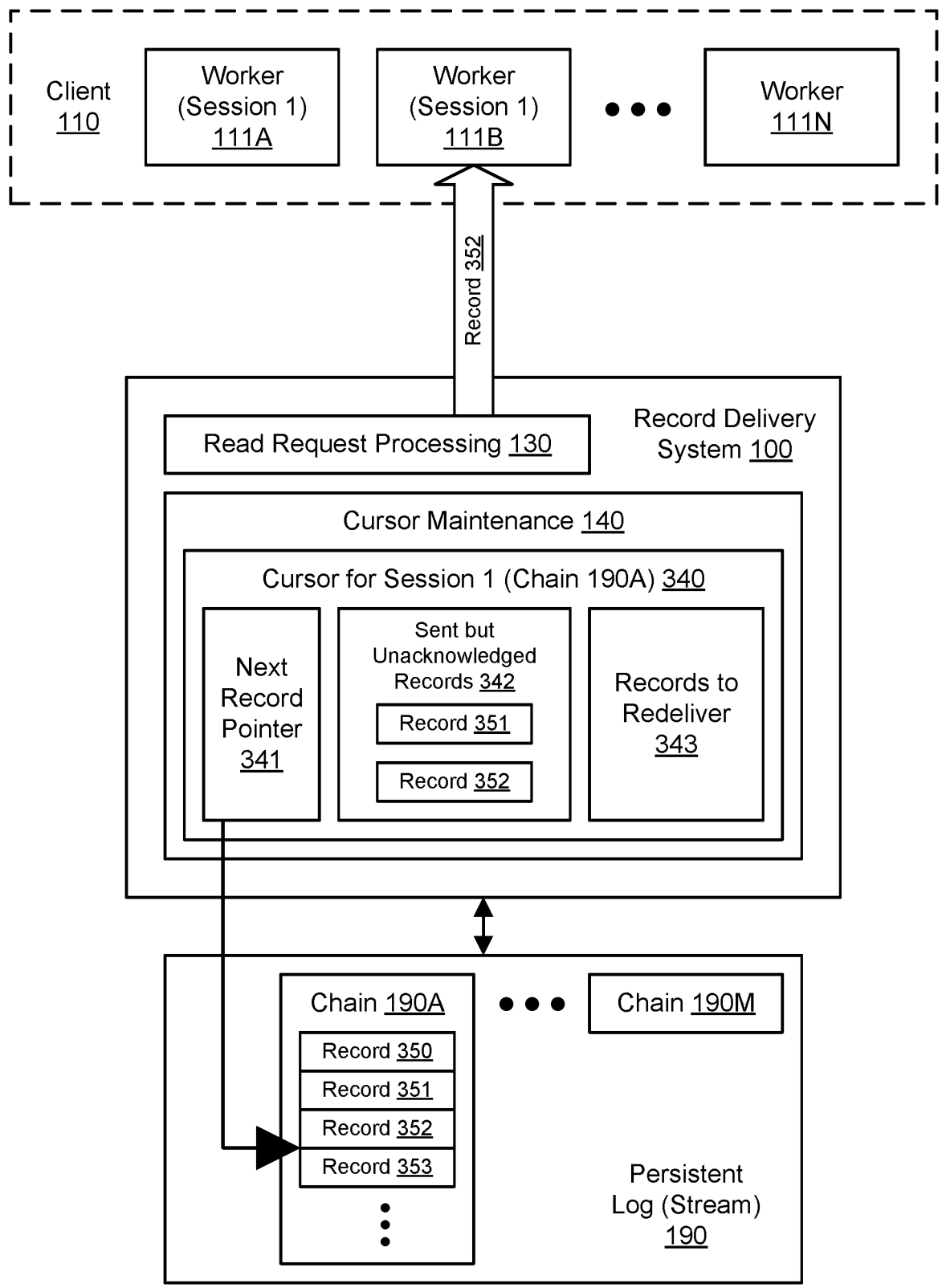

FIG. 3C represents a continuation of the example shown in FIG. 3B. As shown in FIG. 3A, the system 100 may send the record 352 to the worker 111B that requested the next record(s) in the stream 190. The system 100 may also advance the next record pointer 341 such that it points to a time or position after record 352 and before record 353. Additionally, the system 100 may update the list or range of sent but unacknowledged records 342 such that it includes a reference to record 352.

Figure 3D:
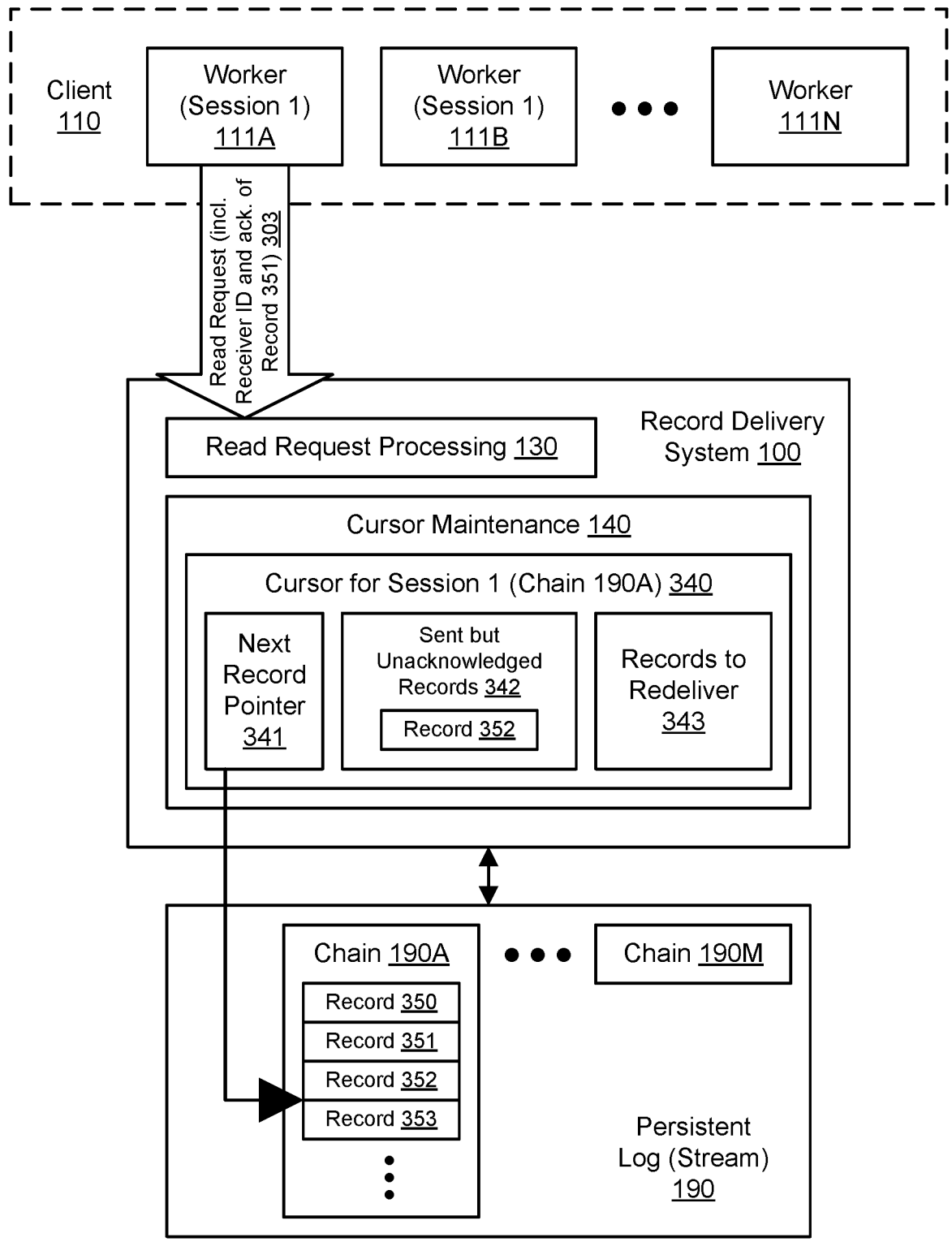

FIG. 3D represents a continuation of the example shown in FIG. 3C. Clients may acknowledge successful receipt of records to the record delivery system, e.g., using subsequent read requests. As shown in the example of FIG. 3D, the worker 111A may acknowledge the receipt of record 351. In one embodiment, this acknowledgement may be sent as a parameter of another read request 351. Based on the acknowledgement, the system 100 may update the list or range of sent but unacknowledged records 342 such that the reference to record 351 is removed (e.g., by changing the boundaries of the range of records). After the acknowledgement, the record 351 may not be delivered again for session 1. However, unlike in traditional queues, the record 351 may be retained in the persistent log 190 after being delivered to the client 110 by the record delivery system 100. The read request 303 may again specify the receiver ID and not any particular records to be returned. At the time at which the read request 303 is received, the next record pointer 341 may point to a time or position after record 352 and before record 353. Using the next record pointer 341 of the cursor 340, the system 100 may identify record 353 as the next record to be sent to the client 110 for this particular session.

Figure 3E:
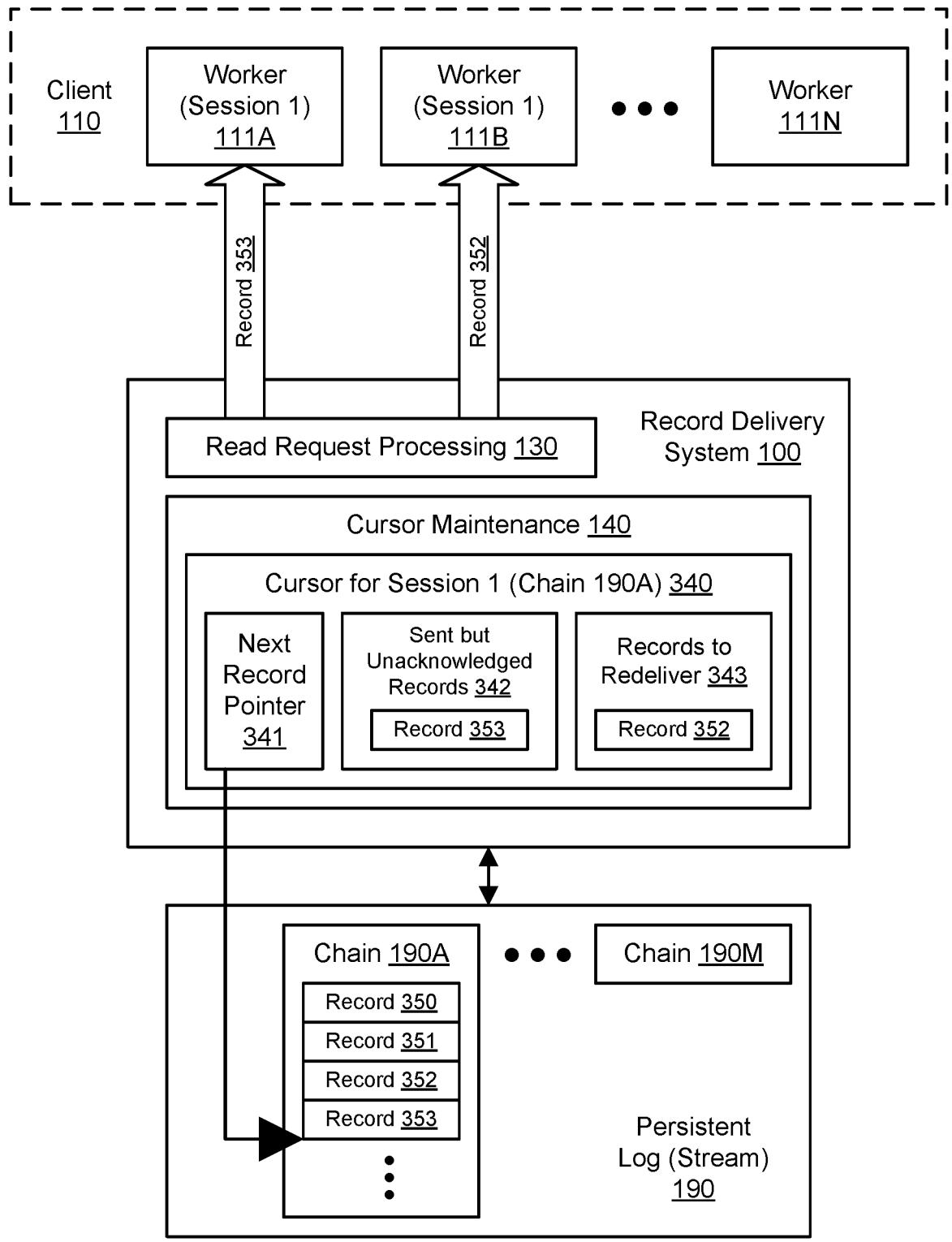

FIG. 3E represents a continuation of the example shown in FIG. 3D. As shown in FIG. 3E, the system 100 may send the record 353 to the worker 111A that requested the next record(s) in the stream 190. The system 100 may also advance the next record pointer 341 such that it points to a time or position after record 353. Additionally, the system 100 may update the list or range of sent but unacknowledged records 342 such that it includes a reference to record 353.

In some embodiments, the system 100 may attempt to redeliver records whose receipt is not acknowledged within some threshold period of time. Redelivery may be attempted according to a redelivery policy that may specify the number of times to attempt redelivery, the duration between redelivery attempts, and so on. If receipt of the record 352 is not acknowledged, then as shown in FIG. 3E, the record 352 may be moved to the list or range of records to redeliver. As shown in FIG. 3E, redelivery of record 352 may be attempted for worker 111B after an acknowledgement of the original delivery attempt was not received by the system 100 within some predetermined duration of time. The number of redelivery attempts for the record 352 may be maintained in the cursor 340.

Figure 4:
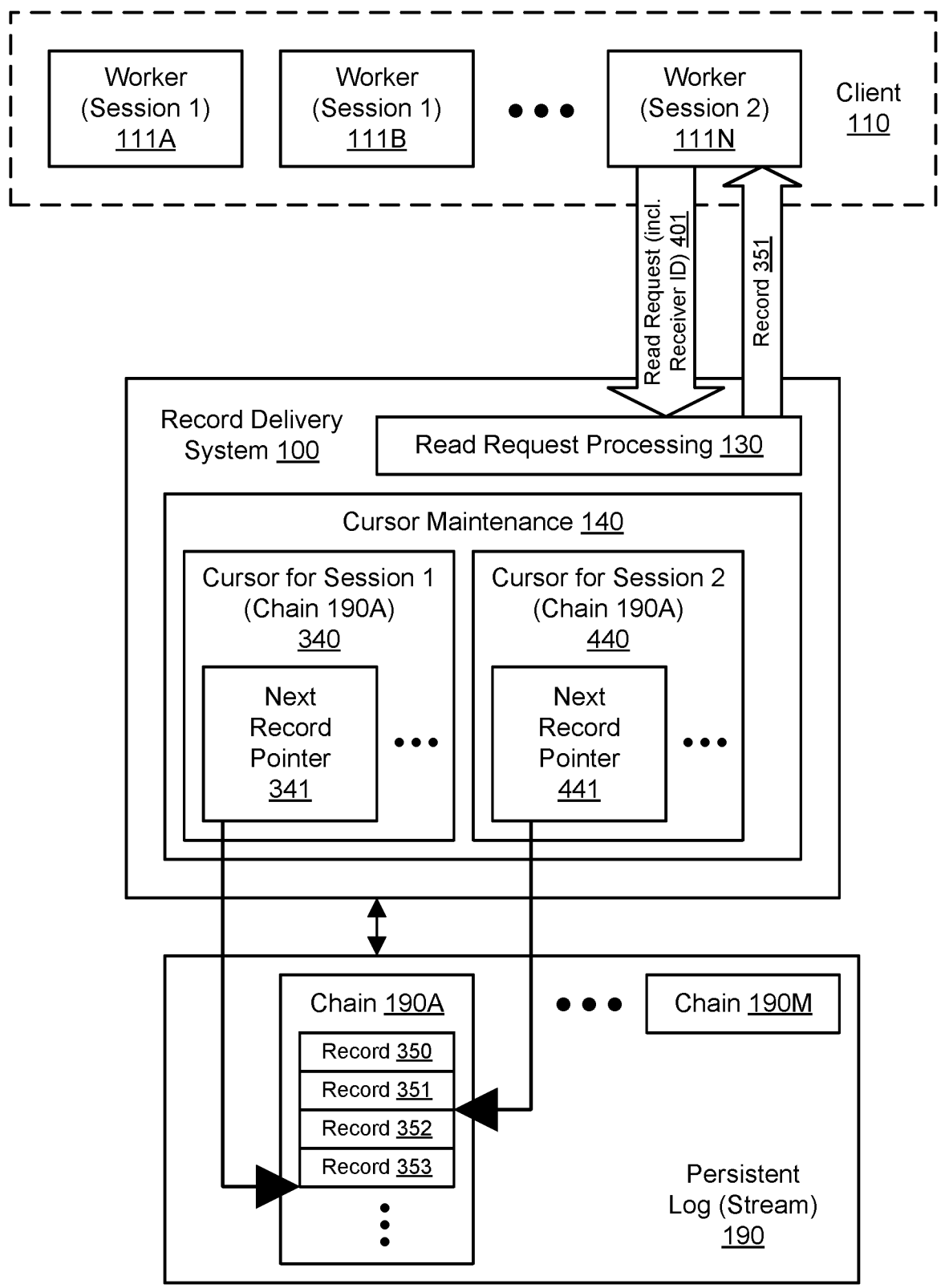
FIG. 4 illustrates further aspects of the example system environment for delivery of log records to stateless clients, including delivery of the same records in multiple sessions, according to some embodiments.

FIG. 4 illustrates further aspects of the example system environment for delivery of log records to stateless clients, including delivery of the same records in multiple sessions, according to some embodiments. A record whose delivery is acknowledged may not be redelivered during the same session; such records may be invisible in the log to the client during the session. However, a record delivered in one session may be delivered (to the same client or a different client) in another session that reads the same stream. In some embodiments, two or more sessions may read from the same stream concurrently or serially, and the sessions may be independent of one another. Two sessions may represent different time ranges within the same stream. Different sessions may read forward or backward within the same stream.

FIG. 4 represents a continuation of the example shown in FIG. 3E. As shown in the example of FIG. 4, the same client 110 may take part in a second session (session 2) to read from the same stream 190. Session 2 may be created with a different receiver ID than session 1. A worker 111N may sent a read request 401 that specifies the receiver ID for session 2. The system 100 may maintain a different cursor 440 for session 2 (and the chain 190A). The next record pointer 341 of this cursor 440 may initially indicate that record 351 is the next record to be sent for session 2. Using this cursor 440, the system 100 may identify and sent record 351 to the worker 111N and then move the pointer 441 to the next record 352.

Figure 5:
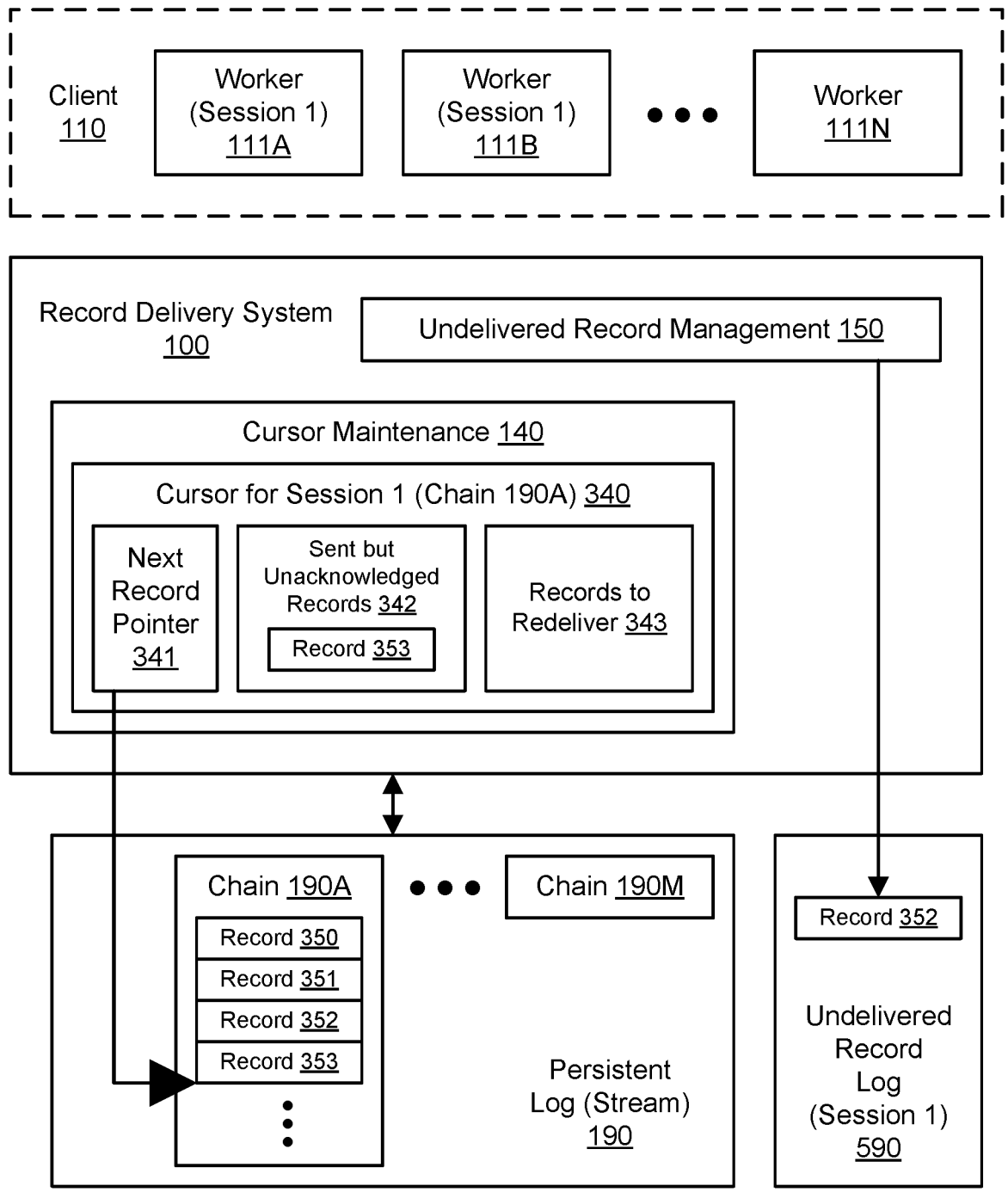
FIG. 5 illustrates further aspects of the example system environment for delivery of log records to stateless clients, including adding records to an undelivered record log, according to some embodiments.

FIG. 5 illustrates further aspects of the example system environment for delivery of log records to stateless clients, including adding records to an undelivered record log, according to some embodiments. As discussed above, using the component 150 for undelivered record management, the system 100 may attempt redelivery of records whose receipt was not acknowledged by the client 110 in a timely manner. Redelivery may be attempted according to a redelivery policy that may specify the number of times to attempt redelivery, the duration between redelivery attempts, and so on. Using the component 150 for undelivered record management, the record delivery system may use an additional stream referred to as an undelivered record log 590 to store records that are deemed undeliverable according to the redelivery policy.

As shown in the example of FIG. 5, the system may move record 352 to the undelivered record log 590 after acknowledgement is not received for the original delivery attempt or the one or more redelivery attempts within some predetermined duration of time. As part of moving record 352 to the undelivered record log 590, the system 100 may update the cursor 340 to indicate that the record 352 will not be redelivered. The undeliverable record log 590 may be specific to a particular session (e.g., session 1), and a name or other identifier of the log may be provided to the client 110 upon creation of the session. The undeliverable record log 590 may be implemented using a different steam and may be accessed by the client using a different receiver session. Clients may also request that particular records be added to the undelivered record log, e.g., for later processing of records that are especially large or complex. In some embodiments, client requests to add specific records to the undelivered record log 590 may be supplied as optional parameters in read requests.

Figure 6:
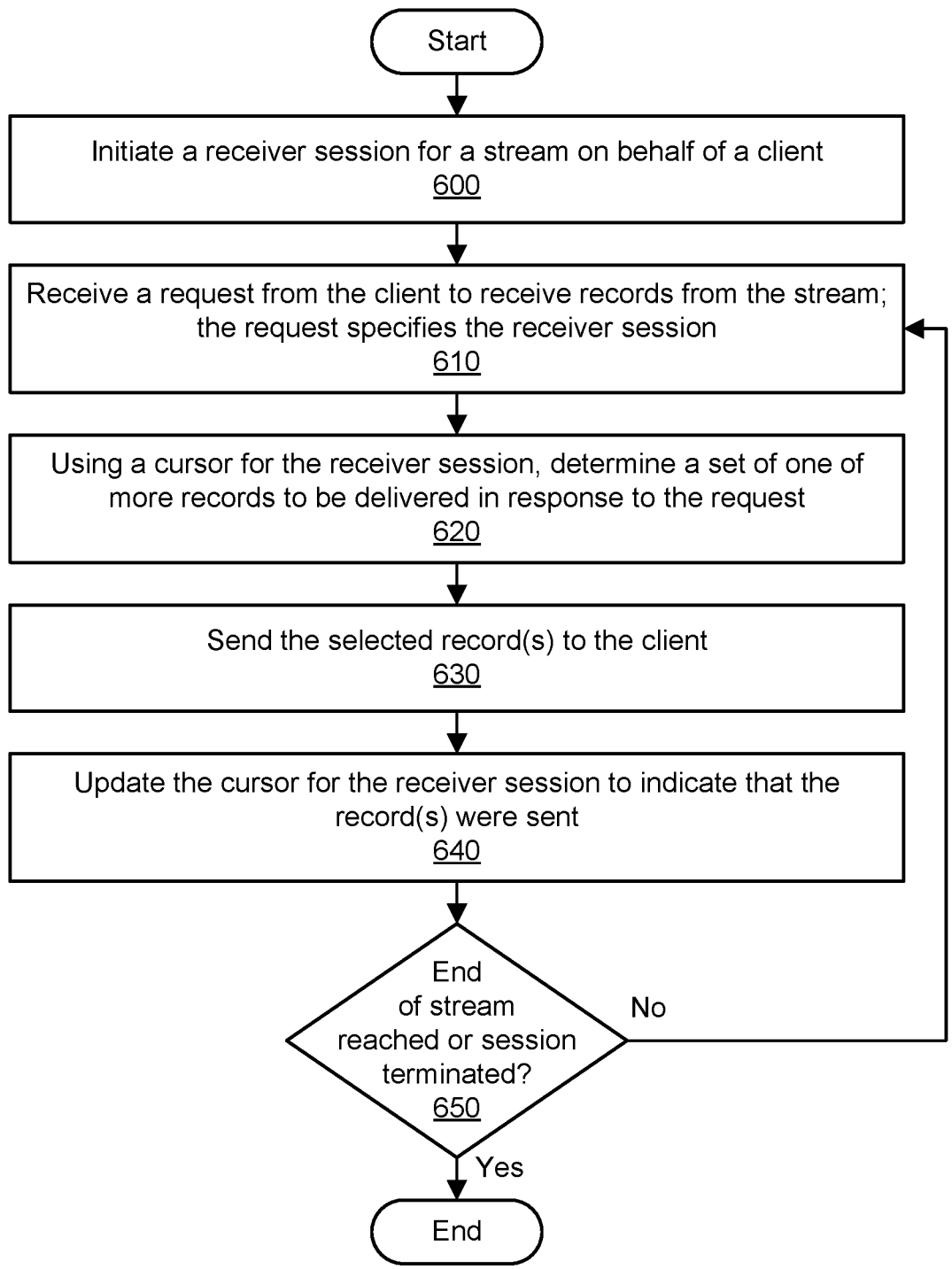
FIG. 6 is a flowchart illustrating a method for delivery of log records to stateless clients, according to some embodiments.

FIG. 6 is a flowchart illustrating a method for delivery of log records to stateless clients, according to some embodiments. As shown in 600, the method may initiate a receiver session for a particular stream on behalf of a client. To request that a receiver session be created, the client may send a create receiver request to a record delivery system. The create receiver request may specify a session ID for the receiver session to be created. The create receiver request may specify a stream ID of the persistent log (stream) from which records will be read. The create receiver request may specify a timestamp from which the records should be read in the stream. Optionally, the create receiver request may specify whether records should be read forwards (from oldest to newest after the specified timestamp) or backwards (from newest to oldest before the specified timestamp). Based on the create receiver request, the record delivery system may initiate a receiver session for the particular client and the specified stream. The record delivery system may send a response to the create receiver request to the client. The create receiver response may specify the receiver ID of the created receiver session. The create receiver response may also specify an identifier of an undelivered record log associated with the session.

During this session, workers associated with the client may submit read requests to the record delivery system, and the record delivery system may respond to each request with one or more records from the stream. Records may be sent to the client according to an ordered sequence of the records in one or more chains of the stream. As shown in 610, the method may receive a request from the client to receive records from the stream. The request may specify an identifier of the receiver session. In some embodiments, to enable stateless clients to receive records from the stream, the read request need not specify particular records to be returned. Accordingly, in some embodiments, the client need not keep track of which records have been received, the next record to be received, or the position of particular records in the sequence of the stream.

As shown in 620, using a cursor associated with the receiver session, the method may determine or select a set of one or more records to be delivered in response to the request. To select one or more records to send in response to the read request, the record delivery system may use the cursor associated with the receiver session. In some embodiments, each chain of the stream may be associated with a chain-specific cursor. The cursor for the relevant session and chain may include various information such as a pointer or reference to the next record in the chain to be sent, an indication (e.g., a range) of sent but unacknowledged records, an indication (e.g., a range) of records to be redelivered, a number of redeliveries attempted for particular undelivered records, and so on.

As shown in 630, the method may send the selected record(s) to the client. In some embodiments, the method may update the list or range of sent but unacknowledged records in the cursor such that it includes a reference to the sent record(s). The record(s) may be removed from the list or range of sent but unacknowledged records in the cursor upon acknowledgment of receipt by the client, e.g., as part of a subsequent read request.

As shown in 640, the method may update the cursor for the receiver session to indicate that the records were sent. The next record pointer of the cursor may be advanced such that it points to (or immediately before) the timestamp or record ID of the next record after the record(s) sent in 630. If records are being read from newest to oldest instead of oldest to newest, then the pointer may instead be moved to an earlier point in time within the stream.

As shown in 650, the method may determine whether the end of the stream has been reached (e.g., after sending the final record in 630) or whether the session has otherwise been terminated (e.g., upon request from the client or upon encountering an error). In some embodiments, clients may choose to automatically end a session when the end of a stream is reached or instead to keep the session alive in case additional records are appended to the stream. If the end of the stream has been reached or the session has otherwise been terminated, then then the receiver session may be terminated and the method may end, or the method may return to 610 to await further read requests as new records are appended to the stream. If the end of the stream has not been reached and the session has not been terminated, then the method may return to 610 to await further read requests.

Globally Ordered Event Stream Logging

Figure 7:
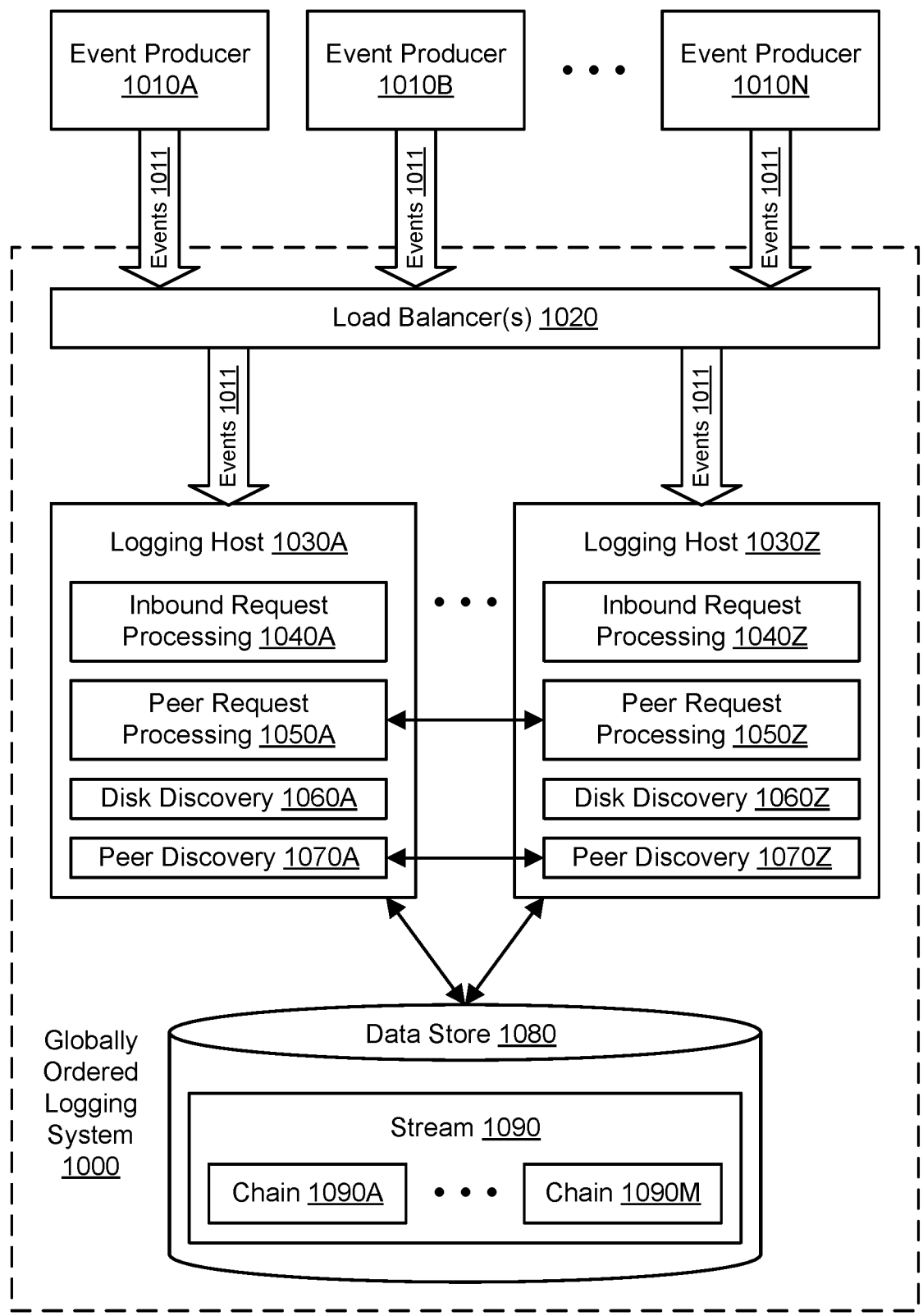
FIG. 7 illustrates an example system environment for globally ordered event stream logging, according to some embodiments.

FIG. 7 illustrates an example system environment for globally ordered event stream logging, according to some embodiments. A globally ordered logging system 1000 may capture data indicative of events 1011 in various chains 1090A-1090M of a stream 1090 maintained in a data store 1080. The data indicative of events 1011 may also be referred to simply as events, and a log entry representing an event may be referred to as an element of the chain. Events 1011 may represent transactions, status changes, status reports, and/or other updates with respect to one or more systems, data sets, data stores, and/or any other suitable items. For example, the events 1011 may relate to financial transactions, orders in an online store, accounting transactions, updates to gift card balances, and so on. Individual events may often represent relatively small amounts of data, e.g., as supplied in byte arrays. In one embodiment, events may be logged using versioned data for efficient use of the data store 1080. A chain of events may be appended to at the head, iterated in either direction, and truncated at the tail, with records in the chain generally deemed immutable. The logging system 1000 may be idempotent such that any given event will be represented once and only once in the stream. A stream may represent a complete log of changes with a global ordering that can be derived from data logged with events across different chains of a stream. In one embodiment, a stream can be searched forward or backward from a point in time or a particular event.

The events 1011 may be generated and provided to the logging system 1000 by a plurality of event producers 1010A-1010N. Although three event producers 1010A, 1010B, and 1010N are shown for purposes of illustration and example, it is contemplated that any suitable number and configuration of event producers may be used to feed events to the logging system 1000. The event producers 1010A-1010N and other clients of the logging system 1000 may represent different processes, systems, and/or computing devices. The event producers 1010A-1010N and other clients of the logging system 1000 may be distributed on multiple computing devices throughout one or more networks, including private networks and/or public networks such as the Internet. The event producers 1010A-1010N and other clients of the logging system 1000 may also be coupled to the logging system through one or more networks, including private networks and/or public networks such as the Internet. As will be discussed in greater detail below, the event producers 1010A-1010N and other clients of the logging system 1000 may interact with the logging system 1000 using one or more suitable interfaces, such as one or more application programming interfaces (APIs), e.g., to invoke the functionality of the logging system.

The chains 1090A-1090M may be stored in one or more data stores such as data store 1080. In one embodiment, the data store 1080 may represent a key-value data store that stores key-value pairs using any suitable storage technology. The keys may represent identifiers of portions of the chains, and the corresponding values may represent the contents of those portions (including elements that represent events). In one embodiment, the data store 1080 may represent a distributed hash table (DHT). To store key-value pairs, the DHT may be implemented as a decentralized system that offers a lookup service similar to a hash table. In one embodiment, any participating node of the DHT may efficiently retrieve the value associated with a given key. The DHT may scale to very large numbers of nodes and may be capable of handling node arrivals, node departures, and node failures. In one embodiment, the data store 180 supports operations such as conditional put, conditional delete, and get in order to interact with the logging system 1000.

The data store 1080 may store multiple streams, each having its own set of chains. When a stream is created (e.g., by an event producer or other client invoking a particular API), the stream may be assigned a stream identifier. The stream identifier may include an alphanumeric identifier. The stream identifier may also indicate the number of chains (shards) in the stream. For example, the identifier for a stream named ABC may be ABC: 3 if the stream initially includes three chains. The number of chains in the stream may be determined based on input to the API that creates the stream or based on a default or pre-configured value. In one embodiment, a stream may not have fewer than a predetermined minimum number of chains (e.g., 2), even as the number of chains dynamically grows and shrinks over time. In one embodiment, the name or identifier of a chain of a stream may be derived from the stream identifier. For example, given a stream identifier ABC: 3, the individual chains may be identified as ABC: 3:0, ABC: 3:1, and ABC: 3:2. The initially created chains for a stream may be referred to as root chains, and child chains may be added to the stream from parent chains such as root chains. Individual chains may also be referred to as buffer chains and are discussed in greater detail below, e.g., with respect to FIG. 11A through FIG. 16.

The logging system 1000 may include various components or functionalities. In one embodiment, the logging system 1000 may include one or more load balancers 1020. The load balancer(s) 1020 may accept requests to log events 1011 from event producers 1010A-1010N and may route those requests to appropriate logging hosts of a fleet of logging hosts 1030A-1030Z. The load balancer(s) 1020 may route requests based (at least in part) on the availability or latency of various hosts 1030A-1030Z, e.g., to balance the load across the fleet. In one embodiment, particular hosts may be said to "own" particular chains, but the load balancer(s) 1020 may route requests to hosts without regard to such ownership claims. Individual hosts may instead determine chain ownership using disk discovery and/or peer discovery and may route requests to other hosts accordingly. In one embodiment, the fleet of hosts 1030A-1030Z may be scaled up or down as needed, e.g., by provisioning additional hosts from a pool of available compute instances to meet additional logging traffic and/or returning hosts to the pool of available compute instances when logging traffic decreases. The fleet of hosts may be implemented using computational resources of a multi-tenant provider network.

In one embodiment, a logging host may include a component for inbound request processing, such as inbound request processing 1040A for logging host 1030A and inbound request processing 1040Z for logging host 1030Z. Using the inbound request processing, a host may process a request to log an event from the load balancer(s) 1020. In one embodiment, when a host receives an inbound request, the host may randomly select one of the chains in the stream for logging the event. The identifier of the selected chain may be derived from the stream identifier, where the stream identifier indicates the number of chains as discussed above. In one embodiment, a host may log an event from an inbound request to a selected chain if the host examines the contents (if any) of the chain in the data store 1080 and determines that no other host "owns" the chain. In one embodiment, a logging host may include a component for peer request processing, such as peer request processing 1050A for logging host 1030A and peer request processing 1050Z for logging host 1030Z. Using the peer request processing, a host may process a request to log an event from another host. In one embodiment, a host may process an inbound request by forwarding the request to another host as a peer request, e.g., if the host determines that the other host owns or last modified the particular chain. In one embodiment, a host that receives such a peer request may log the event in the request to the selected chain.

Hosts may obtain information about chains 1090A-1090M and other hosts using both disk discovery and peer discovery. In one embodiment, a logging host may include a component for disk discovery, such as disk discovery 1060A for logging host 1030A and disk discovery 1060Z for logging host 1030Z. Using the disk discovery, a host may examine the contents (if any) of a chain in the data store 1080 to discover the existence of other hosts, the ownership status (if any) of the chain with respect to another host, and so on. In one embodiment, a logging host may include a component for peer discovery, such as peer discovery 1070A for logging host 1030A and peer discovery 1070Z for logging host 1030Z. Using the peer discovery, hosts may exchange information regarding the existence of other hosts, the existence of chains in the stream, the ownership status (if any) of chains with respect to other hosts, the health or availability of other hosts, the clock times at other hosts, and so on. The information discovered from disk and/or peer exchange may be used for routing of inbound requests to other hosts (e.g., hosts that "own" or last modified particular chains or hosts that can handle more throughput). The information discovered from disk and/or peer exchange may also be used for generation of approximate timestamps that can be logged to disk with events and potentially used to determine the global ordering of events in different chains of the stream 1090. The disk discovery may be used to implement a "best effort" leader election strategy based (at least in part) on the last host to update a chain, if the host is available. A new host may claim ownership of a chain if the previous owner is unreachable or unresponsive.

In one embodiment, the logging system 1000 may order events using both wall clock time and chain time. Wall clock time may represent the traditional system time taken from the clock of a computing system such as a logging host. Chain time may represent the sequence number of an event within a chain. Events in a particular chain may be internally ordered by definition. The logging system 1000 may weave multiple chains of a stream into a global ordering using cross-pollination of wall clock times from different hosts as well as chain times and other metadata (e.g., "happens before" and/or "happens after" references to other events) to determine approximate timestamps for events. The cross-pollination of time data may permit the logging system 1000 to determine the global order of events and also construct stable wall clock approximations that do not suffer from clock skew at individual hosts.

The logging system 1000 may distribute events across a set of chains to avoid high throughput (in transactions per second or TPS) against an individual chain. The logging hosts that flush to each chain may bundle any number of events into a single flush to the underlying data store 1080. However, the more events that are bundled, the larger the flush, and the more write units are used. Thus, to distribute heat, multiple chains may be employed in a stream. The volume of events may grow to a large enough number that additional chains may be spawned to maintain high availability and low latency. Excessively high or low volume to a chain may be detected by generally restricting chain updates to be performed by a single host. To spawn a new chain, an entry into the parent chain may be logged with the chain ID of the child chain. The child may continue to exist until its death is recorded in the child itself. During its life, the parent may include the child reference continuously in all updates. Thus the logging system 1000 may deterministically know the identities of all chains in a stream at any given point in time.

In one embodiment, the logging system 1000 may implement high read fan-out. The logging system 1000 may permit hundreds or thousands of consumers to read from the same stream in a substantially concurrent manner. To enable the high read fan-out, the logging system 1000 may enable caching such that most reads of the stream are served from caches of the log (not head) content. To enable the high read fan-out, the logging system 1000 may also enable read/write separation. While a single host may performs most or all writes to a given chain in the stream, any host may perform the read from the chain. In one embodiment, each host may also have a limited cache of history nodes so that very high TPS streams get some edge-caching benefit.

It is contemplated that the logging system 1000 may include additional components not shown, fewer components than shown, or different combinations, configurations, or quantities of the components shown. The logging system 1000 may comprise one or more computing devices, any of which may be implemented by the example computing device 3000 illustrated in FIG. 17. In various embodiments, portions of the logging system 1000 may be provided by the same computing device or by any suitable number of different computing devices. If any of the components of the logging system 1000 are implemented using different computing devices, then the components and their respective computing devices may be communicatively coupled, e.g., via a network. Each of the illustrated components may represent any combination of software and hardware usable to perform their respective functions.

In one embodiment, the functionality of the logging system 1000 may be provided to event producers 1010A-1010N and other clients as a web-accessible service. The functionality of the logging system 1000 may be presented to clients using a provider network. A network set up by an entity such as a company or a public sector organization to provide one or more services (such as various types of cloud-based computing or storage) accessible via the Internet and/or other networks to a distributed set of clients may be termed a provider network. A provider network may include numerous data centers hosting various resource pools, such as collections of physical and/or virtualized computer servers, storage devices, networking equipment and the like, that are used to implement and distribute the infrastructure and services offered by the provider. The resources may, in some embodiments, be offered to clients in units called "instances," such as virtual or physical compute instances or storage instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices, and the like.

The logging hosts 1030A-1030Z may be distributed on multiple computing devices throughout one or more networks, including private networks and/or public networks such as the Internet. In one embodiment, at least some of the functionality of the logging system 1000 may be implemented as a library of functions, and the logging hosts 1030A-1030Z may represent implementations of the library. For example, the event producers 1010A-1010N may represent programs that include the library in their program code. Using the logging system 1000 as implemented using the logging hosts 1030A-1030Z, multiple entities may access a chain concurrently, e.g., to read elements from the chain, delete elements from the chain, iterate through the chain, search in the chain, and so on. The distributed nature of the logging system 1000 may enable many logging hosts to read a large chain more quickly than a single logging host could perform the same task. In some embodiments, a plurality of entities within the logging system 1000 may access a plurality of chains concurrently, e.g., to read elements from the chains, delete elements from the chains, iterate through the chains, search in the chains, and so on.

The logging system 1000 may perform mutating operations (e.g., addition and deletion) in a first-in, first-out manner. The logging system 1000 may perform read operations using random access and/or sequential access. The logging system 1000 may be especially useful for maintaining logs in many types of domains, including financial transaction logs, job processing logs, event stream logs, and so on. The logging system 1000 and logging hosts 1030A-1030Z may represent stateless components with persistence managed by the data store 1080. In one embodiment, the logging hosts 1030A-1030Z may not use a formal leader election system to assign ownership of chains. For a single chain, the availability for the logging system 1000 as a whole may be equivalent to the availability of a single file (representing the head of a chain) in the data store 1080. For many chains, the availability for the logging system 1000 as a whole may be equivalent to the availability of the underlying data store 1080. For stateful clients (e.g., clients that can pass in the result of the last put to a chain), the latency of the logging system 1000 may be equivalent to a single conditional put to the data store. By storing the elements in multiple records, the logging system 1000 may scale to chains of an indefinitely large size if the underlying data store 1080 permits. By storing nodes with a sequential numbering scheme within a chain, random access of nodes may be performed without a need to link from node to node or without a need to keep the nodes linked within the head or otherwise synchronized with the head.

Figure 8A:
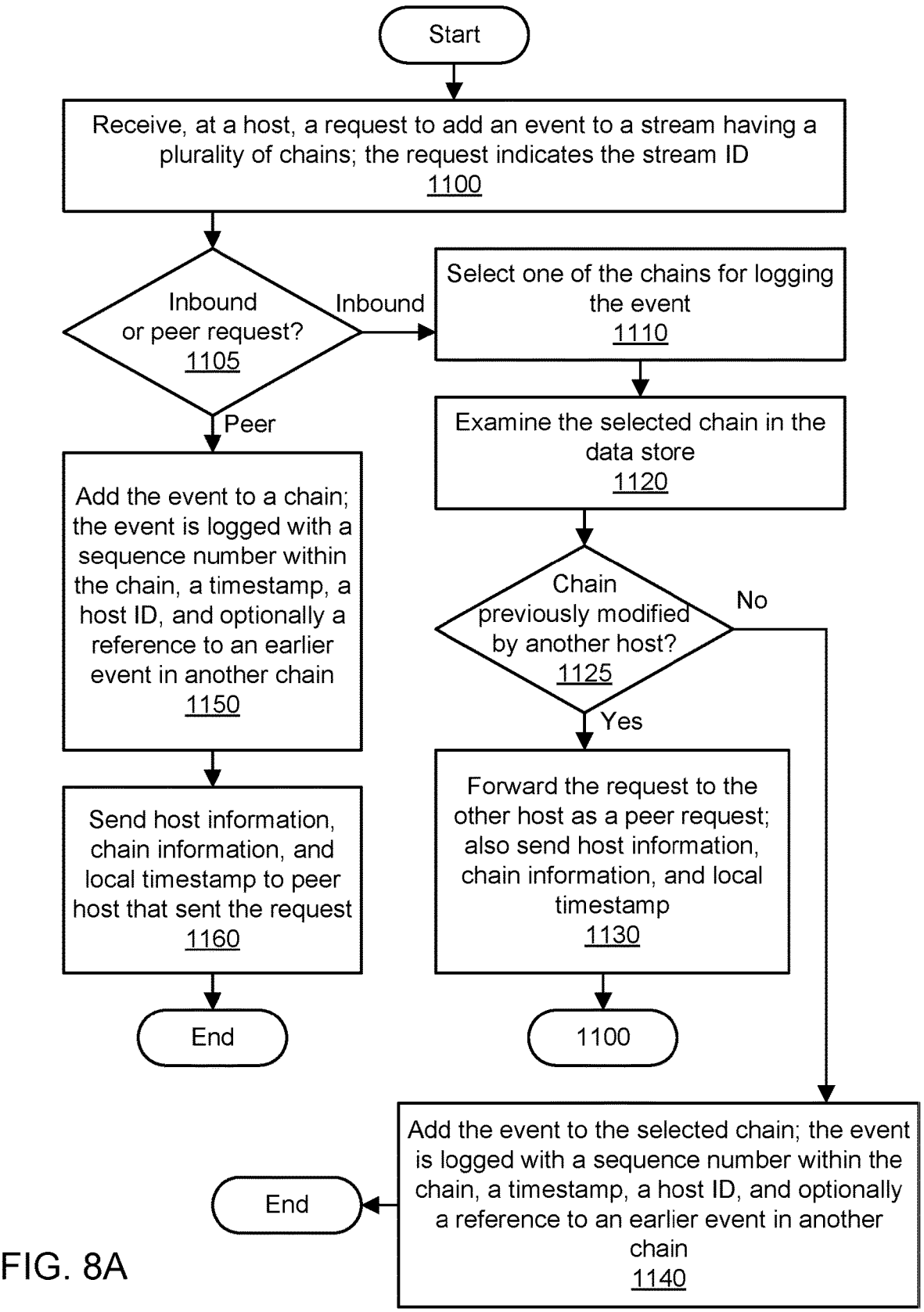
FIG. 8A and FIG. 8B are flowcharts illustrating methods for globally ordered event stream logging, according to some embodiments.

FIG. 8A is a flowchart illustrating a method for globally ordered event stream logging, according to some embodiments. As shown in 1100, a host may receive a request to add an event to a stream. The stream may have a plurality of chains, and the number of chains may be indicated in the stream identifier associated with the request. The event may include a byte array or other data structure. The request may be received via a load balancer that distributes traffic among a fleet of logging hosts or another host in the fleet. As shown in 1205, the method may determine whether the request is an inbound request (e.g., from a load balancer) or a peer request (e.g., from another host). The host may process peer requests differently from inbound requests.

As shown in 1110, if the request is an inbound request, the host may select one of the chains of the identified stream for logging the event. The stream identifier may indicate the number of chains (shards) in the stream. For example, the identifier for a stream named ABC may be ABC: 3 if the stream initially includes three chains. In one embodiment, the name or identifier of a chain may be derived from the stream identifier. For example, given a stream identifier ABC: 3, the individual chains may be identified as ABC: 3:0, ABC: 3:1, and ABC: 3:2. In one embodiment, the host may randomly select one of these chains for logging the event.

As shown in 1120, the host may examine the selected chain in the data store via the chain identifier (e.g., ABC: 3:0) derived from the stream identifier. In this process referred to as disk discovery, the host may determine whether the chain has previously been modified by logging any events, and if so, the host may determine the identity of the last host that appended to the chain. As shown in 1125, the method may determine whether the chain has previously been modified by another host. If so, the method may identify the host that last logged to the chain. This host may be deemed to be the owner of the chain.

As shown in 1130, the host may forward the request to log the event to the other host that owns the chain. The request sent to the other host may be considered a peer request. The request may indicate the chain identifier previously selected in 1110. In sending the peer request, the host may send additional information to the other host, such as information indicative of other hosts known to the host, information indicative of other chains known to the host, and a local timestamp (e.g., wall clock time) at the host. For example, the information may indicate a known ownership of particular hosts and particular chains. As another example, the information may indicate new or unowned chains of the stream for which the recipient host can claim ownership. As a further example, the information may indicate health information for hosts such as their reachability (or lack thereof), estimated throughput in transactions per second, and estimated latency of performing logging operations. Via this process of peer discovery, hosts may learn about the state of the fleet and the state of the chains as well as acquire clock information that can be used to compute a stable increasing wall clock time for logged events. The method may proceed with the operation shown in 1100.

If the chain was not previously modified by another host, then the ownership of the chain can be claimed by this host. Similarly, if the target of the peer request does not respond, then the ownership of the chain can be claimed by this host. As shown in 1140, the host may log the event itself, a sequence number within the chain (increasing with each additional event), a timestamp, and the identifier of the host performing the logging. In one embodiment, the timestamp may be calculated based on one or more sources of input. For example, the timestamp may be using the wall clock time from the logging host and potentially also from one or more peer hosts, e.g., as acquired via peer discovery. In one embodiment, the timestamp of the current event may only be later than the timestamp of an earlier-logged event in this chain or in another chain and known to this host. In one embodiment, the host may also log a reference to an earlier event in another chain. This reference may represent "happens after" metadata that can be used to reconstruct a global order of events across different chains. The sequence numbers within a chain may be used to construct the order of events within that chain. In one embodiment, upon successful logging of the event, the host may respond to the load balancer (which may then respond to the client) with an acknowledgement of the successful logging and an event identifier that captures the stream, the chain, and the sequence number within the chain (e.g., ABC: 3:0:0).

As shown in 1150, if the request is a peer request received from another host, then the recipient host may add the event to a chain. In one embodiment, the recipient host may select any chain of the stream that is owned by the host. In one embodiment, the recipient host may select a chain based (at least in part) on state information maintained by the host in order to optimize the logging. In one embodiment, the host may select the same chain that was selected by the host that generated the peer request, e.g., if the host owns only that one chain. However, the recipient host may reach a different decision if it has more knowledge about chains than the host that sent the peer request. The host may log the event itself, a sequence number within the chain (increasing with each additional event), a timestamp, and the identifier of the host performing the logging. In one embodiment, the timestamp may be calculated based on numerous sources of input. For example, the timestamp may be determined as a mean or median of wall clock times from the logging host and also from one or more peer hosts, e.g., as discovered via the peer request and/or other peer discovery. In one embodiment, the timestamp of the current event may only be later than the timestamp of an earlier-logged event in this chain or in another chain and known to this host. In one embodiment, the host may also log a reference to an earlier event in another chain. This reference may represent "happens after" metadata that can be used to reconstruct a global order of events across different chains. Again, the sequence numbers within a chain may be used to construct the order of events within that chain. In one embodiment, upon successful logging of the event, the host may respond to the host that sent the peer request (which may then respond to the load balancer, which may then respond to the client) with an acknowledgement of the successful logging and an event identifier that captures the stream, the chain, and the sequence number within the chain (e.g., ABC: 3:0:1).

As shown in 1160, the recipient of the peer request may respond to the sender of the peer request with host information, chain information, and the local timestamp (e.g., wall clock time) of the host. For example, the information may indicate a known ownership of particular hosts and particular chains. As another example, the information may indicate new or unowned chains of the stream for which the recipient host can claim ownership. As a further example, the information may indicate health information for hosts such as their reachability, estimated throughput in transactions per second, and estimated latency of performing logging operations. Via this process of peer discovery, hosts may learn about the state of the fleet and the state of the chains as well as acquire clock information that can be used to compute a stable increasing wall clock time for logged events.

Figure 8B:
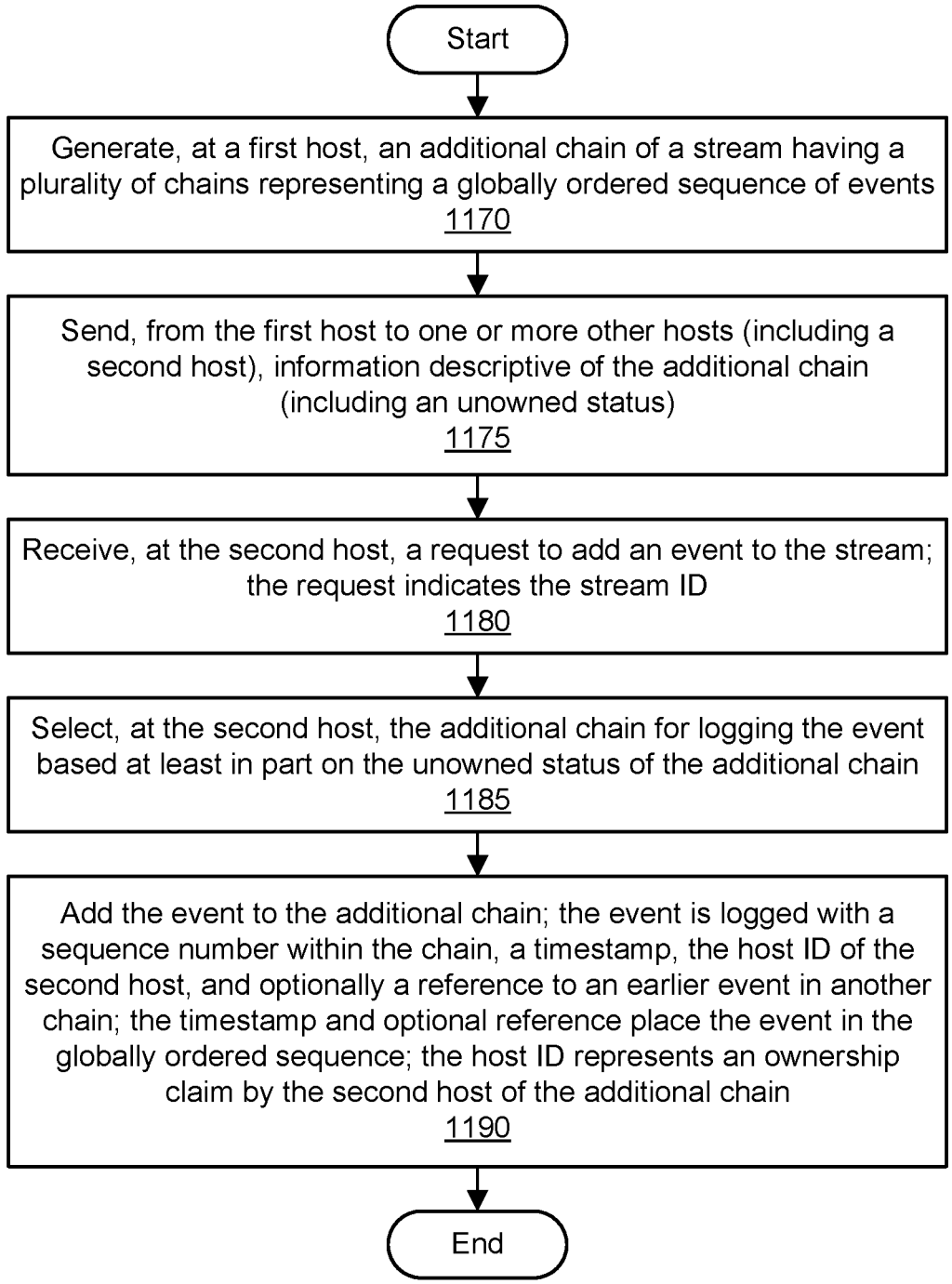

FIG. 8B is a flowchart illustrating a method for globally ordered event stream logging, according to some embodiments. As shown in 1170, a first host of a fleet of hosts may generate an additional chain of a stream. The stream may include a plurality of existing chains prior to the addition. The stream may represent a globally ordered sequence of events. The first host may decide to add the additional chain based (at least in part) on one or more performance metrics associated with the first host. For example, the first host may be under strain as evidenced by a high throughput metric, and the first host may seek to reduce its strain by adding a chain to the set of chains of the stream. The additional chain may represent a child chain of a parent chain that is "owned" by the first host. As shown in 1175, the first host may send information descriptive of the additional chain to one or more other hosts, such as a second host. The information may include an identifier of the additional chain and an unowned and/or newly created status of the additional chain.

As shown in 1180, the second host may receive a request to add an event to a stream. The event may include a byte array or other data structure. The request may be received via a load balancer that distributes traffic among a fleet of logging hosts or another host in the fleet. As shown in 1185, the second host may select the additional chain for logging the event. In one embodiment, the second host may select the additional chain based (at least in part) on the unowned status of the additional chain. The request may include a stream identifier of the stream that includes the additional chain. In one embodiment, the additional chain may be identified based (at least in part) on the stream identifier.

If the additional chain was not previously modified or otherwise claimed by another host, then the ownership of the chain can be claimed by the second host. As shown in 1190, the second host may log the event itself, a sequence number within the chain (increasing with each additional event), a timestamp, and the identifier of the host performing the logging. In one embodiment, the timestamp may be calculated based on one or more sources of input. For example, the timestamp may be using the wall clock time from the logging host and potentially also from one or more peer hosts, e.g., as acquired via peer discovery. In one embodiment, the timestamp of the current event may only be later than the timestamp of an earlier-logged event in this chain or in another chain and known to this host. In one embodiment, the host may also log a reference to an earlier event in another chain. This reference may represent "happens after" metadata that can be used to reconstruct a global order of events across different chains. The sequence numbers within a chain may be used to construct the order of events within that chain. Metadata logged with the event such as the timestamp and the optional reference may be used to place the event in a globally ordered sequence across a plurality of chains of the stream. In one embodiment, the host identifier logged with the event may represent an ownership claim by the second host of the additional chain.

Figure 9A:
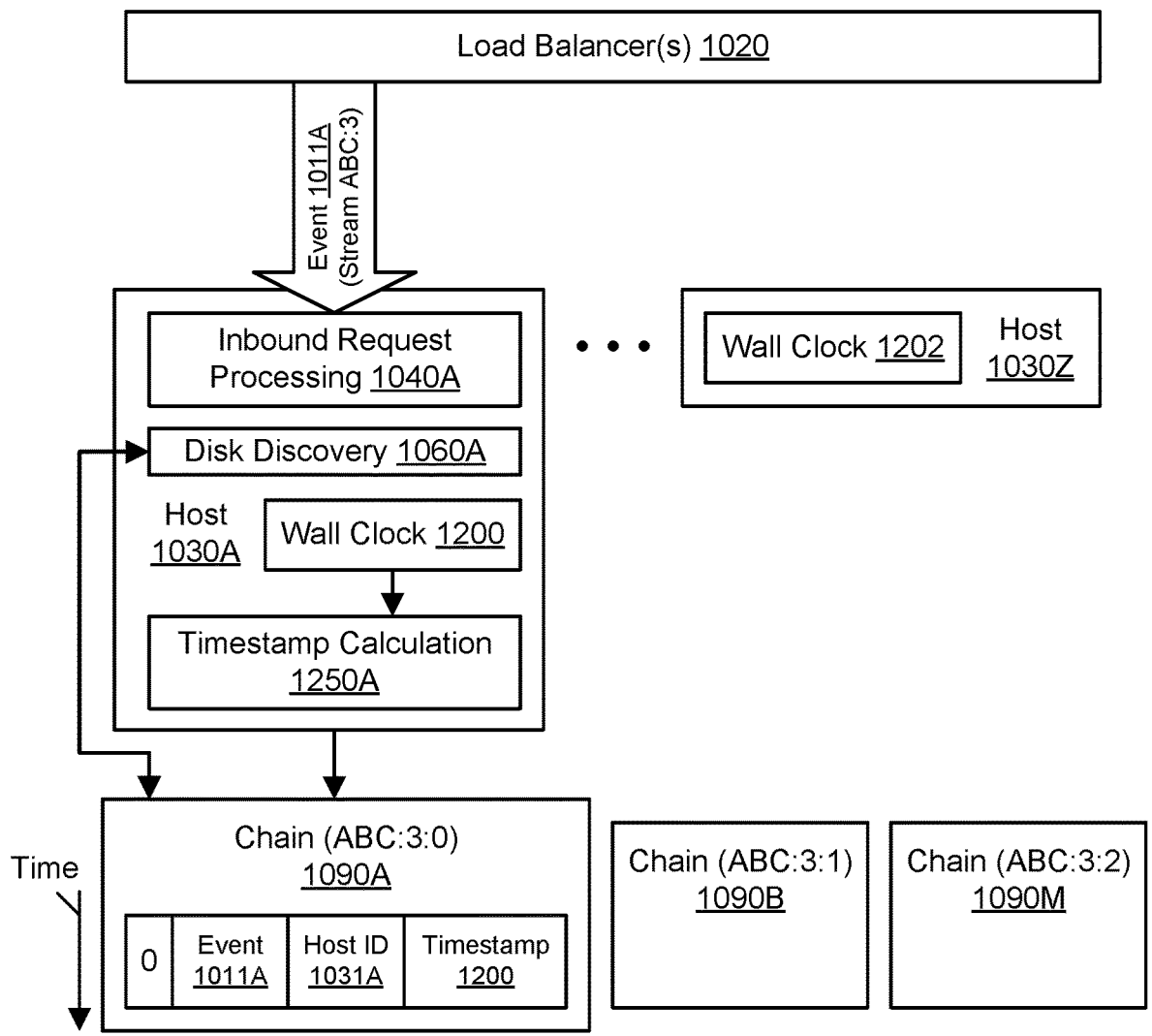
FIG. 9A through FIG. 9D illustrate examples of globally ordered event stream logging by multiple hosts in a stream with multiple chains, according to some embodiments.

FIG. 9A through FIG. 9D illustrate examples of globally ordered event stream logging by multiple hosts in a stream with multiple chains, according to some embodiments. As shown in FIG. 9A, a host 1030A may receive a request to log an event 1011A from the load balancer(s) 1020. The event 1011A may include or otherwise be associated with a stream identifier ABC: 3, where the stream identifier indicates that the stream has three chains. Upon receipt of this request, the host 1030A may select (e.g., at random) one of the chains of the stream for logging the event. For example, the host 1030A may select the chain 1090A with the identifier ABC: 3:0 but not the chain 1090B (having the identifier ABC: 3:1) or the chain 1090M (having the identifier ABC: 3:2). Using disk discovery 1060A, the host 1030A may examine at least a portion of the chain 1090A (e.g., the head of the buffer chain) to determine the status of the chain. As shown in the example of FIG. 9A, the chain 1090A is previously unmodified, and so the host 1030A may claim ownership. The host 1030A may append the event 1011A to the chain 1090A along with a sequence number (zero) and the host's ID 1031A.

In one embodiment, the host 1030A may also log the event 1011A with a wall clock time 1200. The wall clock time 1200 may be the current time at the host 1030A when the event 1011A is logged. At the same point in time, another host in the fleet may have a different wall clock time, e.g., wall clock 1202 at host 1030Z. However, as this other host 1030Z is yet unknown to the host 1030A, the host 1030A is unable to use the wall clock 1202 in performing a timestamp calculation 1250A for the event 1011A. In some embodiments, therefore, the host 1030A may log the event 1011A either with a timestamp 1200 based on the host's own wall clock time 1200 or a timestamp beginning at a sufficiently early point, e.g., zero. In one embodiment, upon successful logging of the event, the host 1030A may respond to the load balancer (which may then respond to the client) with an acknowledgement of the successful logging and an event identifier that captures the stream, the chain, and the sequence number within the chain (e.g., ABC: 3:0:0).

Figure 9B:
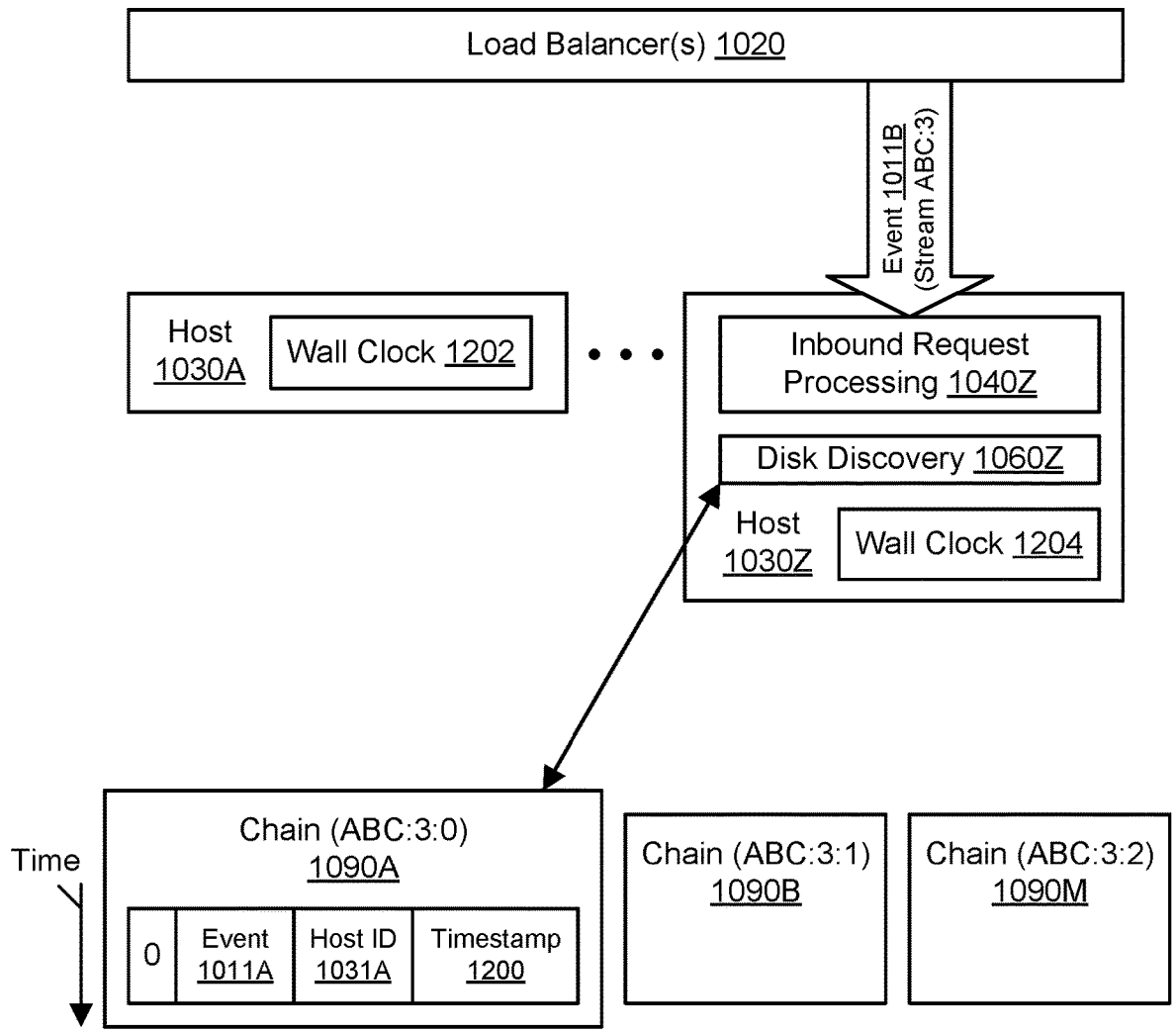

FIG. 9B continues the example of FIG. 9A at a later point in time. In particular, FIG. 9B may occur at wall clock time 1202 at host 1030A and wall clock time 1204 at host 1030Z. As shown in FIG. 9B, a host 1030Z may receive a request to log an event 1011B from the load balancer(s) 1020. The event 1011B may include or otherwise be associated with a stream identifier ABC: 3, where the stream identifier indicates that the stream has three chains. Upon receipt of this request, the host 1030Z may select (e.g., at random) one of the chains of the stream for logging the event. For example, the host 1030Z may select the chain 1090A with the identifier ABC: 3:0 but not the chain 1090B (having the identifier ABC: 3:1) or the chain 1090M (having the identifier ABC: 3:2). Using disk discovery 160Z, the host 1030Z may examine at least a portion of the chain 1090A (e.g., the head of the buffer chain) to determine the status of the chain. As shown in the example of FIG. 9B, the chain 1090A was most recently modified by the other host 1030A (as indicated by the host ID 1031A logged with event 1011A), and so the host 1030Z may not claim ownership of the chain but may instead seek to have the other host 1030A perform the logging of the event 1011B.

Figure 9C:
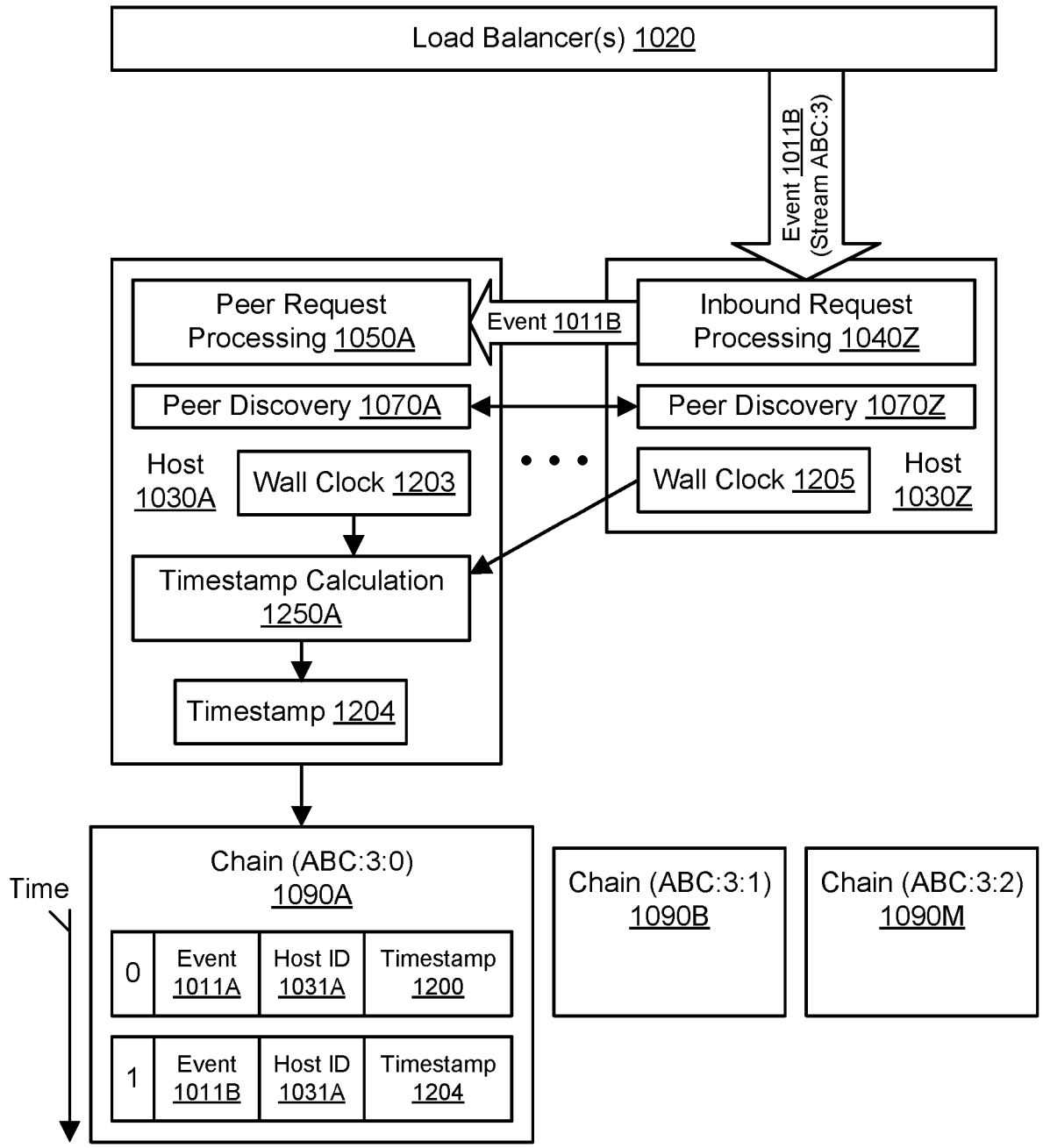

FIG. 9C continues the example of FIG. 9B at a later point in time. In particular, FIG. 9C may occur at wall clock time 1203 at host 1030A and wall clock time 1205 at host 1030Z. As shown in FIG. 9C, the host 1030A may receive a peer request to log an event 1011B from another host 1030Z. The peer request may indicate the identifier ABC: 3:0 of the selected chain 1090A. The peer request may be sent along with peer discovery information, such as any hosts known to host 1030Z, any chains known to host 1030Z, the ownership status of the chains (if known), the health and performance of the hosts (if known), and the current wall clock time 1205 at host 1030Z.

The host 1030A may append the event 1011B to the chain 1090A along with a sequence number (one) and the host's ID 1031A. In one embodiment, the host 1030A may also log the event 1011B with a timestamp indicating the relative position of the event in a global ordering across all the chains of the stream. Using the timestamp calculation 1250A, the host 1030A may calculate an appropriate timestamp 1204 for the event 1011B. In one embodiment, the timestamp 1204 may be calculated as a mean of the wall clock time 1203 at host 1030A and the wall clock time 1205 at the host 1030Z. The timestamp 1204 may be calculated so that is later than the timestamp of any preceding event in the same chain or other chains. In one embodiment, upon successful logging of the event, the host 1030A may respond to the other host 1030Z (which may then respond to the load balancer, which may then respond to the client) with an acknowledgement of the successful logging and an event identifier that captures the stream, the chain, and the sequence number within the chain (e.g., ABC: 3:0:1). The host 1030A may also send its own peer discovery information to the host 1030Z, along with its wall clock time 1203 at the time of logging the event 1011B.

Figure 9D:
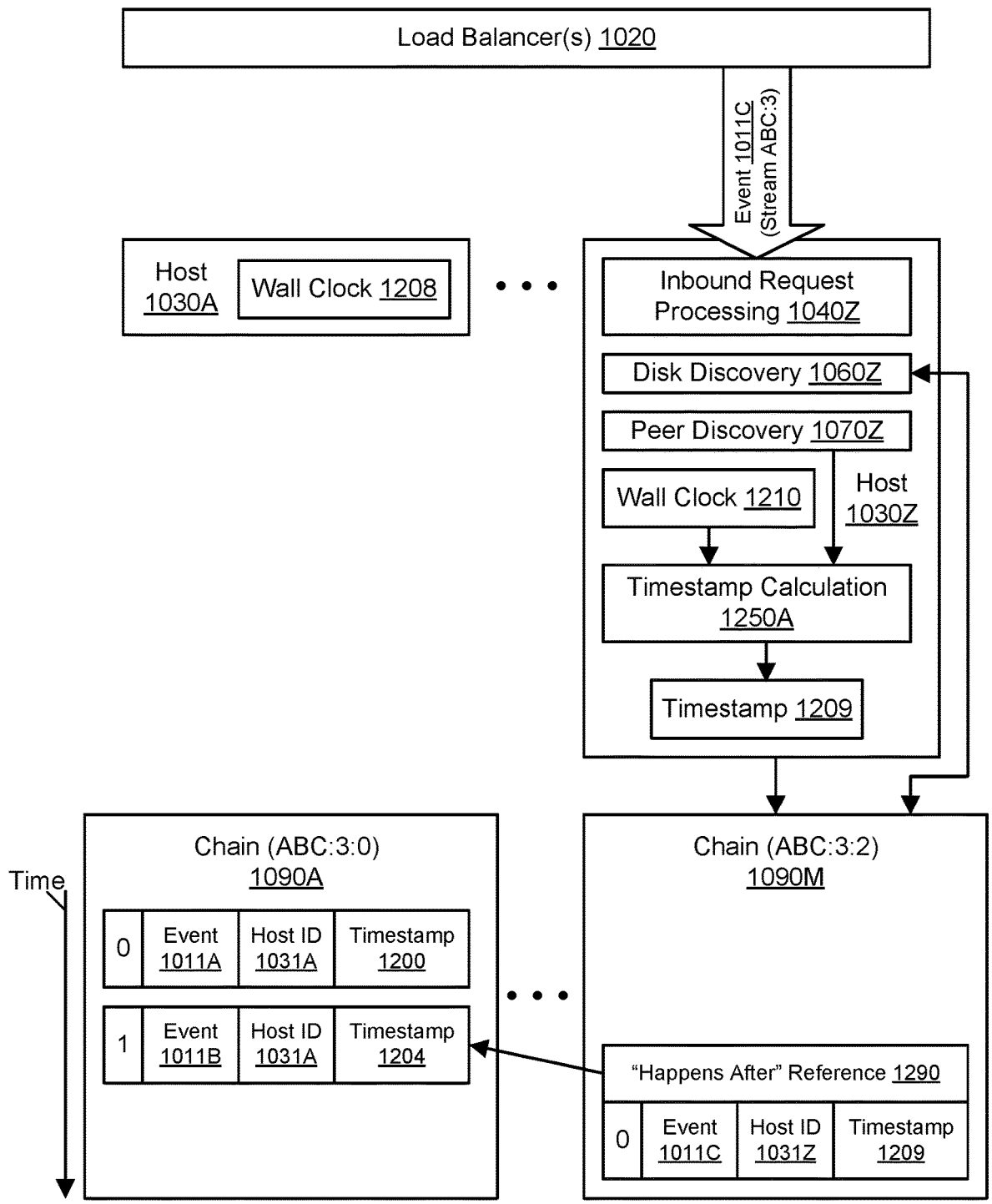

FIG. 9D continues the example of FIG. 9C at a later point in time. In particular, FIG. 9D may occur at wall clock time 1208 at host 1030A and wall clock time 1210 at host 1030Z. As shown in FIG. 9D, the host 1030Z may receive an inbound request to log an event 1011C from the load balancer(s) 1020. The event 1011C may include or otherwise be associated with a stream identifier ABC: 3, where the stream identifier indicates that the stream has three chains. Upon receipt of this request, the host 1030Z may select (e.g., at random) one of the chains of the stream for logging the event. For example, the host 1030A may select the chain 1090M with the identifier ABC: 3:2. Using disk discovery 1060Z, the host 1030Z may examine at least a portion of the chain 1090M (e.g., the head of the buffer chain) to determine the status of the chain. As shown in the example of FIG. 9D, the chain 1090M is previously unmodified, and so the host 1030Z may claim ownership. The host 1030Z may append the event 1011C to the chain 1090M along with a sequence number (zero) and the host's ID 1031Z.

In one embodiment, the host 1030Z may also log the event 1011C with a timestamp indicating the relative position of the event in a global ordering across all the chains of the stream. Using the timestamp calculation 1250Z, the host 1030Z may calculate an appropriate timestamp 1205 for the event 1011C. In one embodiment, the timestamp 1209 may be determined for the event 1011C even though the wall clock time 1310 at the host 1030Z is based (at least in part) on the host 1030Z's knowledge of other wall clocks in the fleet. In one embodiment, the timestamp 1209 may be calculated as a mean of the wall clock time 1208 at host 1030A and the wall clock time 1210 at the host 1030Z. The timestamp 1209 may be generated so that is later than the timestamp of any preceding event in the same chain or other chains. In one embodiment, upon successful logging of the event, the host 1030Z may respond to the load balancer(s) 1020 (which may then respond to the client) with an acknowledgement of the successful logging and an event identifier that captures the stream, the chain, and the sequence number within the chain (e.g., ABC: 3:2:0). The event identifiers may be alpha-sortable so that a set of events may be placed in a global order by sorting their respective event identifiers.

In one embodiment, the host 1030Z may also log the new event 1011C with a reference 1290 to the earlier event 1011B that is known to the host. This reference may represent "happens after" metadata that can be used to reconstruct a global order of events across different chains. The logging system 1000 may weave multiple chains of a stream into a global ordering using cross-pollination of wall clock times from different hosts as well as chain times and other metadata (e.g., "happens before" and/or "happens after" references to other events) to determine approximate timestamps for events. The cross-pollination of time data may permit the logging system 1000 to determine the global order of events and also construct stable wall clock approximations that do not suffer from clock skew at individual hosts. Using the techniques described herein, a stream may represent a complete log of changes with a global ordering that can be derived from data logged with events across different chains of a stream. Due to the construction of a global order across different chains, a stream can be searched forward or backward from a point in time or a particular event.

Figure 10A:
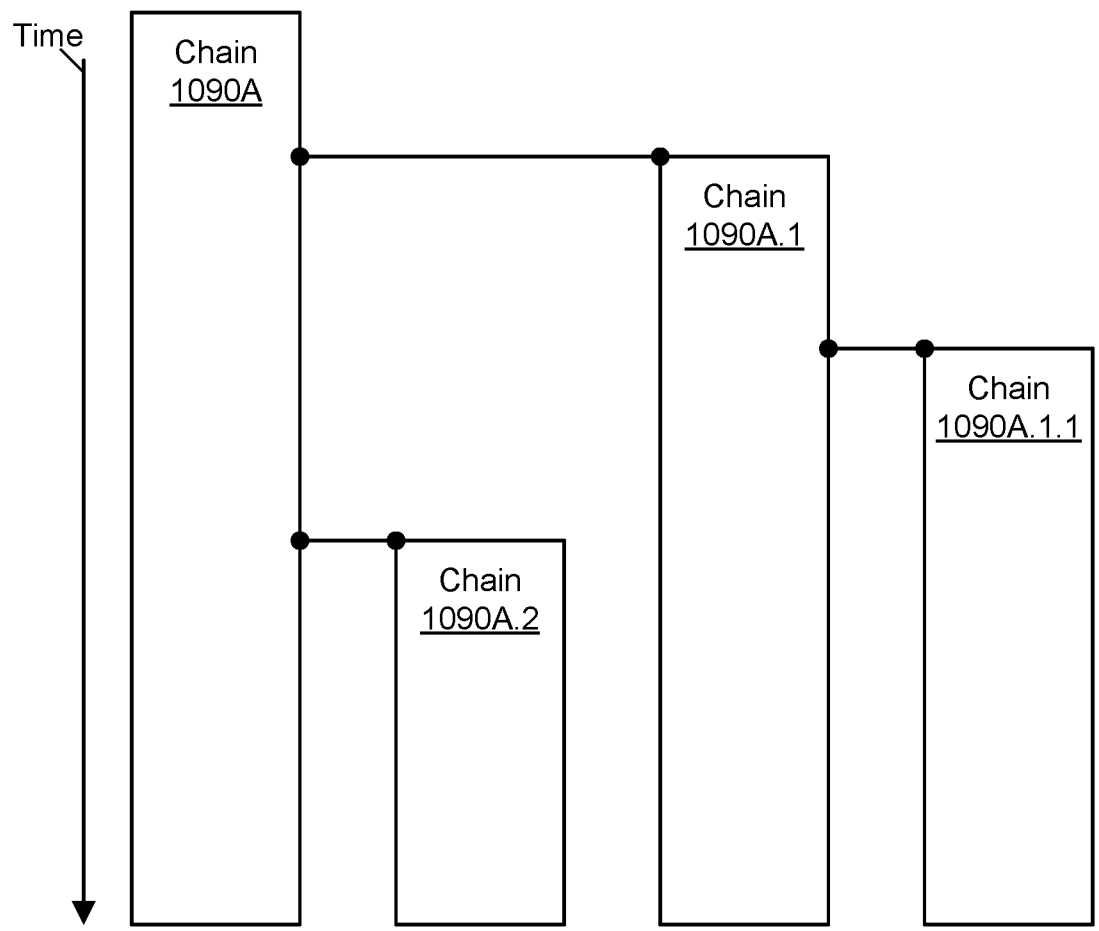
FIG. 10A through FIG. 10C illustrate examples of growing and shrinking chains in a stream, according to some embodiments.
Figure 10B:
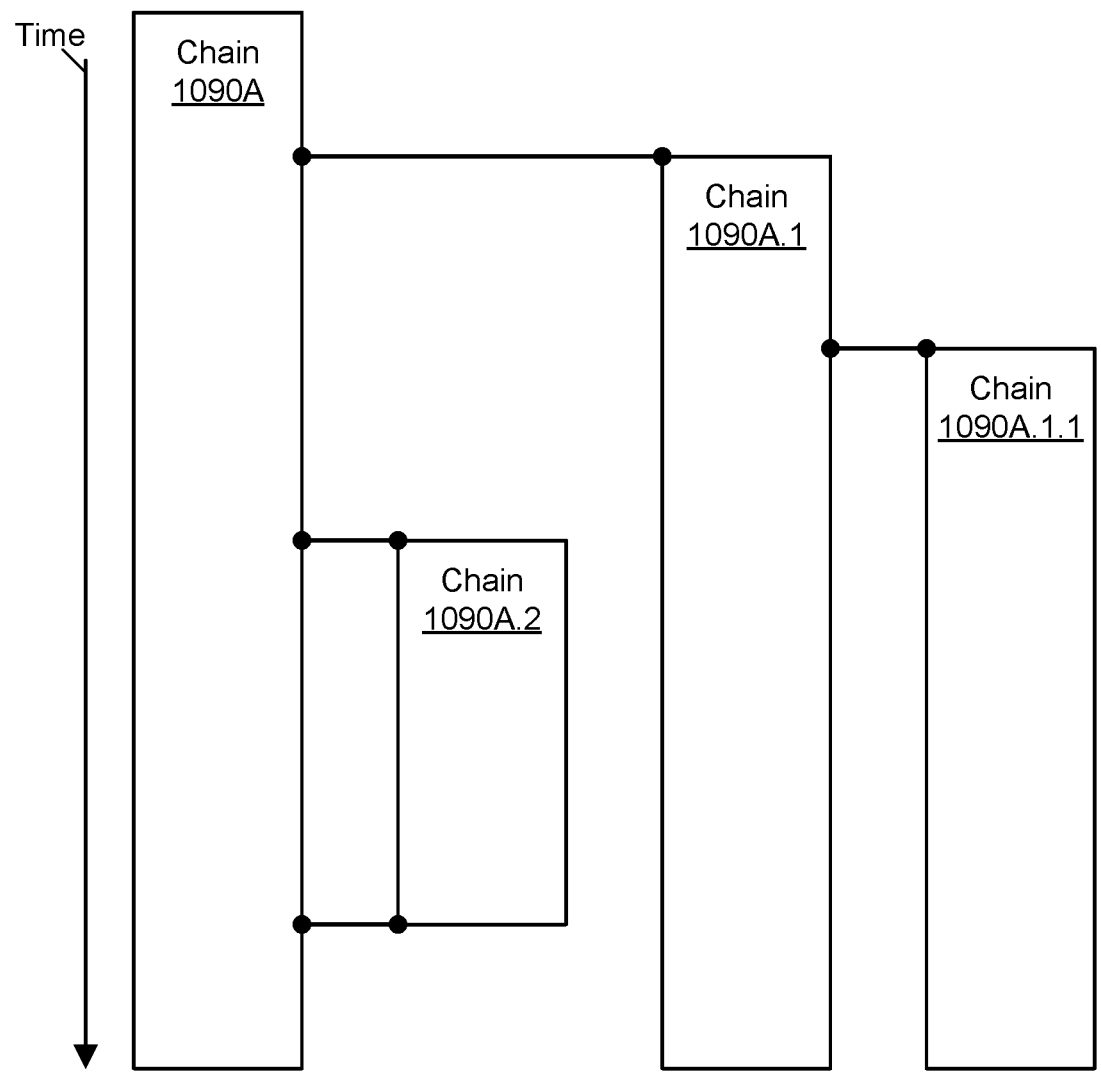
Figure 10C:
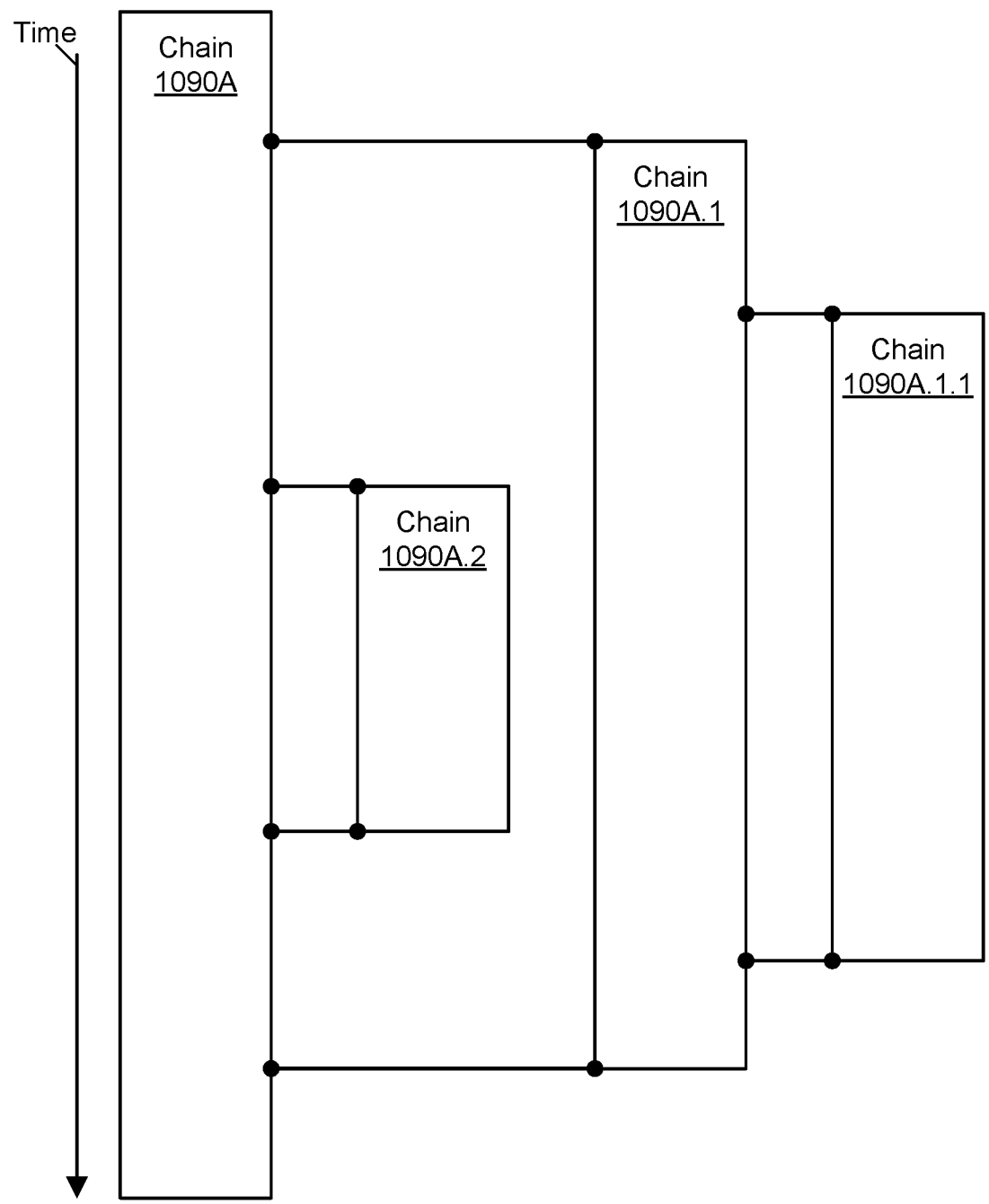

FIG. 10A through FIG. 10C illustrate examples of growing and shrinking chains in a stream, according to some embodiments. To distribute heat across the logging system 1000, multiple chains may be employed in a stream. The volume of events may grow to a large enough number that additional chains may be spawned to maintain high availability and low latency. Excessively high or low volume to a chain may be detected by generally restricting chain updates to be performed by a single host. The number of chains in a stream may grow or shrink dynamically based (at least in part) on metrics such as an append rate of events to one or more chains of the stream, a latency of append operations, and so on.

As shown in the example of FIG. 10A, a child chain 1090A. 1 may be spawned from a root chain 1090A. At a later point in time, a child chain 1090A.1.1 may be spawned from the child chain 1090A.1 (representing the parent of the new child chain). At an even later point in time, another child chain 1090A.2 may be spawned from the root chain 1090A. To spawn a new chain, an entry into the parent chain may be logged with the chain identifier of the child chain. The child may continue to exist until its death is recorded in the child itself. During its life, the parent may include the child reference continuously in all updates, e.g., as indicated by hosts exchanging peer discovery information for the parent chain. Thus hosts in the logging system 1000 may deterministically know the identities of all chains in a stream at any given point in time. By permitting events to be logged to multiple chains of the same stream in a manner that permits a global order of events to be determined, the logging system may offer high availability as well as efficient use of computational and storage resources.

FIG. 10B may represent a continuation of FIG. 10A at a later point in time. As shown in the example of FIG. 10B, the child chain 1090A.2 may be closed, and the closing may be recorded in the parent chain 1090A. The parent chain 1090A may no longer log the existence of the child chain 1090A.2 in subsequent events occurring after the closing of the child chain. At this point in time, the other child chains 1090A.1 and 1090A.1.1 may continue to accept new events.

FIG. 10C may represent a continuation of FIG. 10B at a later point in time. As shown in the example of FIG. 10C, the child chain 1090A.1.1 may be closed, and the closing may be recorded in its parent chain 1090A.1. The parent chain 1090A.1 may no longer log the existence of the child chain 1090A.1.1 in subsequent events occurring after the closing of the child chain. Additionally, the child chain 1090A.1 may be closed, and the closing may be recorded in its parent chain 1090A. The parent chain 1090A may no longer log the existence of the child chain 1090A.1 in subsequent events occurring after the closing of the child chain. In one embodiment, the chain 1090A.1 may not be closed until all of its children (chain 190A.1.1) have been closed.

Chain Logging Using Key-Value Data Storage

Various embodiments of methods and systems for implementing chain logging using key-value data storage are described. A chain, also referred to herein as a buffer chain, may represent a highly available, low latency, and durable log for events produced by multiple event producers. The log may be appended to at the head, iterated in either direction, and truncated at the tail. A chain may include a head and an additional set of nodes. The head and the nodes may be stored in a persistent key-value data store. New events are first added to the head and can eventually be offloaded in new nodes. To prevent the same event from being logged twice, events may be associated with event IDs that are checked before logging can occur. Multiple entities can concurrently access the chain, e.g., to add new events. In this manner, a highly available and durable logging system may be provided for clients.

Figure 11A:
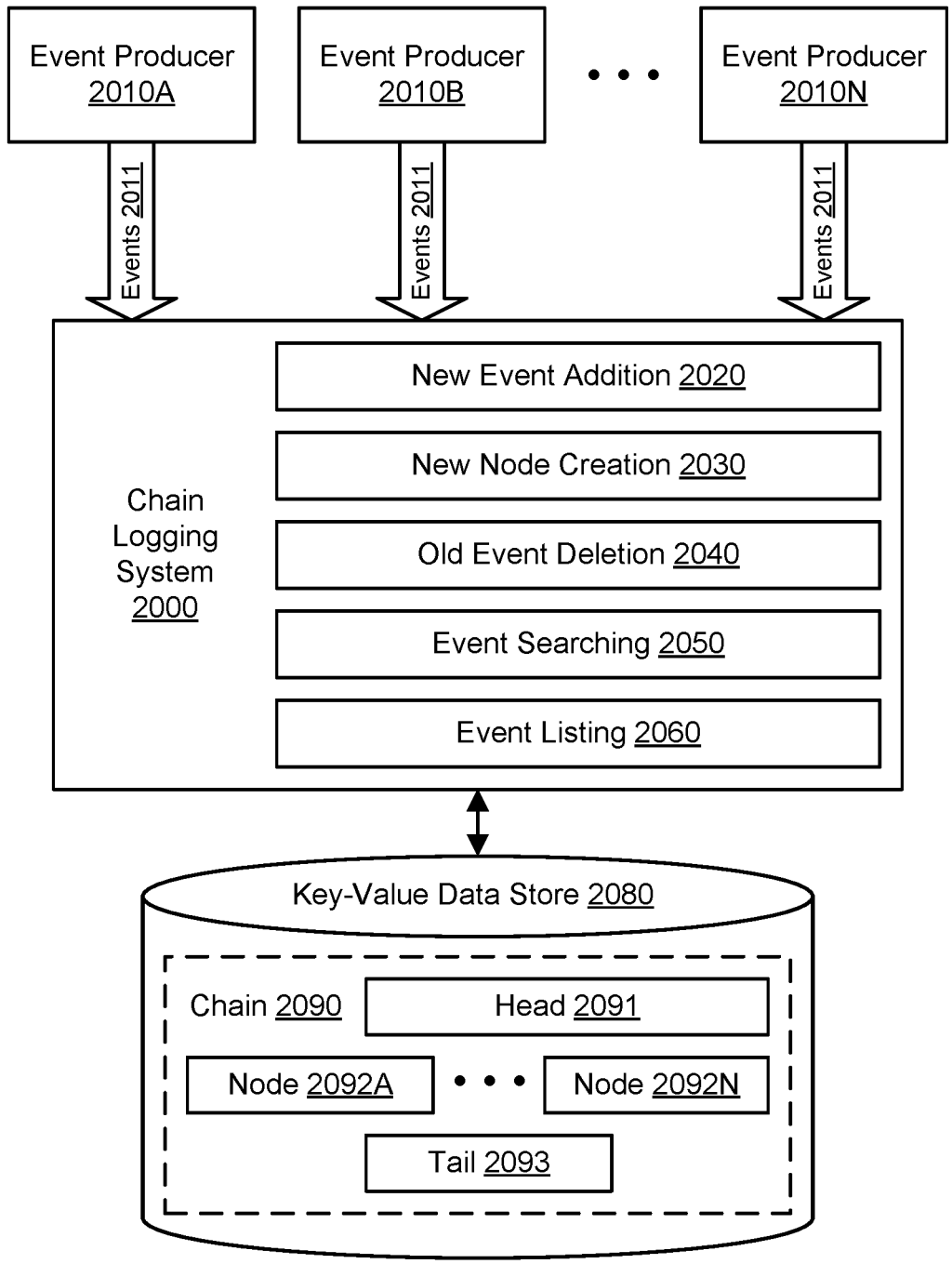
FIG. 11A illustrates an example system environment for chain logging using key-value data storage, according to some embodiments.

FIG. 11A illustrates an example system environment for chain logging using key-value data storage, according to one embodiment. A chain logging system 2000 may capture data indicative of events 2011 in a particular order in a chain 2090. The chain 2090 may represent any of chains 1090A to 1090M. The data indicative of events 2011 may also be referred to simply as events, and a log entry representing an event may be referred to as an element of the chain. Events 2011 may be analogous to events 1011. Events 2011 may represent transactions, status changes, status reports, and/or other updates with respect to one or more systems, data sets, data stores, and/or any other suitable items. For example, the events 2011 may relate to financial transactions, orders in an online store, accounting transactions, updates to gift card balances, and so on. The events 2011 may be generated and provided to the logging system 2000 by a plurality of event producers 2010A-2010N. Event producers 2010A-2010N may be analogous to event producers 1010A-1010N. Although three event producers 2010A, 2010B, and 2010N are shown for purposes of illustration and example, it is contemplated that any suitable number and configuration of event producers may be used to feed events to the logging system 2000. The event producers 2010A-2010N and other clients of the logging system 2000 may represent different processes, systems, and/or computing devices. The event producers 2010A-2010N and other clients of the logging system 2000 may be distributed on multiple computing devices throughout one or more networks, including private networks and/or public networks such as the Internet. The event producers 2010A-2010N and other clients of the logging system 2000 may also be coupled to the logging system 2000 through one or more networks, including private networks and/or public networks such as the Internet. As will be discussed in greater detail below, the event producers 2010A-2010N and other clients of the logging system 2000 may interact with the logging system 2000 using one or more suitable interfaces, such as one or more application programming interfaces, e.g., to invoke the functionality of the logging system.

A key-value data store 2080 may store key-value pairs using any suitable storage technology. The key-value data store 2080 may implement the data store 180. The keys may represent identifiers of portions of the chain 2090, and the corresponding values may represent the contents of those portions (including elements that represent events). In one embodiment, the key-value data store 2080 may represent a distributed hash table (DHT). To store key-value pairs, the DHT may be implemented as a decentralized system that offers a lookup service similar to a hash table. In on embodiment, any participating node of the DHT may efficiently retrieve the value associated with a given key. The DHT may scale to very large numbers of nodes and may be capable of handling node arrivals, node departures, and node failures. In one embodiment, the key-value data store 2080 supports operations such as conditional put, conditional delete, and get in order to interact with the logging system 2000.

The chain 2090 may capture various sequences of the events 2011 in respective portions of the chain. In one embodiment, the chain 2090 may include a head 2091 and a plurality of nodes 2092A-2092N. Although the nodes 2092A-2092N are shown for purposes of illustration and example, it is contemplated that any suitable number and configuration of nodes (from zero for a relatively new chain to a large number for a more mature chain) may be part of a particular chain. The chain 2090 may also include a tail 2093 that indicates a point at which older elements in the chain have been deleted and/or marked for deletion. The nodes 2092A-2092N may be arranged in a particular order, such as a chronological order. In one embodiment, the chronological order may be based (at least in part) on the different times at which new events are received by the logging system 2000 and added to the head 2091 of the chain 2090. Elements may be added to the head of the chain in a first-in, first-out manner. The head 2091 may typically store newer elements before those elements are offloaded to the nodes 2092A-2092N. The nodes 2092A-2092N may typically store older elements that have been offloaded from the head 2091. In this manner, the logging system 2000 may limit the addition of new elements to the head 2091. In one embodiment, elements may be deleted only from the oldest and least recent end of the chain 2090, e.g., among one or more contiguous nodes containing elements previously offloaded from the head 2091. In this manner, the logging system 2000 may limit mutation of the chain 2090 to either end and prevent alterations to the middle of the chain. The chain 2090 is shown for purposes of illustration and example. The logging system 2000 may maintain many chains other than the chain 2090 illustrated in FIG. 11A. The other chains may be maintained in the same data store 2080 or in other data stores of the same type or of a different type.

The head 2091, nodes 2092A-2092N, and tail 2093 for the particular chain 2090 may be stored persistently in the key-value data store 2080. For example, in the data store 2080, the key for the head 2091 may be based (at least in part) on (e.g., as a hash of) a chain identifier for the chain 2090. The chain identifier (or chain ID) may be considered unique to the particular chain 2090, at least in some context relevant to the logging system 2000. The keys for the nodes 2092A-2092N may also be based (at least in part) on (e.g., as a hash of) a chain identifier for the chain 2090, but the keys for the nodes may also be based (at least in part) on (e.g., as a hash of) an indicator of a position in the order of the chain. For example, if the chain identifier is "chain1," the identifier of the head 2091 in the chain 2090 may include the string "chain1:head," and the key for the head in the data store 2080 may include that string or may be derived from that string (e.g., as a hash of the string).

Similarly, the key for a node may be based (at least in part) on the chain identifier and an indicator of the node's position in the sequence such as a node index. For the chain identifier "chain1," the identifier of the oldest node in the chain order (e.g., node 2092A) may include the string "chain1:0," the identifier of the second oldest node in the chain order may include the string "chain1:1," the identifier of the third oldest node in the chain order may include the string "chain1:2," and so on. In the key-value data store 2080, the keys for the nodes may include those strings or may be derived from those strings (e.g., as a hash of the string). For the chain identifier "chain1," the identifier of the tail 2093 in the chain may include the string "chain1:tail," and the key for the tail in the data store 2080 may include that string or may be derived from that string (e.g., as a hash of the string). Accordingly, the keys for the nodes 2092A-2092N in the key-value data store 2080 may indicate the relative positions of the nodes in a particular order (e.g., a chronological order) that is captured in the chain 2090. In one embodiment, a node may be keyed by the chain identifier and additional information that indicates the node's position in the sequence such as a combination of the sequence contents, position, and sequence index.

Any of the nodes 2092A-2092N may be retrieved from the data store 2080 independently of any other node, given knowledge of the chain identifier and the node index (or other indicator of the node's position in the sequence). In one embodiment, the keys for the head 2091, nodes 2092A-2092N, and/or tail 2093 may also include or be derived from (e.g., as a hash of) an identifier of a client who "owns" the chain and potentially one or more other values. For example, the key for the head 2091 may include or be derived from the string "clientname1:chain1:head" or the string "clientname1:projectname1:chain1:head."

The logging system 2000 may include various components or functionalities. In one embodiment, the logging system 2000 may include a component for new event addition 2020. In one embodiment, the logging system 2000 may include a component for new node creation 2030. In one embodiment, the logging system 2000 may include a component for old event deletion 2040. In one embodiment, the logging system 2000 may include a component for event searching or seeking 2050. In one embodiment, the logging system 2000 may include a component for event listing 2060.

It is contemplated that the logging system 2000 may include additional components not shown, fewer components than shown, or different combinations, configurations, or quantities of the components shown. The logging system 2000 may comprise one or more computing devices, any of which may be implemented by the example computing device 3000 illustrated in FIG. 17. In various embodiments, portions of the logging system 2000 may be provided by the same computing device or by any suitable number of different computing devices. If any of the components of the logging system 2000 are implemented using different computing devices, then the components and their respective computing devices may be communicatively coupled, e.g., via a network. Each of the illustrated components may represent any combination of software and hardware usable to perform their respective functions.

In one embodiment, the functionality of the logging system 2000 may be provided to event producers 2010A-2010N and other clients as a web-accessible service. The functionality of the logging system 2000 may be presented to clients using a provider network. A network set up by an entity such as a company or a public sector organization to provide one or more services (such as various types of cloud-based computing or storage) accessible via the Internet and/or other networks to a distributed set of clients may be termed a provider network. A provider network may include numerous data centers hosting various resource pools, such as collections of physical and/or virtualized computer servers, storage devices, networking equipment and the like, that are used to implement and distribute the infrastructure and services offered by the provider. The resources may, in some embodiments, be offered to clients in units called "instances," such as virtual or physical compute instances or storage instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices, and the like.

Figure 11B:
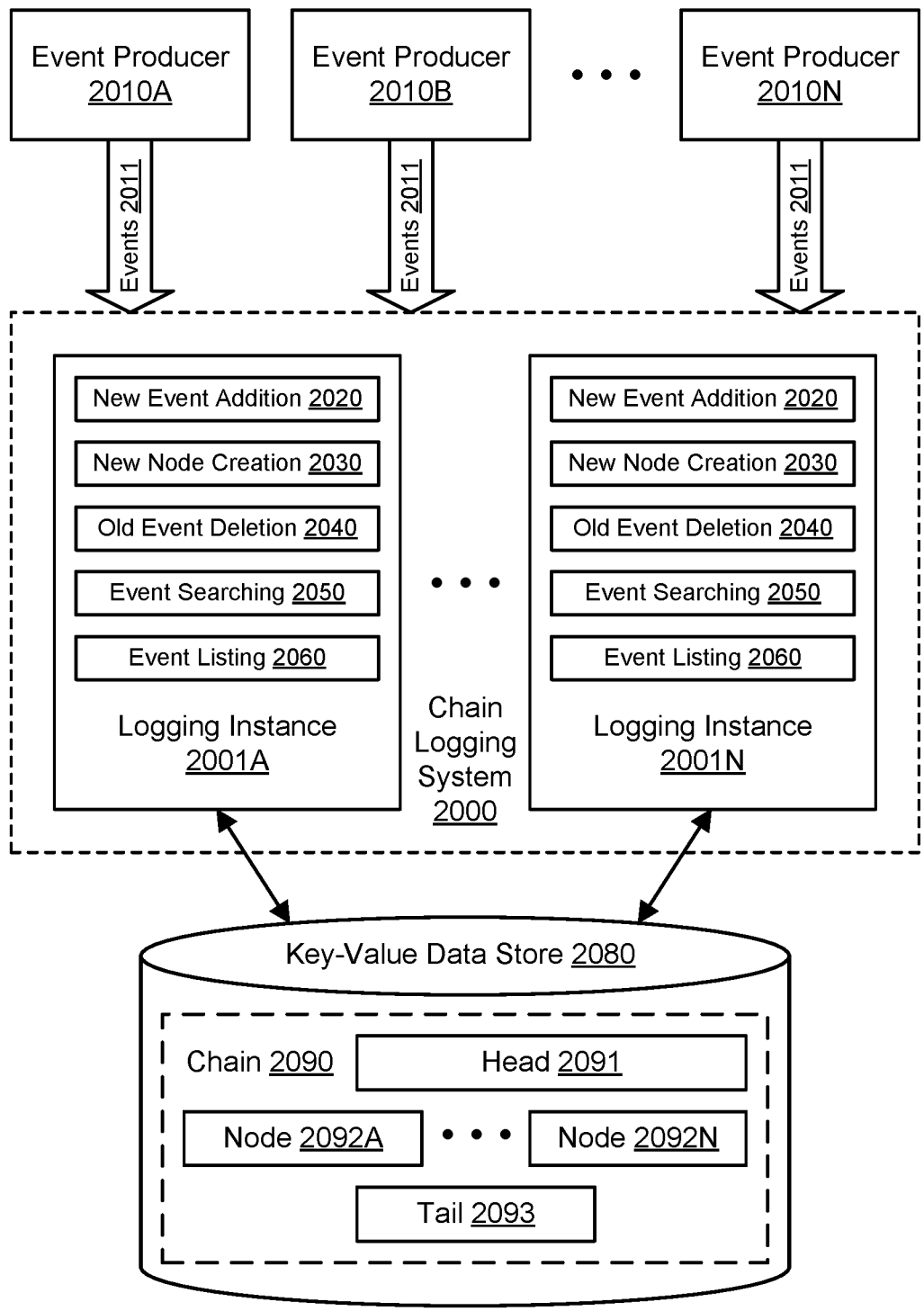
FIG. 11B and FIG. 11C illustrate an example system environment for chain logging using key-value data storage, including a distributed set of logging instances, according to some embodiments.
Figure 11C:
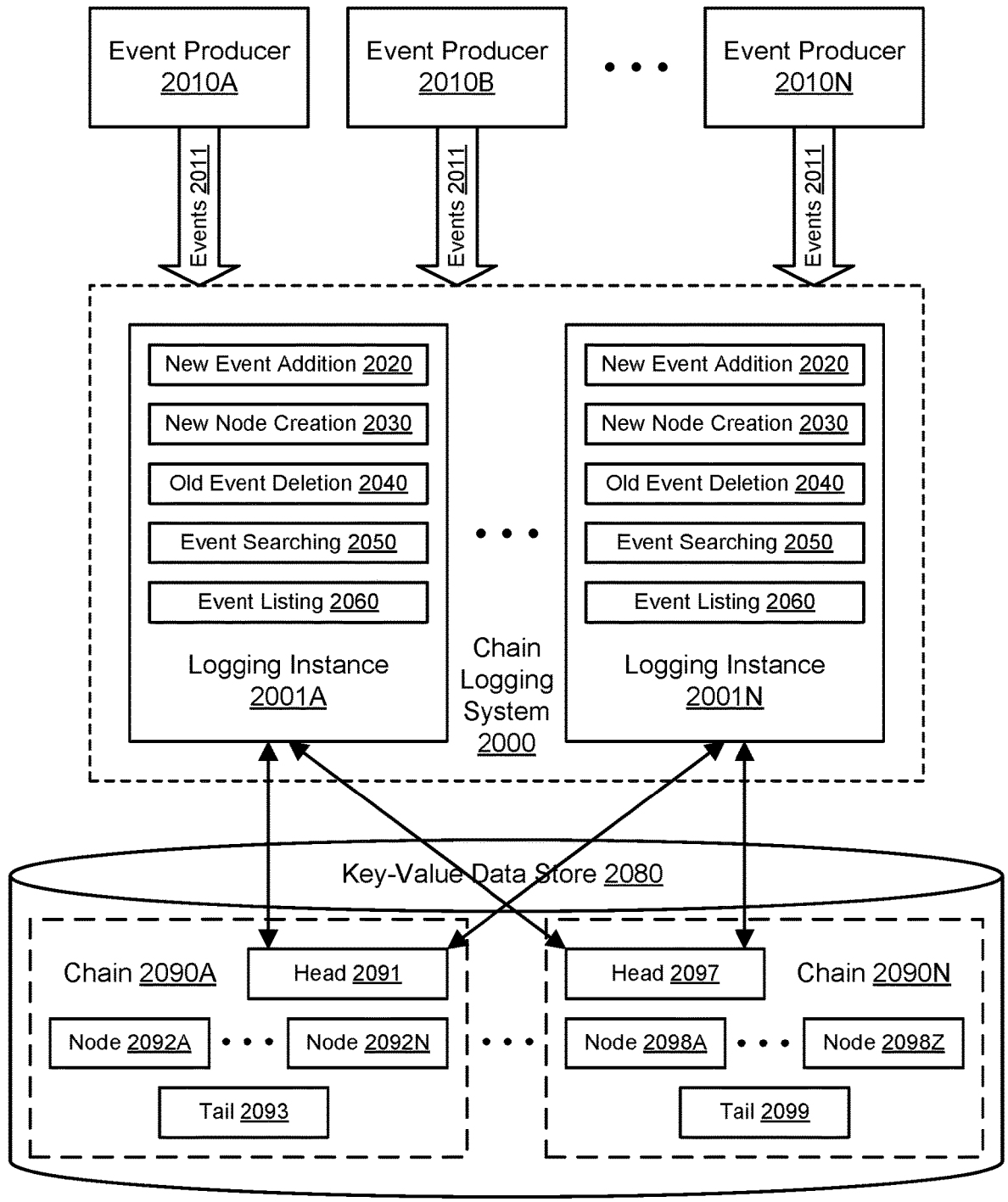

In various embodiments, the functionality of the logging system 2000 may be centralized or distributed. For a more centralized system, a load balancer (or fleet of load balancers) may be used to receive logging requests from event producers and other clients and forward those requests to individual logging hosts in a fleet. FIG. 11B and FIG. 11C illustrate an example system environment for chain logging using key-value data storage, including a distributed set of logging instances, according to one embodiment. The functionality of the logging system 2000 may be distributed as a plurality of logging instances such as instances 2001A through 2001N. The logging instances 2001A-2001N may be analogous to the logging hosts 1030A-1030Z. Although two logging instances 2001A and 2001N are shown for purposes of illustration and example, it is contemplated that any suitable number and configuration of logging instances may be used to implement the logging system 2000. The logging instances 2001A-2001N may represent different hosts. The logging instances 2001A-2001N may be distributed on multiple computing devices throughout one or more networks, including private networks and/or public networks such as the Internet. In one embodiment, at least some of the functionality of the logging system 2000 may be implemented as a library of functions, and the logging instances 2001A-2001N may represent implementations of the library. For example, the event producers 2010A-2010N may represent programs that include the library in their program code. Using the distributed logging system 2000 as implemented using the logging instances 2001A-2001N, multiple entities may access the chain 2090 concurrently, e.g., to read elements from the chain, delete elements from the chain, iterate through the chain, search in the chain, and so on. The distributed nature of the logging system 2000 as shown in FIG. 11B may enable many logging instances to read a large chain more quickly than a single logging instance could perform the same task.

In some embodiments, a plurality of entities within the logging system 2000 may access a plurality of chains concurrently, e.g., to read elements from the chains, delete elements from the chains, iterate through the chains, search in the chains, and so on. As shown in the example of FIG. 11C, a plurality of logging instances 2001A-2001N may access a plurality of chains. The chains may include any suitable number of chains from chain 2090A to chain 2090N. As discussed above with respect to chain 2090A, chain 2090N may also include a head 2097, a set of nodes 2098A-2098Z, and a tail 1099. The set of nodes 2098A-2098Z may vary in number from the nodes 2092A-2092N in the other chain 2090A. The example of FIG. 11C illustrates the logging instance 2001A accessing (or attempting to access) the heads of two chains 2090A and 2090N (e.g., to add elements) while the logging instance 2001N is also accessing (or attempting to access) the heads of the two chains 2090A and 2090N (e.g., to add elements). Because updates to the heads 2091 and 2097 in the data store 2080 may be performed with conditional put operations, some updates may fail and require a head to be reloaded by an instance while multiple logging instances are attempting to update the same head over a small window of time. In one embodiment, locks on a head need not be acquired due to the use of a conditional put for head updates. In this manner, the logging system 2000 may permit many-to-many relationships between logging instances 2001A-2001N and chains 2090A-2090N.

Using the component for new event addition 2020, a request from an event producer may be processed by the logging system 2000 to add a new event (e.g., data indicative of the event) to the head 2091 of the chain 2090. The request may represent a request to push, append, or add one or more elements to the chain. In one embodiment, new events may be added only to the head 2091 first before potentially being offloaded to individual ones of the nodes 2092A-2092N. In one embodiment, suitable access credentials may be required before a request to add an element is processed.

Using the component for new node creation 2030, a new node may be automatically created and stored in the data store 2080. The new node may include a sequence of one or more elements previously added to the head 2091. Once offloaded to the new node, the sequence of elements may be deleted from the head at any suitable time. The new node may be associated with a node index that indicates the position of the node in a sequential order of events. A key for the new node in the data store 2080 may include or be derived from the chain identifier of the chain 2090 and the node index.

Using the component for old event deletion 2040, a request from a client of the logging system 2000 may be processed by the logging system to remove one or more of the oldest events event (e.g., data indicative of the event) from the nodes 2092A-2092N of the chain 2090. The request may represent a request to pop, truncate, remove, or delete one or more elements from the chain. In one embodiment, elements may be removed only from the oldest end of the chain, e.g., in one or more nodes that were created the furthest back in time. In one embodiment, elements may be removed only from one or more nodes having the lowest node index or indices. In one embodiment, one or more older elements may be removed from an oldest remaining node while one or more newer elements may remain in the node. The tail 2093 may be used to track which elements have been marked for logical deletion and which elements have actually been physically deleted, e.g., from the data store 2080. In one embodiment, suitable access credentials may be required before a deletion request is processed.

Using the event searching or seeking 2050, a request from a client of the logging system 2000 may be processed by the logging system to search over the chain 2090. In one embodiment, the search may represent a k-ary search that divides the nodes 2092A-2092N into k+1 segments of roughly equal size and returns k nodes on the borders of those segments. For example, for a binary search (e.g., based on an input value k=1 or a default search), the nodes 2092A-2092N may be divided into two segments of roughly equal size, and the search may return a single node in the middle of the chain. In one embodiment, suitable access credentials may be required before a search request is processed.

Using the component for event listing 2060, a request from a client of the logging system 2000 may be processed by the logging system to list a contiguous sequence within the chain 2090. In one embodiment, the list operation may list elements from nodes (and potentially from the head) either forwards or backwards in order. The individual nodes may be retrieved from the data store 2080 based on the chain identifier and the node indices, e.g., when the keys for the nodes include or are derived from a combination of the chain identifier and the node indices. In one embodiment, suitable access credentials may be required before a list request is processed.

The logging system 2000 may perform mutating operations (e.g., addition and deletion) in a first-in, first-out manner. The logging system 2000 may perform read operations using random access and/or sequential access. The logging system 2000 may be especially useful for maintaining logs in many types of domains, including financial transaction logs, job processing logs, event stream logs, and so on. The logging system 2000 and logging instances 2001A-2001N may represent stateless components with persistence managed by the data store 2080. In one embodiment, the logging instances 2001A-2001N may not coordinate with one another. For a single chain, the availability for the logging system 2000 as a whole may be equivalent to the availability of a single file (representing the head of a chain) in the data store 2080. For many chains, the availability for the logging system 2000 as a whole may be equivalent to the availability of the underlying data store 2080. For stateful clients (e.g., clients that can pass in the result of the last put to a chain), the latency of the logging system 2000 may be equivalent to a single conditional put to the data store. By storing the elements in multiple records, the logging system 2000 may scale to chains of an indefinitely large size if the underlying data store 2080 permits. By storing nodes with a sequential numbering scheme, random access of nodes may be performed without a need to link from node to node or without a need to keep the nodes linked within the head or otherwise synchronized with the head.

The durability of the logging system 2000 may be derived from that of the key-value data store 2080. Because nodes can be named sequentially based on node indices, loss of part of the chain may not corrupt the rest of the chain. Optional mirroring of data in k nodes may be implemented so that a loss of k−1 nodes may not result in data loss. To implement mirroring, extra sequences may be retained in the head and in each node as the sequences are offloaded. The internal nodes may continue to be keyed on the sequence index of the highest sequence they contain. To page over the contents, every k nodes may be loaded instead of each sequential node. The availability of the data as well as the durability and cost for read operations maybe increased by a factor of k. The optional mirroring may retain the convenience of correctness, complexity, and consistency maintained internally within the chain.

Figure 12:
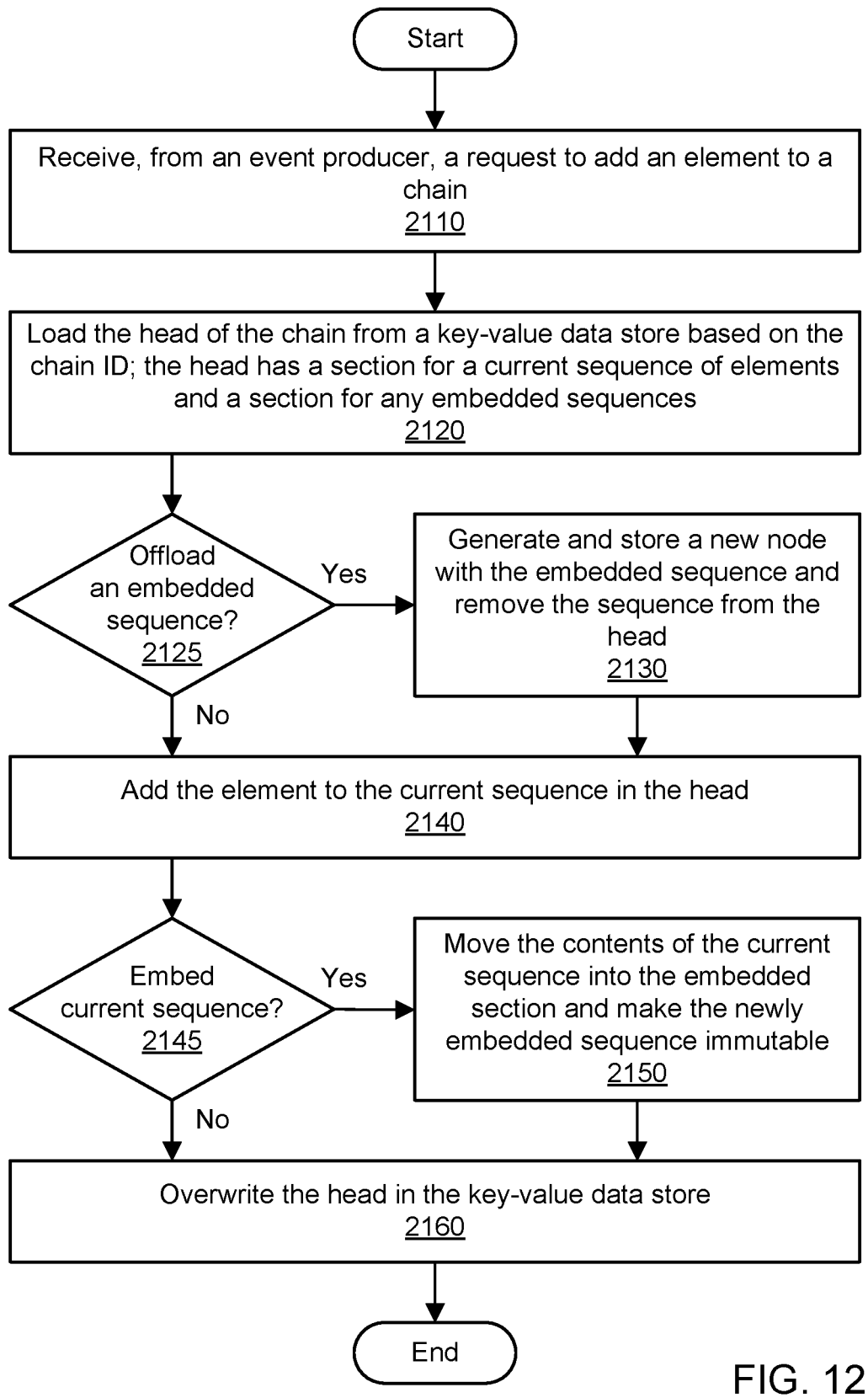
FIG. 12 is a flowchart illustrating a method for adding an element to the head of a chain, according to some embodiments.

FIG. 12 is a flowchart illustrating a method for adding an element to the head of a chain, according to one embodiment. At least some of the operations shown in FIG. 12 may be performed by a logging system. As shown in 2110, a request to add an element to a chain may be received, e.g., from an event producer that is a client of the logging system. The element may correspond to an event in a stream of events. The element may represent a transaction, status change, status report, and/or other update with respect to one or more systems, data sets, data stores, and/or any other suitable items. For example, the element may correspond to and/or describe a financial transaction, an order in an online store, an accounting transaction, an update to a gift card balance, and so on. The request to add the element may indicate a chain identifier and the contents of the element.

As shown in 2120, the head of the chain may be loaded from a key-value data store. The key by which the head is retrieved may include or be derived from (e.g., as a hash of) the chain identifier supplied in the request. In one embodiment, the key for the head may also include or be derived from an identifier of the client that sent the request and that has access privileges to add to the chain. If the head is not found in the data store, then the head may be created. The head may include a current section and an embedded section. Either section may be populated or may be empty when the head is loaded. The current section may include a sequence of one or more earlier events that were previously added to the head. The embedded section may include one or more even earlier sequences that were previously added to the head, and each of the embedded sequences may include one or more events. Sequences in the embedded section may be considered immutable and ready to be offloaded to the nodes that represent the body of the chain. Each element may be associated with an element index that indicates the relative position of the element in an order, e.g., the order in which new events are received by the logging system and added to the head of the chain. Each sequence in the embedded section may be associated with a sequence index that indicates the relative position of the sequence in an order, e.g., the order in which new sequences are moved or "graduated" to the embedded section in the head of the chain.

As shown in 2125, it may be determined whether any embedded sequence(s) in the head should be offloaded to their own nodes. Offloading refers to the process of moving one or more elements from the head to a node of the chain. The determination to offload an embedded sequence from the embedded section to its own node may be based on any suitable factors. In one embodiment, any embedded nodes may be offloaded at the next push operation rather than proactively offloaded at the time of embedding. In one embodiment, an embedded sequence may be offloaded when the embedded section has passed a predetermined size threshold. In one embodiment, an embedded sequence may be offloaded when a predetermined duration of time has passed since the embedded sequence was added to the embedded section. In one embodiment, an embedded sequence may be offloaded when a predetermined number of sequences have been added to the embedded section.

If so, then as shown in 2130, for each embedded sequence that is to be offloaded, a new node may be generated that includes the embedded sequence of elements. The new node may be stored in the key-value data store. The embedded sequence may be removed from the head at any suitable time after the new node is successfully stored in the data store, e.g., in any subsequent push of new elements to the head. In the data store, the key for the node may include or be derived from (e.g., as a hash of) the chain identifier and a node index that indicates the relative position of the node in the order of the chain. In one embodiment, the key for the head may also include or be derived from an identifier of the client that sent the request and that has access privileges to add to the chain. The value associated with the key may include the sequence of elements that is offloaded.

As shown in 2140, the element associated with the request may be added to the current sequence in the head. The element may be added in an order with respect to any other elements in the current sequence, e.g., the order in which new events are received by the logging system. The new element may be associated with an element index that indicates the relative position of the element in the order.

As shown in 2145, it may be determined whether the current sequence in the head (if any) should be embedded in the head. The determination to move the sequence from the current section to the embedded section may be based on any suitable factors. In one embodiment, the current sequence may be embedded when it has passed a predetermined size threshold. In one embodiment, the current sequence may be embedded when a predetermined duration of time has passed since the first element in the current sequence was added. In one embodiment, the current sequence may be embedded when a predetermined number of elements have been added to the current sequence. If so, then as shown in 2150, the contents of the current sequence may be moved to the embedded section as an embedded sequence and made immutable; the contents of the current sequence may be removed from the current section once in the embedded section. Once the elements in the sequence are made immutable, their membership and order in the sequence may not be changed. When the sequence is embedded, it may be associated with a node index or other node identifier. The node indices may be numbered sequentially, and the head may keep track of the last index so that the next embedded sequence can be assigned the next number in the sequence. The operations shown in 2125 and 2130 may be performed prior to the operations shown in 2145 and 2150 so that an embedded sequence is persisted in at least one update of the head before being offloaded in another update of the head.

As shown in 2160, the head may be overwritten in the data store with the updated head. The key for the head may remain the same, but the value associated with that key may be changed. The head may be overwritten with a conditional put operation in the data store. The updated head may now include (in the current section) the element associated with the request. If the current sequence prior to the addition of the new element was embedded, then the updated head may reflect that shift from the current section to the embedded section. If any embedded sequence was successfully offloaded, then the updated head may reflect the deletion of that sequence. In this manner, new elements in the chain may be added to the head first before eventually being offloaded to individual nodes.

Figure 13A:
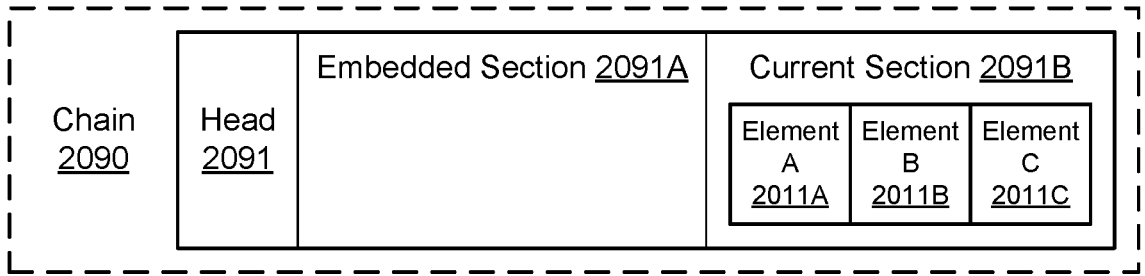
FIG. 13A through FIG. 13E illustrate examples of chains, according to some embodiments.

FIG. 13A through FIG. 13E illustrate examples of chains, according to one embodiment. As shown in the example of FIG. 13A, a chain 2090 may include a head 2091 and no nodes. The head may include an embedded section 2091A and a current section 2091B. The embedded section may be empty. The current section may include three elements, in order from oldest to newest (based, e.g., on the time of receipt by the logging system): element "A" 2011A, element "B" 2011B, and element "C" 2011C.

Figure 13B:
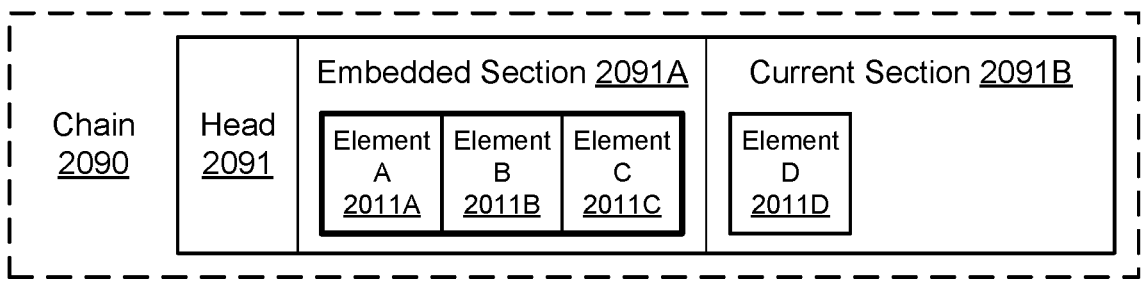

As shown in the example of FIG. 13B, a request may be received to add an element "D" 2011D to the head. As discussed above with respect to FIG. 12, the sequence of elements A, B, and C 2011A-2011C may be moved from the current section to the embedded section and made immutable in terms of the composition and order of the sequence. When the sequence 2011A-2011C is embedded, it may be associated with a node index or other node identifier. The node indices may be numbered sequentially, and the head 2091 may keep track of the last index so that the next embedded sequence can be assigned the next number in the sequence. In one embodiment, embedded sequences and the nodes created from them may vary in their number of elements. In one embodiment, embedded sequences and the nodes created from them may have a fixed number of elements; by enforcing a uniform number of elements per node, searches throughout the body of the chain may be performed by element identifier and not necessarily node identifier. Once the current section has been cleared in this manner, the new element D 2011D may be added to the current section.

Figure 13C:
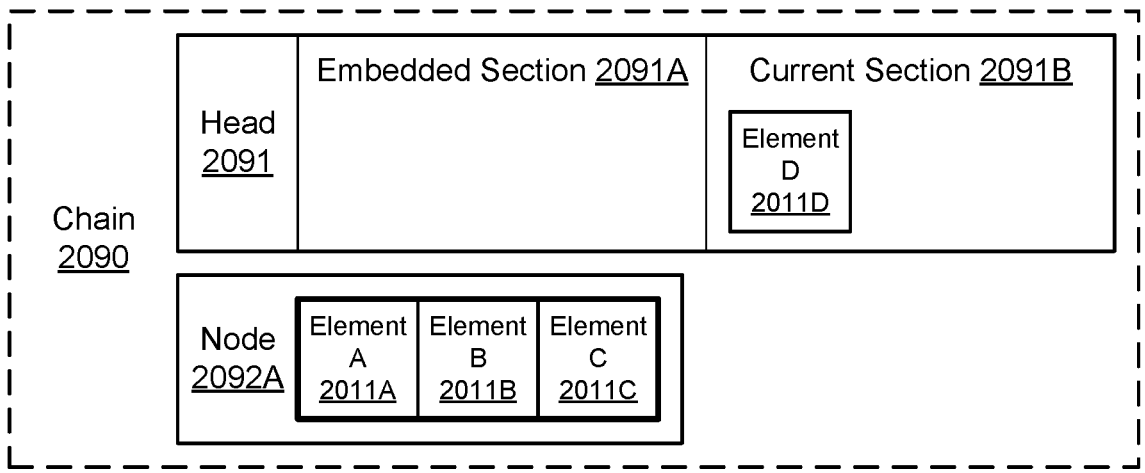

As shown in the example of FIG. 13C, the embedded sequence of elements A, B, and C 2011A-2011C may be offloaded from the head to the node 2092A at some point. Again, the sequence in the node 2092A may be considered immutable in terms of its composition and order. The node 2092A may be the first created node for this chain and may be associated with a node index of 0 (or otherwise the lowest available index number). The sequence in the node 2092A may be the earliest sequence for this chain and may be associated with a sequence index of 0 (or otherwise the lowest available index number). Each element within the node 2092A may be associated with an element index, e.g., element index 0 for element A, element index 1 for element B, and element index 3 for element C. The comprehensive current state of the chain (e.g., of its contents and order) may be acquired from the head and any nodes currently in the chain: the ordered sequence of elements A-C as found in the earliest (and only) node 2092A and the newest element D as found in the head 2091.

Figure 13D:
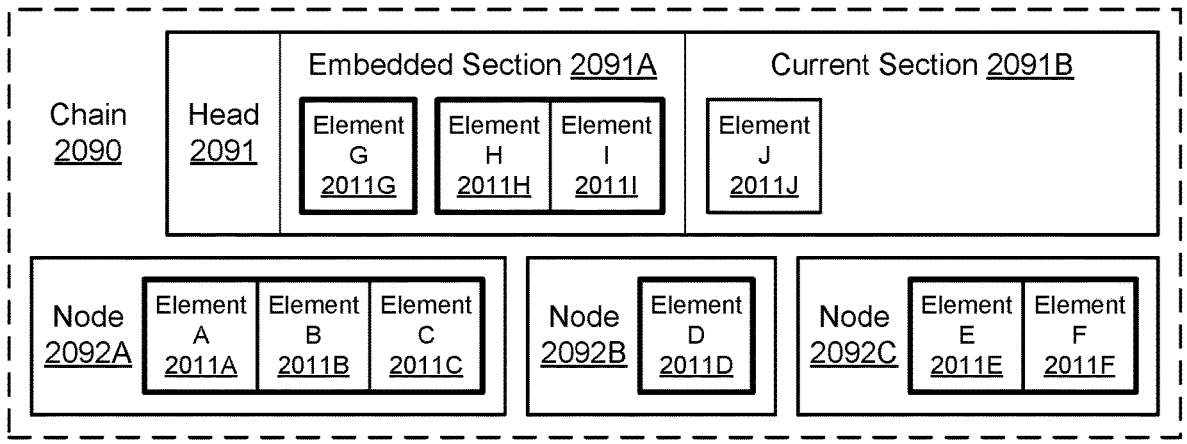

As shown in the example of FIG. 13D, additional elements have been offloaded to individual nodes after first being added to the head as described above. The chain now includes three nodes: the oldest node 2092A as described previously, a second oldest node 2092B containing element D, and a third oldest node 2092C containing a sequence of elements "E" 2011E and "F" 2011F. In addition, the head includes an embedded sequence containing only the element "G" 2011G and a newer embedded sequence containing the elements "H" 2011H and "I" 2011I. The head also includes a current sequence of one element, the newest element "J" 2011J. The two embedded sequences are ready to be offloaded to individual nodes at any suitable time. The comprehensive current state of the contents and order of the chain may be acquired from the head and any nodes currently in the chain, in order from oldest to newest: the ordered sequence of elements A-C as found in the oldest node 2092A, the element D in the second oldest node 2092B, the ordered sequence of elements E and F as found in the third oldest node 2092C, the embedded sequence with element G in the head, the embedded sequence with elements H and I in the head, and the newest element J in the current section of the head. As discussed above, the nodes 2092A-2092C may be stored in the key-value data store 2080 using keys that include or are derived from the chain identifier and the respective node index.

Figure 13E:
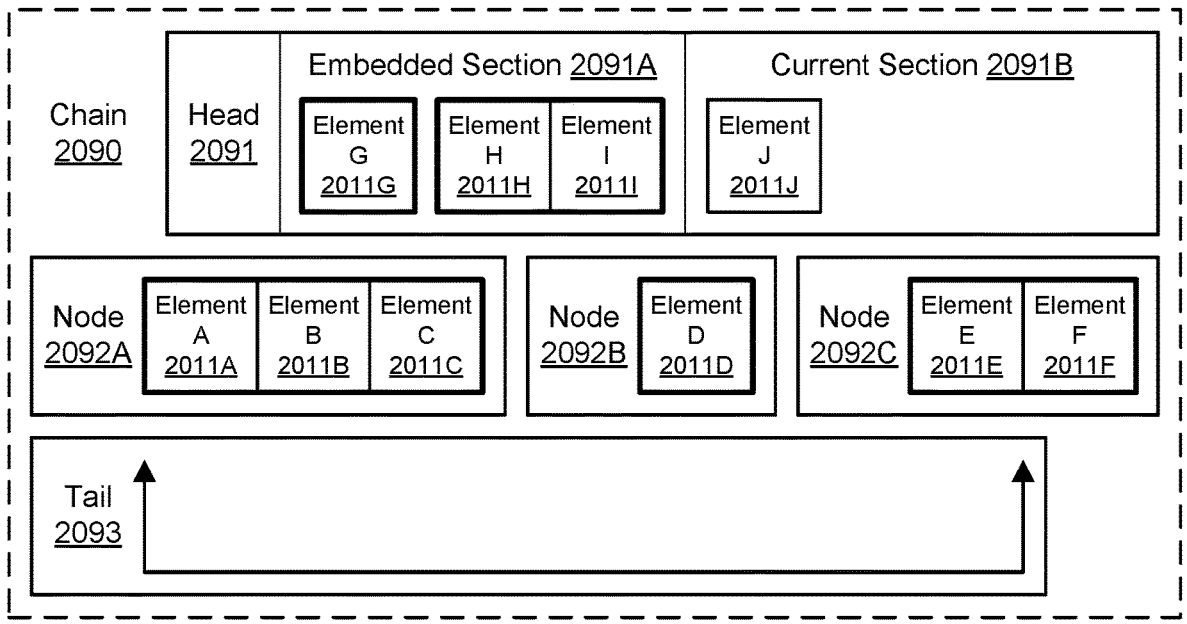

As shown in the example of FIG. 13E, a request has been received to truncate the chain from the oldest end up to a point in the interior of the chain. The request may indicate the chain identifier and the newest element to delete, e.g., element E. The elements up to and including E may be marked for deletion. The tail 2093 may include two references that point to the earliest existing node (before element A in node 2092A) as well as the point up to which we desire to delete (after element E in node 2092C). These two references may span the point of physical deletion to the point of logical deletion in the chain. The tail may permit the tracking of a multi-step delete operation while allowing the logging system to apply an immediate bulk delete by positioning the later logical cursor at the desired position.

Figure 14A:
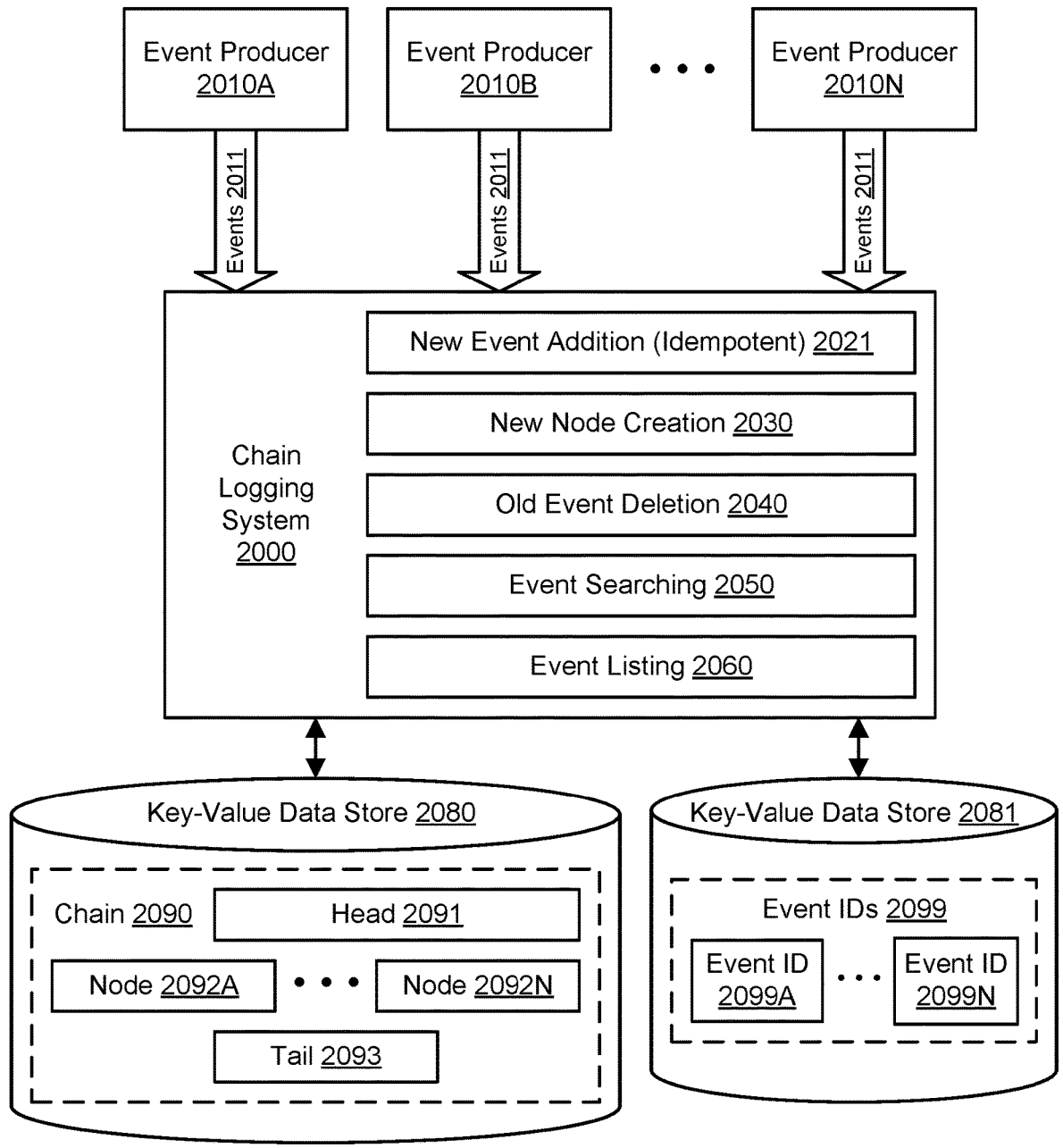
FIG. 14A illustrates further aspects of the example system environment for chain logging using key-value data storage, including an idempotence property for additions to the chain, according to some embodiments.

FIG. 14A illustrates further aspects of the example system environment for chain logging using key-value data storage, including an idempotence property for additions to the chain, according to one embodiment. In one embodiment, the logging system 2000 may include a component for new event addition (with an idempotence property) 2021. When an event is received by the logging system 2000, the event may be supplied with an event identifier by the client, or otherwise the event identifier may be generated. In one embodiment, the event identifier may be determined as a hash of the contents of the event. A set of event identifiers 2099, such as event IDs 2099A-2099N for past events may be stored in a key-value data store 2081. In various embodiments, the data store 2081 may be the same as the data store 2080 used to store the chain or may be a different data store. In the key-value data store 2081, the key for an event identifier may include or be derived from (e.g., as a hash of) the event identifier itself. The value associated with the key may include a pointer or other reference to the event in the chain 2090, e.g., as stored in one of the nodes 2092A-2092N in the data store 2080. In one embodiment, event identifiers for elements still stored in the head 2091 may be retained in the head as well, e.g., in the current section or embedded section along with the corresponding element. In various embodiments, the idempotence property of the addition operation may be enabled or disabled per call (e.g., based on an input value to a push call) or based on a configuration setting.

The event identifiers may be used to implement an idempotence property for requests to add elements to a chain. When a request to add an element is received by the logging system 2000, the new event addition component 2021 may look for the event identifier for the event in the head 2091 and then in the event IDs 2099 in the data store 2081. In one embodiment, the element may be logged to the chain only if its event identifier is not found in the head 2091 or in the event IDs 2099 in the data store 2081. If the event identifier is found in the head 2091 or in the event IDs 2099, the request may be disregarded. In this manner, updates such as financial transactions, accounting transactions, order updates in an online store, and withdrawals from gift card balances may be logged only once to a chain.

Figure 14B:
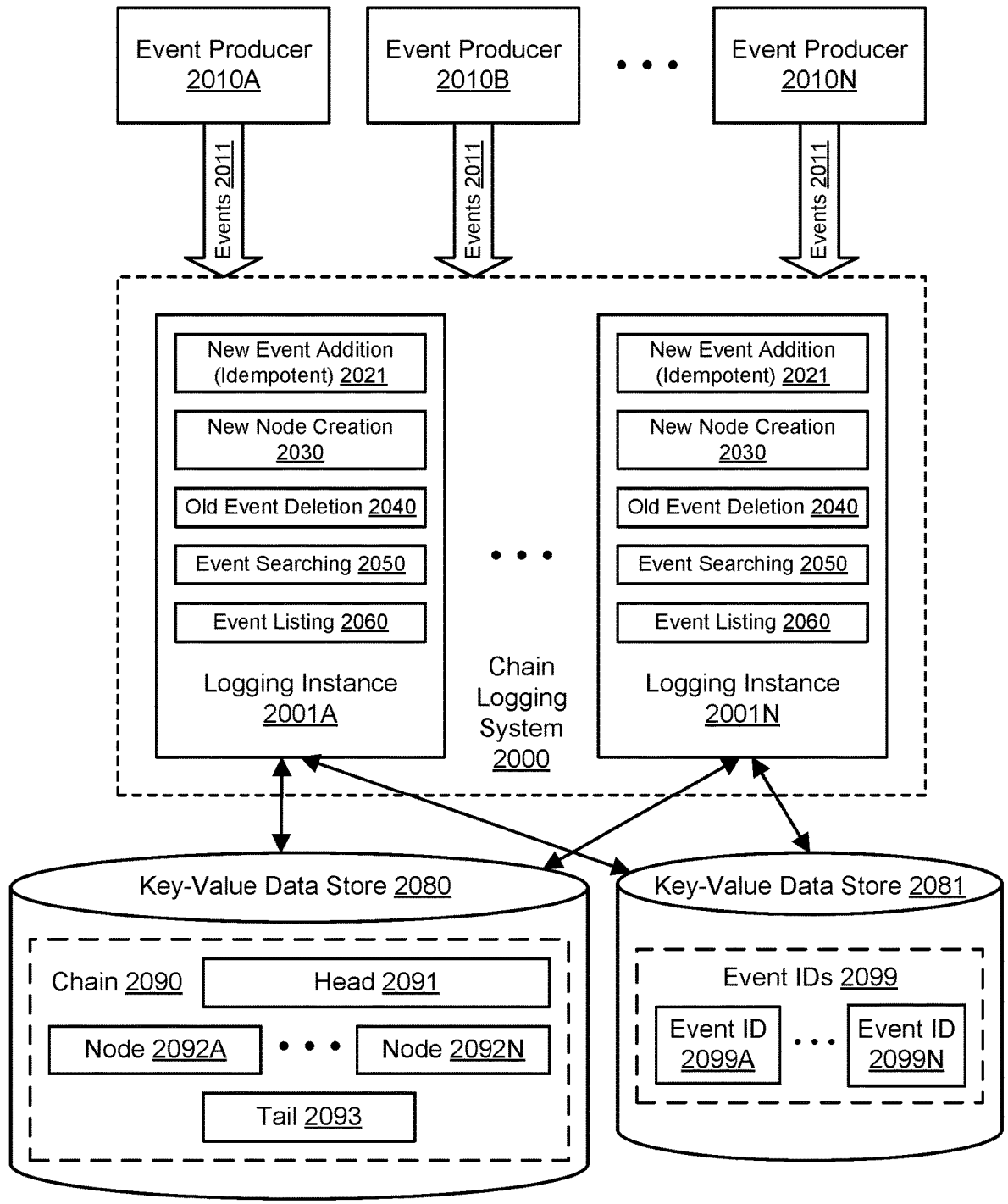
FIG. 14B illustrates further aspects of the example system environment for chain logging using key-value data storage, including a distributed set of logging instances and an idempotence property for additions to the chain, according to some embodiments.

FIG. 14B illustrates further aspects of the example system environment for chain logging using key-value data storage, including a distributed set of logging instances and an idempotence property for additions to the chain, according to one embodiment. As discussed above with respect to FIG. 11B, multiple logging instances 2001A-2001N may implement the component for new event addition (with an idempotence property) 2021. The logging instances 2001A-2001N may access the chain 2090 and the event identifiers 2099 with a degree of concurrency.

Figure 15:
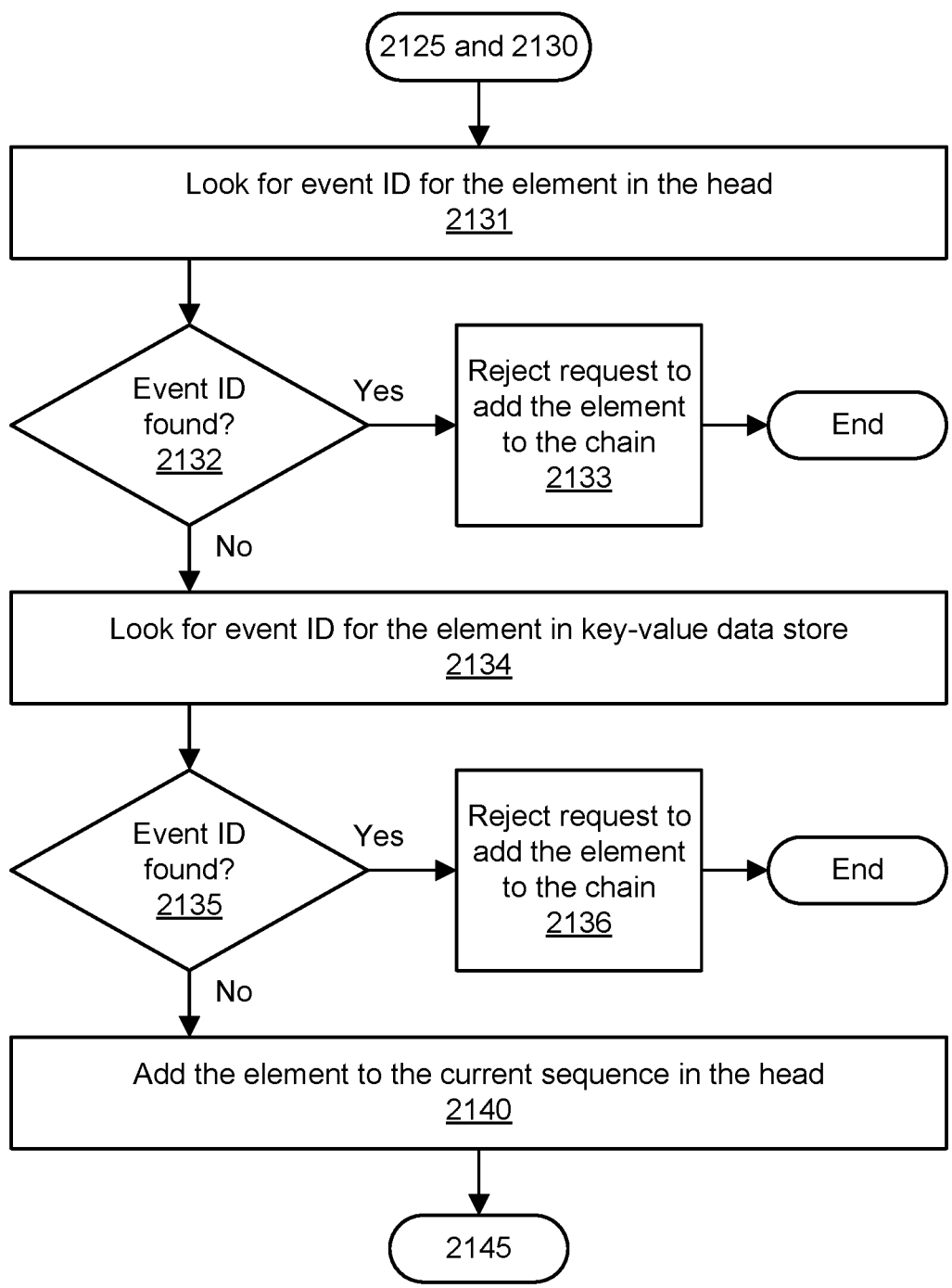
FIG. 15 illustrates further aspects of the method for adding an element to the head of a chain, including an idempotence property for additions to the chain, according to some embodiments.

FIG. 15 illustrates further aspects of the method for adding an element to the head of a chain, including an idempotence property for additions to the chain, according to one embodiment. The operations shown in FIG. 15 may be performed after the operations shown in 2125 and 2130 and before the operation shown in 2145 as illustrated previously in FIG. 12. An event identifier may be generated for an event that a client has requested to add to a particular chain. In one embodiment, the event identifier may be determined as a hash of the contents of the event.

As shown in 2131, the method may look for the event identifier in the head of the chain. As shown in 2132, it may be determined whether the event identifier was found in the head of the chain. If so, then as shown in 2133, the request to add the element may be rejected, and the method may end.

As shown in 2134, the method may look for the event identifier in the set of event identifiers in a key-value data store. As shown in 2135, it may be determined whether the event identifier was found in the set of event identifiers in the key-value data store. If so, then as shown in 2136, the request to add the element may be rejected, and the method may end.

As shown in 2140, if its event identifier was not found in either location, then the element associated with the request may be added to the current sequence in the head. The element may be added in an order with respect to any other elements in the current sequence, e.g., the order in which new events are received by the logging system. The new element may be associated with an element index that indicates the relative position of the element in the order.

Figure 16:
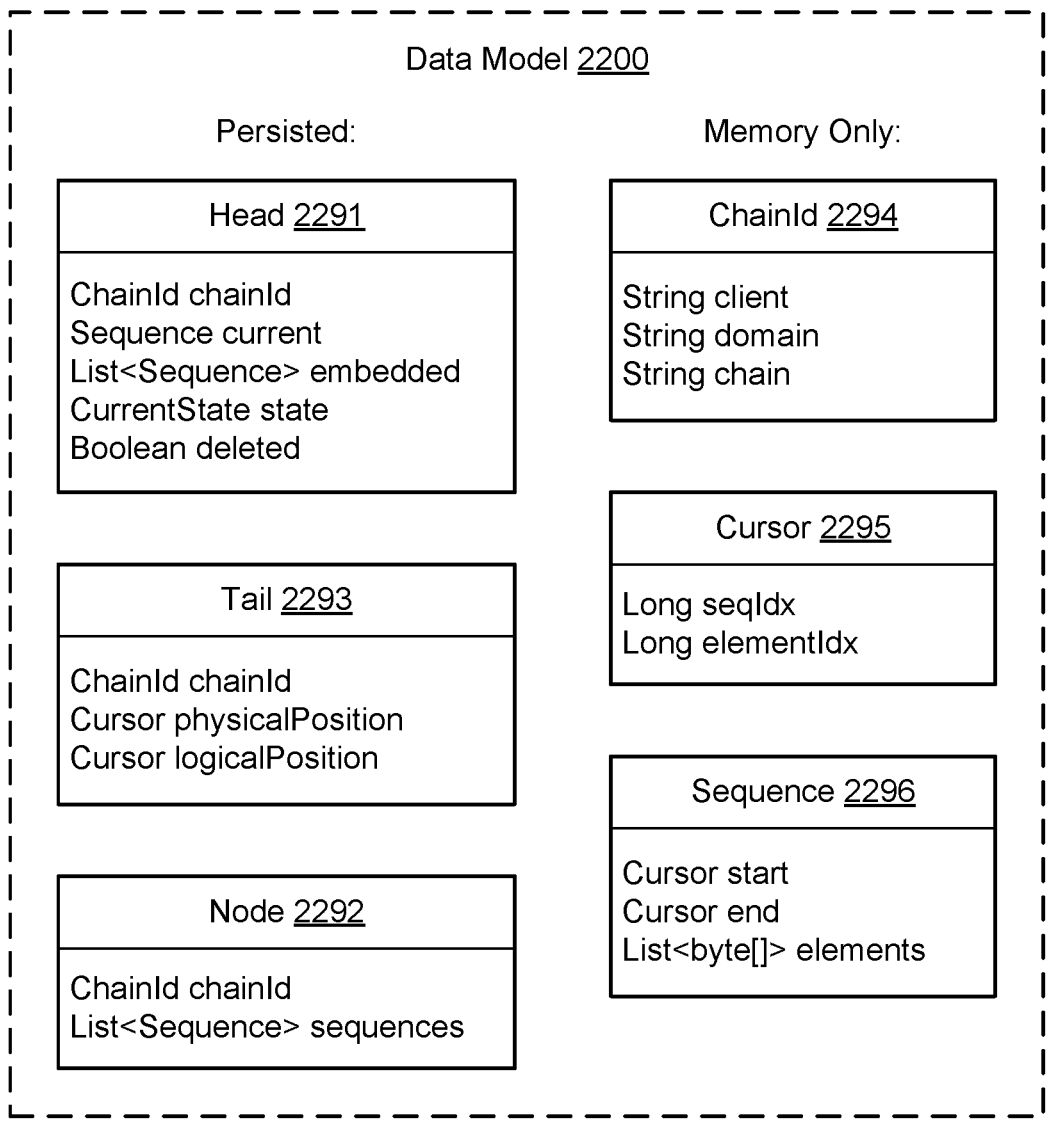
FIG. 16 illustrates an example of a data model usable for chain logging using key-value data storage, according to some embodiments.

FIG. 16 illustrates an example of a data model usable for chain logging using key-value data storage, according to one embodiment. Data structures for the head 2291, tail 2293, and node 2292 may be persisted in the key-value data store 2080. Data structures for the chainId 2294, cursor 2295, and sequence 2296 may be maintained in non-persistent memory at a logging instance or other host that accesses the chain. The head data structure 2291 may include fields for a chain identifier of type chainID, a current sequence of elements of a sequence data type, any embedded sequences of elements in a list of sequence data types, a user-defined state of type currentState, and a Boolean indicator of whether the head has been deleted. The current state may store custom information and may be passed into the push operation by the client. For example, if a chain represents updates to a gift card balance, the current state may include a numerical value representing the current balance so that the entire chain need not be traversed in order to calculate the balance at a given time. The state may be calculated and output periodically. The state field may vary in its use or meaning for chains representing different types of updates.

The tail data structure 2293 may include fields for a chain identifier of type chainID, a physicalPosition pointer of type cursor, and a logicalPosition pointer of type cursor. The node data structure 2292 may include fields for a chain identifier of type chainID and one or more sequences of elements in a list of sequence data types. The chain ID data type 2294 may include strings identifying the client, domain, and chain. The cursor data type 2295 may include long integers (or other suitable types) representing a sequence index and element index. The sequence data type 2296 may include a start cursor, an end cursor, and elements as a list of byte arrays.

In one embodiment, the logging system 2000 may offer an API for a push operation to add an element to a chain. The push API may accept an input of a chainID that identifies the chain to which to add elements. The push API may accept an input of List<byte[ ]> elements, where each element is an opaque byte[ ] of content. The supplied elements may be appended to the end of the chain. The elements may contain null or zero-length byte arrays. The push API may accept an input of byte[ ] conditionalContext [default=null] representing the known state of the head node obtained from a prior operation. If the head node has been altered by any mutating operation, the call may fail. If null, the operation may not be conditional and may simply append the values to the end of the chain. The push API may accept an input of Int maxLatestElements [default=0] representing the number of elements from the head of the chain that should be returned. Zero or fewer may return none. The logging system may return at most the elements that are stored in the head and have not yet been offloaded and dropped from the head node. Even though the head may contain non-contiguous segments of elements, the elements returned may be contiguous and may include all values up to those that were appended to the chain. Because the head node is retrieved prior to being updated internally by the buffer chain, there may be little overhead in returning it to the caller.

The push API may generate an output of Sequence latestElements representing the elements from the head just prior to the added elements. There may be at most 'maxLatestElements' values in this list, but no extra work of loading elements from internal nodes may need to be done. If the head contains no elements directly but has an embedded node at the end of the chain, that sequence may be returned. If there are elements directly contained in the head's current sequence, those elements will be returned. If both, the two will be combined into a joint sequence and returned. These values may be guaranteed to be contiguous and may represent the complete set of values just prior to the appended elements. The push API may generate an output of Cursor endCursor representing the position at the end of the newly added elements, where items will be added on the next push call. The push API may generate an output of byte[ ] context representing the new state of the head node which can be supplied back in the next call for a conditional operation.

The push API call may first retrieve the head of the chain. In the head may be stored a current sequence that is not yet immutable, along with any embedded sequences that are not yet offloaded to their own node. If a partition is down in storage, it may not be possible to offload some nodes. Instead of making efforts to know the status of these nodes, the logging system may simply attempt to offload them using a batch unconditional put operation. If the head node is marked isDeleted, the logging system may first call to delete the tail node to make sure that cleanup is complete before proceeding. Once that is done, the logging system may overwrite the head. For those sequences that have been successfully offloaded, the logging system may remove them from the embedded collection on the head in memory. The logging system may then add our new elements to the current sequence and increment the element index. In memory, if the elements collection exceeds a configured limit for size or count, the logging system may move the sequence to the embedded collection and start a new current sequence. Once this is done, the logging system may perform a conditional put (CPUT) of the head node back to its storage location. The cost of this operation may be 1*CGET+K*PUT+1*CPUT, where K is amortized less than 1 since on average there may be one node to offload for every push.

If the caller has supplied a conditionalContext argument that contains the entire serialized head node, the logging system may avoid the initial CGET to obtain the head node and move directly to the K*PUT offloading step. The cost tradeoff may involve returning to the caller a larger amount of information in the conditionalContext field, which may be returned back into the service in place of receiving smaller data from the client but retrieving the information from the underlying store. Since the client/service link is typically stateless and therefore cheaper than doing a quorum read from an underlying DHT, this tradeoff is typically desirable.

The offload step may be omitted in latency sensitive calls by delaying the offload and leaving the burden to a future writer. Because any writer may perform the offload step and may do so in the same manner, correctness is not impacted. However, cost and latency may increase as the head becomes larger. The offload may be executed in parallel with a head update. The head may still contain the offloaded nodes. However, if the client is chaining push requests using conditionalContext, the logging system may include in the conditionalContext whether or not it has successfully offloaded the internal nodes. This additional information may allow dropping the offloaded nodes in the subsequent request with confidence. Given these two options, the floor for a push operation may be 1*CPUT.

In one embodiment, the logging system 2000 may offer an API for a pop operation to remove one or more elements from a chain. The pop operation may remove the oldest elements from the chain by popping the oldest recorded node(s). The head may be updated to reflect the new oldest elements. Because elements are laid on the chain many to a single immutable node, if the cursor is in the middle of a node, that node may not be removed but the head may be updated to reflect the offset at which the entries are valid. The pop API may accept an input of a chainId representing the identifier of the chain from which to remove data. The pop API may accept an input of Cursor removeTo representing the position in the chain up to which values will be removed. The cursor may not be null. If the cursor points beyond the latest record, then all nodes and the head may be removed, and any trace of the chain will be gone. This may result in the chain numbering additional sequences and elements from zero if it is re-created. The pop API may accept an input of byte[ ] context [default=null] representing information returned back into the routine from the prior call. This context information may help avoid extra loads from the underlying data store.

The pop API may generate an output of Boolean isComplete, which if true indicates that the pop operation has completed and left the chain in a stable state, or if false indicates that there is more work to be done to finish the job. If isComplete is false, the chain may appear to be deleted to the desired position, but some removal work may be desired. The caller may repeatedly call the pop method with the same inputs until isComplete returns true. The pop API may generate an output of byte[ ] context representing a transient state returned to the caller for more efficient subsequent calls back into the routine. The context may contain the state of the head and tail nodes so they do not need to be loaded during extensive delete operations.

The pop operation may manipulate the tail, by shifting the pointers forward and cleaning off internal nodes. First the head and tail may be loaded. If neither exists, the chain has either been successfully cleaned up or never existed. If the head does not exist but the tail does, then the logging system has reached an invalid state since it should not dispose of the head until all other data is gone. If the tail does not exist but the head does exist, then: if the head is not marked as deleted, the logging system may create a new tail that points to the 0th node; if the head is marked deleted, the logging system have achieved a complete cleanse of the internal nodes, the tail, and all that remains to be deleted is the head. If both exist, then the logging system is in the process of deleting.

The tail may contain a pointer to the earliest node that might exist (physical delete) and a pointer to the latest point in the chain that is desired to exist after the delete operation (logical delete). The pop operation may first advance the logical cursor because that has the immediate effect on readers of showing the contents removed. The next step may be to delete nodes that are between the physical and logical cursors. The logging system may choose to delete nodes in batches or one by one. A reader of the tail may not assume that the deletes are contiguous. The pop operation may strongly guarantee that the nodes are removed before finalizing the delete by advancing the physical cursor to match the logical one. When the two are the same, no additional work may need to be done to finish the pop operation. The pop result may indicate whether the chain has physically deleted all the items that are logically deleted by returning isComplete set true.

If the tail reaches the head position, meaning that there are no longer items in the chain, then the head isDeleted may be marked true. Once that is done, the tail may be deleted, followed by the head. This sequence of operations may prevent the possibility of a tail being retained after the head is gone, which may become important if the head is re-created after being deleted. The logging system may guarantee the destruction of the tail prior to the destruction of the head.

By keeping the cleanup operations strictly separate from the push operations, the logging system may avoid interfering with the more critical additions to the chain. In this manner, the logging system may prevent pop operations from slowing down modifications to the head. By placing the tail in a separate file from the head, the logging system can run both operations independently without mutual interference. By tracking logical and physical cursors, the logging system may eliminate the need for any separate garbage collection requirement to account for all of the content. The logging system may use the data structure itself to recover from partial temporary failure and guarantee eventual cleanup. To avoid doing all work in a single call, the pop routine may limit the number of physical nodes that are deleted. Because transient failure may require extensive computation or re-work, the logging system may cap the amount of rework by advancing only the physical delete pointer on the tail. If a caller wanted to delete 10,000 entries over 1,000 nodes, the logging system may immediately set the logical pointer to delete the entire set of values. Each pop operation may only delete ten nodes then advance the physical delete pointer and leave the logical pointer at the end. Once both point to the same position, the total operation is complete.

In one embodiment, the logging system 2000 may offer an API for a seek operation to perform a k-ary search of a chain. The seek API may accept an input of a chainId that identifies the chain to search. The seek API may accept an input of Cursor start [default=tail of chain] representing the earliest bound for the search. The seek API may accept an input of Cursor end [default=head of chain] representing the latest bound for the search. The seek API may accept an input of int k [default=1] representing the number of nodes to load in parallel. This is equivalent to the k-ary nature of the search minus one. For example, if a value of 2 is supplied, then the chain may be split into 3 roughly equal sections and the 2 nodes bordering these sections may be loaded and returned. Any value less than 1 may treated as 1. The seek API may accept an input of byte[ ] context representing a means to supply search context back into the routine so we can avoid extra head loads.

The seek API may generate an output of List<Sequence> sequences representing the contents of the nodes. The seek API may generate an output of Cursor start [default-tail of chain] representing the earliest bound for the search inclusive. The seek API may generate an output of Cursor end [default-head of chain] representing the latest bound for the search exclusive. The seek API may generate an output of byte[ ] context representing the serialized state of the head node. When supplied back into the routine, the logging system may avoid needing to load the head node again for a number of edge cases. If the context was supplied, it may not be returned since it is expected to be identical.

In each seek operation, the logging system may aim to perform exactly one batch load from an underlying DHT. If the input does not contain an end cursor, the logging system may load the head and add its sequence to the output. The logging system may also serialize the head material into searchContext for return to the caller. If the tail is not present, the logging system may similarly load it and set the start cursor as output. If both were not set, these operations may be batch loaded. If either is not set, the logging system may do no further work for this round. When both the start and end are supplied, the logging system can perform a k-ary search over the nodes by computing the node identifiers between the supplied start and end. For instance, if the start and end were 10 and 150, and the caller supplied a k–6, then the logging system could divide (150–10=140) into 7 sections of size 20 and load nodes 30, 50, 70, 90, 110, and 130 in parallel. If some of the gets fail, the logging system may supply back what we received. If all of the gets fail, then the call fails. If searchContext was not supplied in the call, the logging system may also load the head as part of the batch and supply it back as searchContext, but not include its sequence. This context may be used to patch parts of the chain that may not be offloaded as their own nodes yet but are still embedded in the head.

In one embodiment, the logging system 2000 may offer an API for a list operation to perform sequential paging of a chain. The list API may accept an input of a chainId that identifies the chain to search. The list API may accept an input of Cursor position [default-tail of chain] representing the position from which to list. The list API may accept an input of boolean forward [default=true] which, if true, lists the items starting at the position cursor between the cursor and the head (new items, forward in time) and, if false, loads the items between the cursor and the tail (older items, backwards in time). Regardless of this setting, the returned sequence may itself be ordered the same direction, with the oldest element at the front of the array. The list API may accept an input of byte[ ] context [default=null] representing a means to supply search context back into the routine so we can avoid extra head loads. The list API may accept an input of int maxNodes [default=5, max=100] representing the maximum number of nodes to return.

The list API may generate an output of List<Sequence> sequences representing the contents of the listed nodes. The list API may generate an output of byte[ ] context representing the serialized state of the head. When supplied back into the routine, the logging system may avoid needing to load the head again for a number of edge cases. If context was supplied in, it may not be returned.

In each list operation, the logging system may aim to perform exactly one batch read from the underlying DHT. If the input does not contain a position cursor, the logging system may first load the tail to determine the end of the chain. Given a position and a direction, the logging system may get the contiguous 'maxNodes' from the cursor in the direction defined by 'forward' in a batch operation from the DHT. Call failures may be re-attempted, and any missing sections may be filled in using the head. The head may have been supplied in context, but if not it may be requested as part of the batch get operation and then returned to the caller in the context field.

Illustrative Computer System

Figure 17:
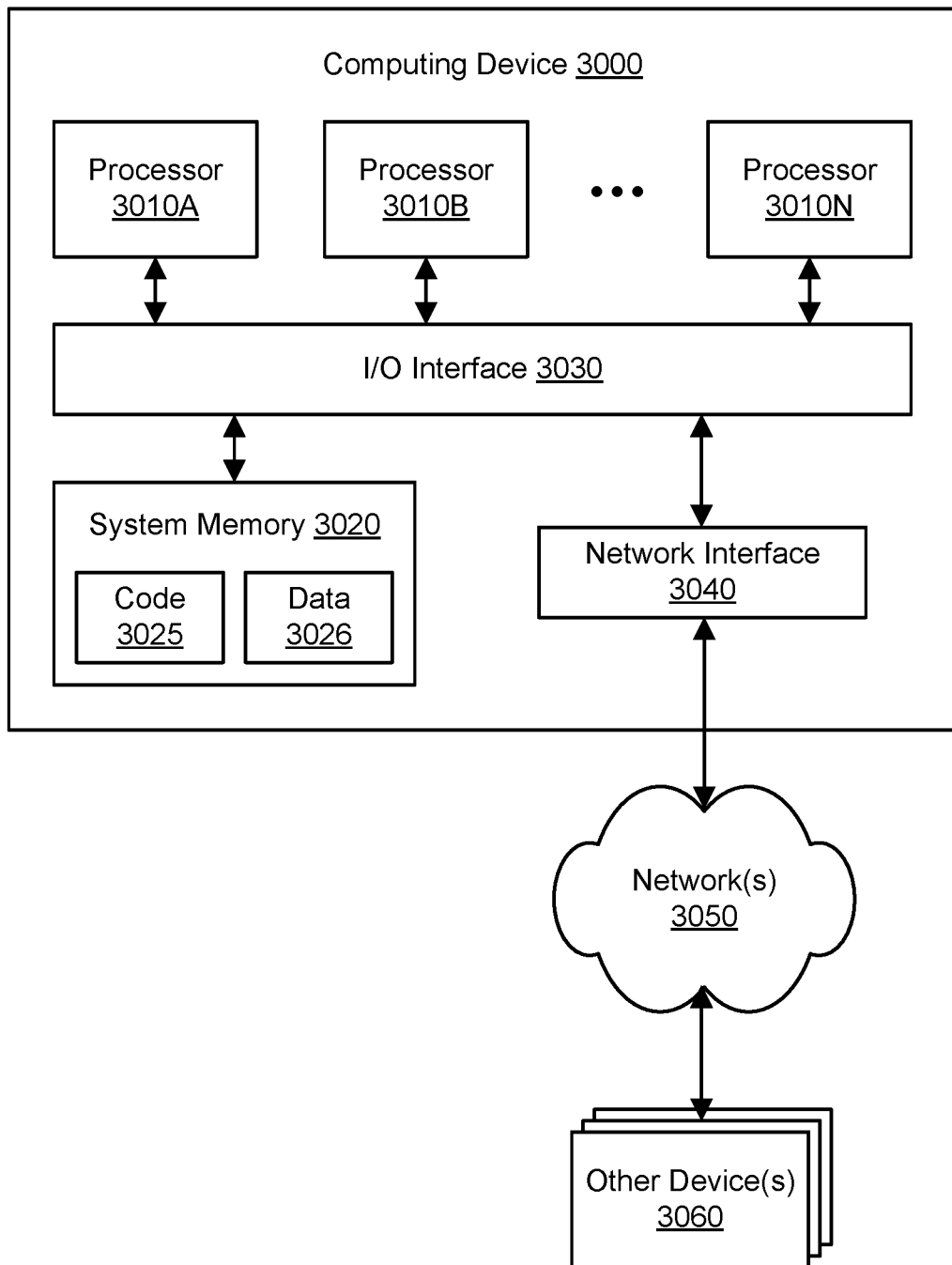
FIG. 17 illustrates an example computing device that may be used in some embodiments.

In at least some embodiments, a computer system that implements a portion or all of one or more of the technologies described herein may include a computer system that includes or is configured to access one or more computer-readable media. FIG. 17 illustrates such a computing device 3000 according to one embodiment. In the illustrated embodiment, computing device 3000 includes one or more processors 3010A-3010N coupled to a system memory 3020 via an input/output (I/O) interface 3030. In one embodiment, computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). In one embodiment, processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In one embodiment, in multiprocessor systems, each of processors 3010A-3010N may commonly, but not necessarily, implement the same ISA.

In one embodiment, system memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processors 3010A-3010N). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. In some embodiments, some or all of the functionality of I/O interface 3030, such as an interface to system memory 3020, may be incorporated directly into processors 3010A-3010N.

In one embodiment, network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, in some embodiments, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. In some embodiments, program instructions and/or data may be received, sent or stored upon different types of computer-readable media. In some embodiments, a computer-readable medium may include non-transitory storage media or memory media such as magnetic or optical media, e.g., disk or DVD/CD coupled to computing device 3000 via I/O interface 3030. In one embodiment, a non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. In one embodiment, a computer-readable medium may include transmission media or signals such as electrical, electromagnetic, or digital signals, conveyed via a communication medium such as a network and/or a wireless link, such as may be implemented via network interface 3040. The described functionality may be implemented using one or more non-transitory computer-readable storage media storing program instructions that are executed on or across one or more processors. Portions or all of multiple computing devices such as that illustrated in FIG. 7 may be used to implement the described functionality in various embodiments; for example, software components running on a variety of different devices and servers may collaborate to provide the functionality in one embodiment. In some embodiments, portions of the described functionality may be implemented using storage devices, network devices, or various types of computer systems. In various embodiments, the term "computing device," as used herein, refers to at least all these types of devices, and is not limited to these types of devices.

The various methods as illustrated in the Figures and described herein represent examples of embodiments of methods. In various embodiments, the methods may be implemented in software, hardware, or a combination thereof. In various embodiments, in various ones of the methods, the order of the steps may be changed, and various elements may be added, reordered, combined, omitted, modified, etc. In various embodiments, various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
a data store storing a persistent log comprising an ordered sequence of records; and
a record delivery system comprising one or more processors and one or more memories to store computer-executable instructions that, when executed, cause the one or more processors to:
provide an identifier for a first receiver session for the persistent log on behalf of a first client for a plurality of worker hosts of the first client to receive records from the persistent log according to the ordered sequence of records;
associate a cursor with the first receiver session and the persistent log, wherein the cursor indicates a pointer for a next record in the ordered sequence of records to be sent for the first receiver session;
receive, from a first worker host of the plurality of worker hosts, a first request to read from the persistent log in the first receiver session, wherein the first request specifies the identifier for the first receiver session but does not specify identifiers of individual records in the ordered sequence of records of the persistent log to read;
determine, responsive to receipt of the first request specifying the identifier for the first receiver session, a first set of one or more records according to the pointer for the next record in the ordered sequence of records indicated by the cursor for the first receiver session for which the identifier was specified in the first request;
send, to the first worker host in the first receiver session, the first set of one or more records as a response to the first request;
update the cursor for the first receiver session to move the pointer in the ordered sequence of records according to the first set of one or more records sent to the first client for the first receiver session;
receive, from a second worker host of the plurality of worker hosts of the first client in the first receiver session, a second request to read from the persistent log, wherein the second request specifies the identifier for the first receiver session but does not specify individual records in the ordered sequence of records of the persistent log to read;
determine, responsive to receipt of the second request that specifies the first receiver session identifier, a second set of one or more records that differ from the first set, according to the pointer for the next record in the ordered sequence of records indicated by the updated cursor for the first receiver session for which the identifier was specified in the second request, and wherein the second set of one or more records is positioned in the ordered sequence before or after the first set of records in the ordered sequence of records;
send, to the second worker host in the first receiver session, the second set of one or more records as a response to the second request;
update the cursor to move the pointer in the ordered sequence of records according to the second set of one or more records sent to the first client in the first receiver session; and
maintain a different cursor for a second receiver session to receive records from the persistent log according to the ordered sequence of records independent of and concurrently with the first receiver session, wherein the first receiver session and the second receiver session provide for concurrent access to the persistent log, and the different cursor for the second receiver session provides for retrieval of records to one or more other worker hosts from a different location in the ordered sequence of records of the persistent log than the cursor for the first receiver session responsive to individual ones of the one or more other worker hosts specifying an identifier of the second receiver session in a respective request without specifying individual records in the ordered sequence of records of the persistent log to retrieve.

2. The system as recited in claim 1, wherein an additional request comprises an acknowledgement of delivery of the first set of one or more records to the first client, wherein the cursor indicates that the delivery of the first set of one or more records is acknowledged, wherein after the acknowledgement of delivery the persistent log continues to store the first set of one or more records according to the ordered sequence.

3. The system as recited in claim 2, wherein the one or more memories store additional computer-executable instructions that, when executed, cause the one or more processors to:
  initiate the second receiver session for the persistent log on behalf of the first client;
  receive, from the first client, a third request to read from the persistent log, wherein the third request is associated with the second receiver session;
  send, to the first client, the first set of one or more records as a response to the third request; and
  store the different cursor indicating that the first set of one or more records was sent to the first client for the second receiver session.

4. The system as recited in claim 1, wherein delivery of the first set of one or more records is not acknowledged by the first worker host, wherein the cursor indicates that the delivery of the first set of one or more records is not acknowledged, and wherein the one or more memories store additional computer-executable instructions that, when executed, cause the one or more processors to:
  perform one or more redelivery attempts of the first set of one or more records to the first worker host for the first receiver session according to a redelivery policy, wherein the delivery of the first set of one or more records is not acknowledged by the first worker host after the one or more redelivery attempts;
  store the first set of one or more records in an undelivered record log associated with the first receiver session, wherein the undelivered record log is accessible by the first client using an additional receiver session; and
  update the cursor to indicate that the first set of one or more records will not be redelivered to the first client for the receiver session.

5. A method, comprising:
  receiving, by a record delivery system from a first client in a first receiver session, a first request to read from a persistent log comprising an ordered sequence of records, wherein the first request specifies an identifier for the first receiver session but does not specify identifiers of individual ones of the records in the ordered sequence records of the persistent log to read;
  associating a data structure with the first receiver session and the persistent log, wherein the data structure indicates a pointer for a next record in the ordered sequence of records to be sent for the first receiver session;
  sending, by the record delivery system in the first receiver session to the first client based at least in part on the first request, a first set of one or more records determined according to the pointer for the next record in the ordered sequence of records indicated by the data structure for the first receiver session for which the identifier for the first receiver session was specified in the first request;
  updating, by the record delivery system for the first receiver session, the data structure for the first receiver session to move the pointer in the ordered sequence of records according to the first set of one or more records sent to the first client in the first receiver session;
  receiving, by the record delivery system from the first client in the first receiver session, a second request to read from the persistent log, wherein the second request specifies the identifier for the first receiver session but does not specify individual ones of the records in the ordered sequence of records of the persistent log to read;
  determining, by the record delivery system responsive to receipt of the second request that specifies the first receiver session identifier, a second set of one or more records that differ from the first set, according to the pointer for the next record in the ordered sequence of records indicated by the updated data structure for the first receiver session for which the identifier was specified in the second request;
  sending, by the record delivery system in the first receiver session to the first client based at least in part on the second request, the second set of one or more records;
  updating the data structure to move the pointer in the ordered sequence of records according to the second set of one or more records sent to the first client in the first receiver session; and
  maintaining a different data structure for a second receiver session to receive records from the persistent log according to the ordered sequence of records independent of and concurrently with the first receiver session, wherein the first receiver session and the second receiver session provide for concurrent access to the persistent log, and the different cursor for the second receiver session provides for retrieval of records to one or more other worker hosts from a different location in the ordered sequence of records of the persistent log than the cursor for the first receiver session responsive to individual ones of the one or more other worker hosts specifying an identifier of the second receiver session in a respective request without specifying individual records in the ordered sequence of records of the persistent log to retrieve.

6. The method as recited in claim 5, wherein the second request comprises an acknowledgement of delivery of the first set of one or more records to the first client, wherein the data structure indicates that the delivery of the first set of one or more records is acknowledged, and wherein the persistent log continues to store the first set of one or more records according to the ordered sequence.

7. The method as recited in claim 6, further comprising:
  receiving, by the record delivery system from the first client, a third request to read from the persistent log, wherein the third request is associated with the second receiver session;
  sending, by the record delivery system to the first client, the first set of one or more records as a response to the third request; and
  updating, by the record delivery system, the different data structure indicating that the first set of one or more records was sent to the first client in the second receiver session.

8. The method as recited in claim 5, wherein delivery of the first set of one or more records is not acknowledged by the first client, wherein the data structure indicates that the delivery of the first set of one or more records is not acknowledged, and wherein the method further comprises:
  performing one or more redelivery attempts of the first set of one or more records to the first client for the first receiver session, wherein the delivery of the first set of one or more records is not acknowledged by the first client after the one or more redelivery attempts;
  storing, by the record delivery system, the first set of one or more records in an undelivered record log associated with the first receiver session, wherein the undelivered record log is accessible by the first client using an additional receiver session; and updating, by the record delivery system, the data structure to indicate that the first set of one or more records will not be redelivered to the first client for the first receiver session.

9. The method as recited in claim 8, further comprising:
receiving, by the record delivery system from the first client, a third request to add a third set of one or more records to the undelivered record log, wherein the third request is associated with the first receiver session; and
storing, by the record delivery system, the third set of one or more records in the undelivered record log associated with the first receiver session.

10. The method as recited in claim 5, wherein the persistent log comprises a stream representing the ordered sequence of records, wherein the stream comprises a plurality of chains including a parent chain and one or more child chains, wherein the data structure is associated with the parent chain, and wherein one or more additional data structures are associated with the one or more child chains and store data indicating previously delivered records from the one or more child chains for the first receiver session.

11. The method as recited in claim 5, wherein the first set of one or more records is determined by the record delivery system according to the ordered sequence of records for the first receiver session specified in the first request.

12. The method as recited in claim 5, wherein the first set of one or more records and the second set of one or more records correspond to a plurality of transactions stored in a first data store, and wherein the method further comprises:
adding the first set of one or more records and the second set of one or more records to the persistent log according to the ordered sequence based at least in part on automated detection of the plurality of transactions;
determining, by the first client, that the plurality of transactions corresponding to the first set of one or more records and the second set of one or more records are eligible for migration to a second data store, wherein the second data store has a higher latency than the first data store;
storing the plurality of transactions in the second data store; and
removing the plurality of transactions from the first data store.

13. One or more non-transitory computer-readable storage media storing program instructions that, when executed on or across one or more processors, perform:
receiving, by a record delivery system from a first client in a first receiver session, a first request to read from a persistent log comprising an ordered sequence of records, wherein the first client comprises one or more worker threads, wherein the first request specifies an identifier for the first receiver session but does not specify identifiers of individual ones of the records in the ordered sequence of records of the persistent log to read;
associating a cursor with the first receiver session and the persistent log, wherein the cursor indicates a pointer for a next record in the ordered sequence of records to be sent for the first receiver session;
sending, by the record delivery system in the first receiver session to the first client as a response to the first request, a first set of one or more records determined according to the pointer for the next record in the ordered sequence of records indicated by the cursor for the first receiver session for which the identifier for the first receiver session was specified in the first request;
updating, by the record delivery system, the cursor for the first receiver session to move the pointer in the ordered sequence of records according to the first set of one or more records sent to the first client in the first receiver session;
receiving, by the record delivery system from the first client in the first receiver session, a second request to read from the persistent log, wherein the second request specifies the identifier for the first receiver session but does not specify individual ones of the records in the ordered sequence of records of the persistent log to read;
determining, by the record delivery system responsive to receipt of the second request that specifies the first receiver session identifier, a second set of one or more records that differ from the first set, according to the pointer for the next record in the ordered sequence of records indicated by the updated cursor for the first receiver session for which the identifier was specified in the second request;
sending, by the record delivery system in the first receiver session to the first client as a response to the second request, the second set of one or more records;
updating the cursor to move the pointer in the ordered sequence of records according to the second set of one or more records sent to the first client in the first receiver session; and
maintaining a different cursor for a second receiver session to receive records from the persistent log according to the ordered sequence of records independent of and concurrently with the first receiver session, wherein the first receiver session and the second receiver session provide for concurrent access to the persistent log, and the different cursor for the second receiver session provides for retrieval of records to one or more other worker hosts from a different location in the ordered sequence of records of the persistent log than the cursor for the first receiver session responsive to individual ones of the one or more other worker hosts specifying an identifier of the second receiver session in a respective request without specifying individual records in the ordered sequence of records of the persistent log to retrieve.

14. The one or more non-transitory computer-readable storage media as recited in claim 13, wherein the second request comprises an acknowledgement of delivery of the first set of one or more records to the first client, wherein the cursor indicates that the delivery of the first set of one or more records is acknowledged, wherein the first set of one or more records is not redelivered to the first client for the first receiver session after the acknowledgement of delivery, and wherein the persistent log continues to store the first set of one or more records according to the ordered sequence.

15. The one or more non-transitory computer-readable storage media as recited in claim 14, further comprising additional program instructions that, when executed on or across the one or more processors, perform:
receiving, by the record delivery system from the first client, a third request to read from the persistent log, wherein the third request is associated with the second receiver session;
sending, by the record delivery system to the first client, the first set of one or more records as a response to the third request; and storing, by the record delivery system, the different cursor indicating in the ordered sequence that the first set of one or more records was sent to the first client in the second receiver session.

16. The one or more non-transitory computer-readable storage media as recited in claim 13, wherein delivery of the first set of one or more records is not acknowledged by the first client, wherein the cursor indicates that the delivery of the first set of one or more records is not acknowledged, and wherein the one or more storage media further comprise additional program instructions that, when executed on or across the one or more processors, perform:
  performing one or more redelivery attempts of the first set of one or more records to the first client for the first receiver session, wherein the delivery of the first set of one or more records is not acknowledged by the first client after the one or more redelivery attempts;
  storing, by the record delivery system, the first set of one or more records in an undelivered record log associated with the first receiver session, wherein the undelivered record log is accessible by the first client using an additional receiver session; and
  updating, by the record delivery system, the cursor to indicate that the first set of one or more records will not be redelivered to the first client for the first receiver session.

17. The one or more non-transitory computer-readable storage media as recited in claim 16, further comprising additional program instructions that, when executed on or across the one or more processors, perform:
  receiving, by the record delivery system from the first client, a third request to add a third set of one or more records to the undelivered record log, wherein the third request is associated with the first receiver session; and
  storing, by the record delivery system, the third set of one or more records in the undelivered record log associated with the first receiver session.

18. The one or more non-transitory computer-readable storage media as recited in claim 13, wherein the persistent log comprises a stream representing the ordered sequence of records, wherein the stream comprises a plurality of chains including a parent chain and one or more child chains, wherein the cursor is associated with the parent chain, and wherein one or more additional cursors are associated with the one or more child chains and store data indicating previously delivered records from the one or more child chains for the first receiver session.

19. The one or more non-transitory computer-readable storage media as recited in claim 13, wherein the first set of one or more records is determined by the record delivery system according to the ordered sequence of records for the first receiver session specified in the first request.

20. The one or more non-transitory computer-readable storage media as recited in claim 13, wherein the first set of one or more records and the second set of one or more records correspond to a plurality of transactions stored in a first data store, and wherein the one or more storage media further comprise additional program instructions that, when executed on or across the one or more processors, perform:
  adding the first set of one or more records and the second set of one or more records to the persistent log according to the ordered sequence based at least in part on automated detection of the plurality of transactions;
  determining that the plurality of transactions corresponding to the first set of one or more records and the second set of one or more records are eligible for migration to a second data store, wherein the second data store has a higher latency than the first data store;
  storing the plurality of transactions in the second data store; and
  removing the plurality of transactions from the first data store.

* * * * *